(12) United States Patent
Cope

(10) Patent No.: US 8,091,103 B2
(45) Date of Patent: Jan. 3, 2012

(54) SERVER PROVIDING CONTENT DIRECTORIES OF VIDEO SIGNALS AND LINKAGE TO CONTENT INFORMATION SOURCES

(75) Inventor: Tyler Andrew Cope, Ottawa (CA)

(73) Assignee: Overlay.TV Inc., Ottawa, Ontario (CA)

( * ) Notice: Subject to any disclaimer, the term of this patent is extended or adjusted under 35 U.S.C. 154(b) by 741 days.

(21) Appl. No.: 12/177,149

(22) Filed: Jul. 21, 2008

(65) Prior Publication Data

US 2009/0031382 A1    Jan. 29, 2009

Related U.S. Application Data

(60) Provisional application No. 60/951,230, filed on Jul. 22, 2007.

(51) Int. Cl.
H04N 7/10    (2006.01)
H04N 5/445    (2011.01)
H04N 7/173    (2011.01)
G06K 9/00    (2006.01)
G09G 5/00    (2006.01)

(52) U.S. Cl. ............ 725/32; 382/103; 345/629; 725/51; 725/109

(58) Field of Classification Search .................... 725/86, 725/109, 40, 51, 32; 382/103; 345/629
See application file for complete search history.

(56) References Cited

U.S. PATENT DOCUMENTS

| | | |
|---|---|---|
| 5,778,181 A | 7/1998 | Hidary |
| 5,884,056 A | 3/1999 | Steele |
| 6,006,265 A | 12/1999 | Rangan |
| 6,018,768 A | 1/2000 | Ullman |
| 6,184,878 B1 | 2/2001 | Alonso |
| 6,240,555 B1 | 5/2001 | Shoff |
| 6,415,320 B1 | 7/2002 | Hess |
| 6,462,754 B1 | 10/2002 | Chakraborty |
| 6,599,130 B2 | 7/2003 | Moehrle |
| 6,715,126 B1 | 3/2004 | Chang |

(Continued)

FOREIGN PATENT DOCUMENTS

EP    1617657 A1    1/2006

(Continued)

OTHER PUBLICATIONS

Bekooij et al.—"Dataflow Analysis for Real-time Embedded Multi-processor System Design"—Philips Research, 2005, vol. 3 (pp. 81-108).

(Continued)

*Primary Examiner* — James R Sheleheda
(74) *Attorney, Agent, or Firm* — Victoria Donnelly; IP-MEX Inc.

(57) ABSTRACT

An overlay server for illustrative video streaming constitutes a central part of a distributed system for linking content of video recordings to relevant information sources. The overlay server maintains a global object directory including information pertinent to a set of objects and network addresses of external servers providing information relevant to the set of objects. The overlay server further maintains a video-content directory having several overlay directories. Each overlay directory identifies content of a respective video recording from among a set of video recordings and includes a network address of a video-streaming server providing the video recording. The overlay server stores an authoring tool for constructing the overlay directories and an augmented display tool for associating content of a video recording with respective information.

23 Claims, 43 Drawing Sheets

U.S. PATENT DOCUMENTS

| | | | |
|---|---|---|---|
| 6,845,396 B1 | 1/2005 | Kanojia et al. | |
| 6,941,574 B1 | 9/2005 | Broadwin | |
| 7,000,242 B1 | 2/2006 | Haber | |
| 7,027,101 B1 | 4/2006 | Sloo | |
| 7,050,603 B2 | 5/2006 | Rhoads et al. | |
| 7,162,690 B2 | 1/2007 | Gupta | |
| 7,222,163 B1 | 5/2007 | Girouard | |
| 7,421,729 B2 * | 9/2008 | Zenoni | 725/146 |
| 7,721,307 B2 | 5/2010 | Hendricks et al. | |
| 7,752,642 B2 | 7/2010 | Lemmons | |
| 7,899,705 B2 | 3/2011 | Fuisz | |
| 7,962,367 B1 | 6/2011 | Fuisz | |
| 2001/0023436 A1 * | 9/2001 | Srinivasan et al. | 709/219 |
| 2001/0042249 A1 | 11/2001 | Knepper | |
| 2002/0059590 A1 | 5/2002 | Kitsukawa et al. | |
| 2002/0069405 A1 | 6/2002 | Chapin et al. | |
| 2002/0126990 A1 | 9/2002 | Rasmussen et al. | |
| 2003/0028873 A1 * | 2/2003 | Lemmons | 725/36 |
| 2005/0137958 A1 * | 6/2005 | Huber et al. | 705/37 |
| 2005/0177850 A1 | 8/2005 | Boylan | |
| 2005/0229209 A1 | 10/2005 | Hildebolt | |
| 2006/0130095 A1 | 6/2006 | Willis et al. | |
| 2007/0005795 A1 | 1/2007 | Gonzalez | |
| 2007/0091093 A1 | 4/2007 | Li | |
| 2008/0276269 A1 | 11/2008 | Miller | |
| 2008/0276272 A1 | 11/2008 | Rajaraman | |
| 2008/0288974 A1 | 11/2008 | Dierlam et al. | |
| 2008/0295129 A1 | 11/2008 | Laut | |
| 2008/0319852 A1 | 12/2008 | Gardner et al. | |
| 2009/0006375 A1 | 1/2009 | Lax | |

FOREIGN PATENT DOCUMENTS

| | | |
|---|---|---|
| WO | WO 03/127744 A1 | 2/2003 |

OTHER PUBLICATIONS

Katrinis et al.—"Dynamic Adaptation of Source Specific Distribution Trees for Multiparty Teleconferencing" —CoNEXT'05 Proceedings of the 2005 ACM conference on Emerging Network Experiment and Technology,—Oct. 24-27, 2005 Toulouse, France (pp. 156-165).

* cited by examiner

| 912 Object identifier | 914 Object image | 916 Object description | 918 Network addresses of relevant information sources |
|---|---|---|---|
| | | Global Object Directory 560 | |
| 0001 | | | |
| 0002 | | | |
| •••• | | | |
| 8190 | | | |
| 8191 | | | |

FIG. 9

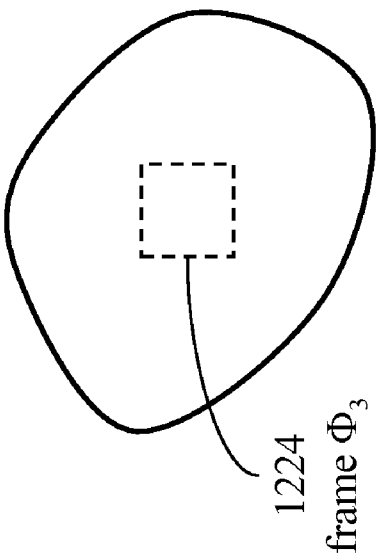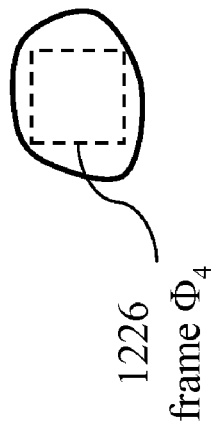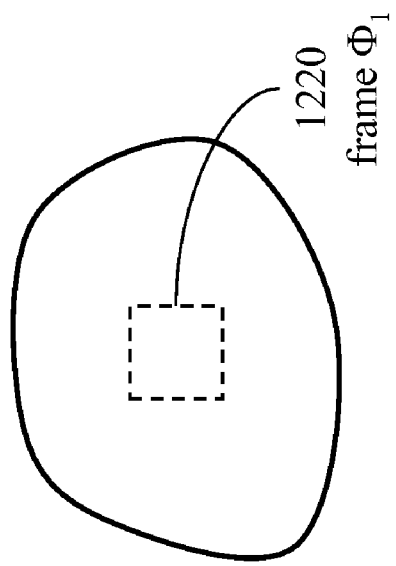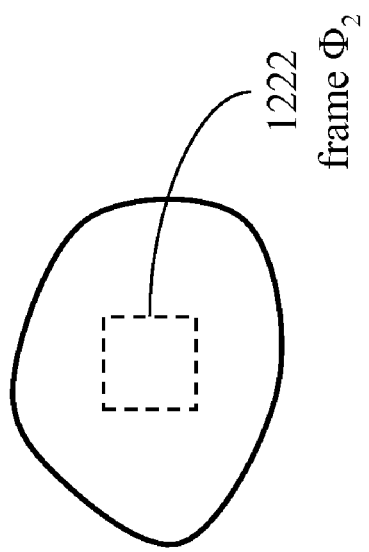
1224 frame $\Phi_3$
1226 frame $\Phi_4$
1220 frame $\Phi_1$
1222 frame $\Phi_2$
FIG. 12

Overlay Directory 1440: contour encircling object-image

Object-120:
| $t_1$ | $t_2$ | ... 1420 ... | $t_{19}$ | $t_{20}$ | ... 1420 ... | $t_{87}$ | $t_{88}$ |
|---|---|---|---|---|---|---|---|
| $x_1^{(01)}$ | $x_1^{(02)}$ | | $x_1^{(19)}$ | $x_1^{(20)}$ | | $x_1^{(87)}$ | $x_1^{(88)}$ |
| $y_1^{(01)}$ | $y_1^{(02)}$ | | $y_1^{(19)}$ | $y_1^{(20)}$ | | $y_1^{(87)}$ | $y_1^{(88)}$ |
| $x_2^{(01)}$ | $x_2^{(02)}$ | | $x_2^{(19)}$ | $x_2^{(20)}$ | | $x_2^{(87)}$ | $x_2^{(88)}$ |
| $y_2^{(01)}$ | $y_2^{(02)}$ | | $Y_2^{(19)}$ | $y_2^{(20)}$ | | $y_2^{(87)}$ | $y_2^{(88)}$ |

Object-809:
| $\tau_1$ | $\tau_2$ | ... 1420 ... | $\tau_{16}$ | $\tau_{17}$ | ... 1420 ... | $\tau_{63}$ | $\tau_{64}$ |
|---|---|---|---|---|---|---|---|
| $u_1^{(01)}$ | $u_1^{(02)}$ | | $u_1^{(16)}$ | $u_1^{(17)}$ | | $u_1^{(63)}$ | $u_1^{(64)}$ |
| $v_1^{(01)}$ | $v_1^{(02)}$ | | $v_1^{(16)}$ | $v_1^{(17)}$ | | $v_1^{(63)}$ | $v_1^{(64)}$ |
| $u_2^{(01)}$ | $u_2^{(02)}$ | | $u_2^{(16)}$ | $u_2^{(17)}$ | | $u_2^{(63)}$ | $u_2^{(64)}$ |
| $v_2^{(01)}$ | $v_2^{(02)}$ | | $v_2^{(16)}$ | $v_2^{(17)}$ | | $v_2^{(63)}$ | $v_2^{(64)}$ |

*FIG. 15*

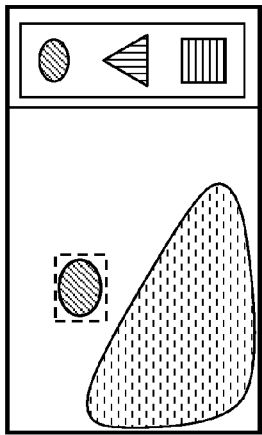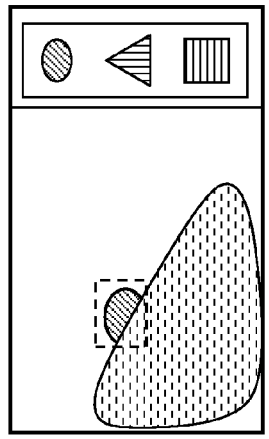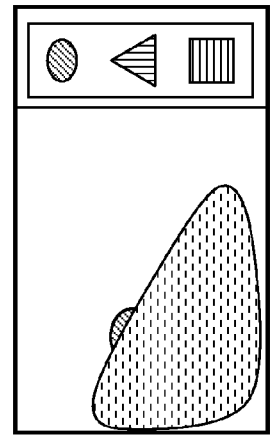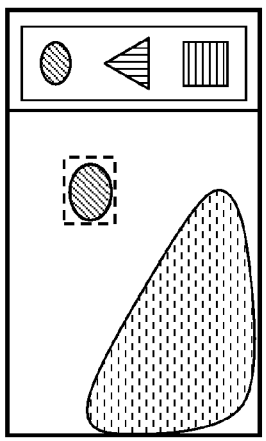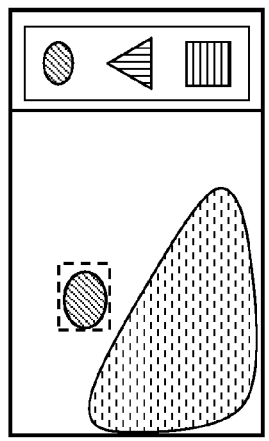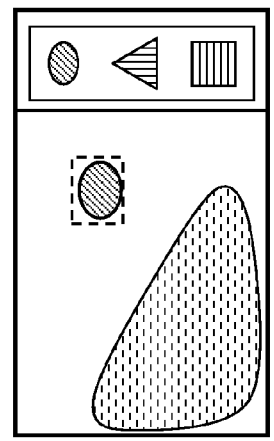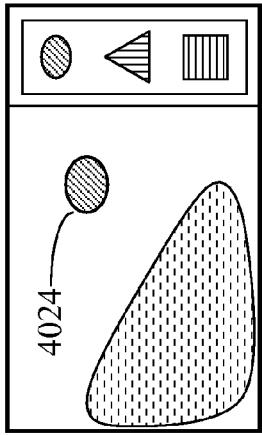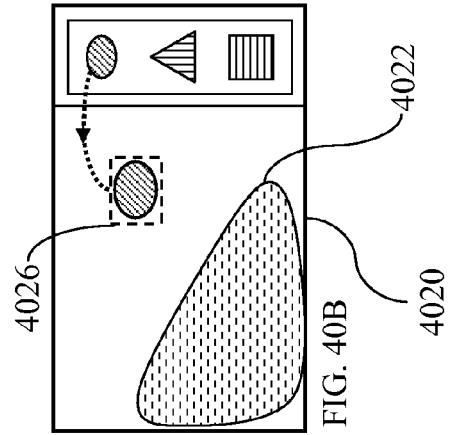

SERVER PROVIDING CONTENT DIRECTORIES OF VIDEO SIGNALS AND LINKAGE TO CONTENT INFORMATION SOURCES

CROSS-REFERENCE TO RELATED APPLICATIONS

This application claims priority to U.S. provisional application 60/951,230, which was filed on Jul. 22, 2007, the content of which is incorporated herein by reference.

FIELD OF THE INVENTION

The present invention relates to illustrative video streaming. In particular, the invention is directed to a distributed system for linking content of video recordings to relevant information sources.

BACKGROUND

Video broadcasting is a source of information of general interest where a viewer may select from a large number of channels. Video broadcasting is heavily used for advertising products and services. The recent widespread proliferation of personal computers with access to the Internet enables viewing video recordings from diverse sources and covering areas of both general interest and special interest. Video-streaming providers also rely on product and service advertising to support their operation. Video broadcasting and video streaming systems permit a viewer to select from a variety of sessions. However, a viewer does not have the privilege of selecting advertising material that accompanies a displayed video signal. Additionally, a viewer of a video display may be interested in acquiring further information relevant to a displayed object but may get such information through access to a search engine.

The flexibility of receiving video signals through a medium permitting two-way communications, such as the Internet, enables viewer-based advertising where a viewer may have some control on displayed advertising content. Such capability may provide significant educational and commercial advantages.

There is, therefore, a need to explore the viability and extent of introducing viewer-based advertising and information delivery.

SUMMARY

In accordance with an aspect, the present invention provides a system for product advertising, the system comprises a processor and a computer readable storage medium, e.g., a memory, having computer readable instructions stored thereon, when executed by the processor, forming an advertising engine and an information depot.

The advertising engine comprises: an information-extraction tool for acquiring collective product information, pertinent to a set of products, from product data bases through a network; an authoring tool for tracking product images appearing in a first display of a specific video recording received from a video source, associating product identifiers to the product images, and producing an overlay directory relating each of selected product images to respective information within the collective product information; and an augmented-display tool for tracking the product images appearing in a second display of the specific video recording and displaying selected product information corresponding to a subset of the product images selected by a viewer of the second display.

The information depot comprises: a computer readable storage medium, e.g., a memory, having computer readable instructions stored thereon, forming the following directories: a global product directory storing the collective product information; a video-source directory providing network addresses of video sources providing video recordings; and a video-content directory storing overlay directories of a plurality of video recordings produced by the authoring tool.

The system further comprises authoring computers connecting, through the network, to the advertising engine and the information depot. An authoring computer: receives a copy of the authoring tool; accesses the video source directory to obtain network addresses of selected video sources; receives selected video recordings from the selected video sources; tracks specific product images appearing in a display of a video recording to produce a tracking record; and accesses the global product directory to obtain product information relevant to the specific product images. The authoring computer produces an overlay directory for the video recording combining the tracking record and the particular product information and sends the overlay directory to the information depot.

The advertising engine distributes the augmented-display tool to a plurality of viewing computers and each viewing computer accesses the video-content directory to acquire an overlay directory associated with a respective video recording.

In accordance with another aspect, the present invention provides a system for collecting and distributing product information through a network. The system comprises an overlay server computer, also to be referred to as an overlay server, and a number of authoring computers. The overlay server comprises: an information extraction tool stored in a computer readable medium, e.g., a memory of the overlay server, for extracting product information, for a set of products, from a plurality of product servers and assembling the product information in a global product directory; an authoring tool for creating individual overlay directories for a plurality of video recordings acquired from a plurality of video sources, and assembling the individual overlay directories into a video-content directory; and an augmented display tool for displaying information relevant to products, belonging to the set of products, appearing in displaying a selected video recording from among the plurality of video recordings. Each authoring computer acquires a copy of the authoring tool.

Each overlay directory maintains a time instant and spatial position of each appearance of a particular product in a display of a respective video recording and information relevant to the particular product.

The global product directory comprises: a list of product identifiers of the set of products; a product image for at least one product in the set of products; a title and description for each product in the set of products; and at least one network address of a product server providing information relevant to each product in the set of products.

The system supports a plurality of viewing computers each viewing computer storing thereon a copy of the augmented display tool which causes a viewing computer to: send a request to the overlay server to acquire a specific video recording; receive from the overlay server (1) an augmented display tool; (2) a specific overlay directory, corresponding to the specific video recording; (3) a network address of a specific video source providing the specific video recording; (4) request and receive the specific video recording from the specific video source; (5) track images, in a display of the specific video recording, of specific products belonging to the set of products and selected by a user of the viewing computer; and (6) extract, from the global product directory, product information relevant to the specific products.

In accordance with a further aspect, the present invention provides a method for product advertising through a network. The method comprises steps of: creating a list of product identifiers of a set of products; acquiring network addresses of product servers, each product server providing information relevant to at least one of the set of products; acquiring collective product information relevant to the set of products from the product servers through the network; and sending the collective product information through the network to an overlay server.

The method further comprises steps of: creating a list of video-recording identifiers of a set of video recordings; acquiring network address of video sources collectively providing the set of video recordings; and requesting and receiving the set of video recordings.

For each video recording, the method performs steps of: producing a display on a computer screen; pointing to images in the display corresponding to the set of products; formulating a tracking record comprising a product identifier, a pointing time, and spatial coordinates for each image; and sending the tracking record to the overlay server through the network.

In accordance with another aspect, the present invention provides a server for illustrative video streaming. The server comprises a computing device and a computer readable storage medium. The storage medium stores: an object directory having a plurality of object records each object record including information pertinent to a respective object selected from a plurality of objects; and a video-content directory having a plurality of overlay directories each overlay directory identifying content of a respective video recording from among a plurality of video recordings, the content exhibiting at least one object from among the plurality of objects. The storage medium holds authoring instructions for composing the overlay directories, each overlay directory comprising relative time instants, with respect to a starting time instant of a respective video signal, at which selected objects appear on a display of the respective video signal. The storage medium further holds an augmented-display tool for displaying a selected video recording and associating the selected video recording with a respective overlay directory. Each overlay directory includes a network address of a video-streaming server providing the respective video recording.

In accordance with another aspect, the present invention provides a server for illustrative video streaming. The server comprises a processor and a storage medium holding: authoring instructions for constructing an overlay directory of a video signal, the overlay directory storing relative time instants, with respect to a starting time instant of the video signal, at which selected objects appear on a display of the video signal; and emissary instructions for establishing two-way communication sessions between the server and an authoring computer acquiring the authoring instructions. The server further comprises a communication module stored in a memory, e.g., in a memory of the server, for performing the following: sending the authoring instructions and the emissary instructions to the authoring computer; and receiving from the authoring computer an identifier of a particular video recording, identifiers of particular objects spotted within a display of a corresponding video signal read from the particular video recording, and an overlay directory of the respective video signal.

The storage medium further holds: an object directory having a plurality of object records each object record storing information pertinent to a respective object selected from a plurality of objects; and a video-content directory having a plurality of overlay directories each overlay directory identifying content of a respective video recording from among a plurality of video recordings, the content exhibiting at least one object from among the plurality of objects.

In accordance with a further aspect, the present invention provides a method of linking content of a video signal to information sources. The method comprises steps of: creating an object directory having a plurality of object records, each object record storing information pertinent to a respective object selected from a plurality of objects; acquiring a plurality of video recordings and a plurality network addresses of sources of the video recordings; creating a video-content directory having a plurality of overlay directories each overlay directory identifying contents of a respective video recording from among the plurality of video recordings, the contents exhibiting at least one object from among the plurality of objects.

The method further comprises steps of: receiving at a server storing the object directory and video-content directory a request from a computer for access to a specific video recording; and upon ascertaining that the specific video recording belongs to the plurality of video recordings, sending from the server to the computer: a network address, from among the plurality of network addresses, providing the specific video recording; and a specific overlay directory, from among the plurality of overlay directories, corresponding to the specific video recording.

In accordance with another aspect, the present invention provides a computer readable medium having stored thereon an authoring tool. The authoring tool is a computer-executable program operable in a host computer to cause the host computer to track objects appearing in a display of a video signal and link the tracked objects to relevant sources. The authoring tool causes the host computer to: produce a visual display of a signal received at the host computer from a video source; determine a pointing time corresponding to a manually selected position within an image of an object within the visual display; determine coordinates of a first spatial contour produced by manually encircling the object within the visual display using a pointing device; and create an overlay directory specific to the signal. An overlay directory indicates a network address of the video source, a description of the selected object, a pointing time instant, and coordinates of a selected position on a display screen.

The authoring tool further causes the host computer to include in the overlay directory information provided by a user of the host computer, the information comprising a description of the selected object; and a list of network sites providing further information on the selected object.

The authoring tool further comprises computer-executable instructions to cause the host computer to: determine a respective pointing time corresponding to a manually selected position within each of successive images of the selected object; determine, for each of the successive appearances, a respective pointing time and coordinates of a respective encircling spatial contour; and append the overlay directory to include the respective pointing time and the coordinates of the respective encircling spatial contour. The authoring tool further comprises computer-executable instructions executed to cause the host computer to link to a video-overlay server to communicate the overlay directory.

In accordance with another aspect, the present invention provides a method for generating an overlay directory for a video signal. The method is performed by a computer connected to a network and comprises steps of: displaying static icons of candidate objects on a screen of the computer; producing a display of the video signal on the screen; and creating a template of the overlay directory.

In response to manually pointing to a position within an object image in the display and to a respective static icon, the method performs steps of: recording a pointing time at which the computer detects the pointing; stopping the display of the video signal at end of a frame of the video signal containing the pointing time; determining coordinates of a spatial contour overlapping the object image using a pointing device; storing manually acquired information including network addresses of sites relevant to the object image; entering the pointing time, coordinates, and manually acquired information in the template at an entry corresponding to the respective static icon; and resuming the display of the video signal.

The method further comprises a step of selecting the spatial contour to encircle the image or selecting a contour, from a set of standardized contours, to overlap the image. The method further comprises steps of: acquiring a global object directory from a video-overlay server; and verifying that the candidate objects belong to the global object directory.

In accordance with a further aspect, the present invention provides a method for generating an overlay directory for a video signal. The method is performed by a computer connected to a network. The method comprises steps of: displaying on a screen of the computer static icons, each associated with an identifier of an object from a set of designated objects; producing a display of the video signal on the screen; and null-initializing tracking records having a one-to-one correspondence to the designated objects.

In response to a user of the computer pointing to a succession of images and corresponding icons relevant to the designated objects, the method performs steps of determining a pointing time and pointing position for each image, and appending the pointing time and pointing position to a tracking record corresponding to each image. For each tracking record having at least one entry, the method performs steps of: determining an object identifier corresponding to each tracking record; receiving further information relevant to the object identifier; and inserting the tracking record and the further information in a section of the overlay directory corresponding to the object identifier.

The method further comprising steps of: determining a frame number of the video signal corresponding to the pointing time, the video signal being organized into frames; and appending the frame number to a respective tracking record.

In accordance with another aspect, the present invention provides a process performed by a computing device for displaying a video signal in response to a request from a viewer of the computing device. The process comprises: communicating to a video-overlay server an identifier of the video signal, where the identifier is provided by the viewer; receiving from the video-overlay server a network address of a video-streaming source providing the video signal and a content directory (overlay directory) of the video signal; requesting and receiving the video signal from the video-streaming source; and producing a current display of the video signal.

In response to the viewer pointing to a specific object on the current display, the process: records a pointing time at which the computing device detects the pointing; and accesses the content directory to retrieve information specific to the pointing time.

To retrieve the information, the process: determines a spatial position corresponding to the pointing time; selects a candidate object from among a set of tracked objects within contents of the video signal, the tracked objects identified in the content directory; extracts two appearance times of the candidate object surrounding the pointing time and corresponding two contours from tracking records stored in the content directory during a prior display of the video signal; ascertains inclusion of the spatial position within a selected contour from the two contours; and where the inclusion is determined, assigns a specific identifier of the specific object as an identifier of the candidate object. If the spatial position is outside the two contours, an interpolated contour corresponding to the pointing time is computed. If the spatial position is included within the interpolated contour, a specific identifier of the specific object is assigned as an identifier of the candidate object.

The process further comprises: displaying a description corresponding to the specific identifier, the description extracted from a list of descriptions of the tracked objects included in the content directory; extracting, from the content directory, a subset of network addresses corresponding to the specific identifier; and establishing a link to at least one network address listed in the subset of network addresses. Additionally, the process comprises: storing, in a storage medium of the computing device, a description corresponding to the specific identifier, the description extracted from a list of descriptions of the tracked objects included in the content directory; extracting, from the content directory, a subset of network addresses corresponding to the specific identifier; and storing, in the storage medium, the subset of network addresses.

The process further comprises: interrupting the current display during a time interval following detection of the pointing; adding the time interval to a summation of interruption time, the summation initialized to zero at a starting instant of the current display; and determining the pointing time as a time indication derived from a clock of the computing device minus the starting instant of the current display minus the summation.

In accordance with another aspect, the present invention provides a computer readable medium having stored thereon an augmented display tool. The augmented display tool is a computer-executable program operable in a host computer to cause the host computer to: receive a request from a viewer to display a video signal; forward the request to a video-overlay server; receive from the video-overlay server a network address of a video-streaming source providing the video signal and a content directory (overlay directory) of the video signal, the content directory comprising presence times of selected contents of the video signal and network addresses of sources of information relevant to the selected contents; request and receive the video signal from the video-streaming source; display the video signal on a display device controlled by the host computer; detect pointing times at which the viewer points to a particular displayed object; and compare the pointing times to the presence times to find a counterpart content, in the selected contents, to the particular displayed object. If the counterpart is found, a subset of the network addresses corresponding to the counterpart content is extracted.

The computer readable medium further stores computer-executable instructions which causes the host computer to: sort the presence times according to contents and group presence times of each content into sets of presence times, each set contained within a video-frame period; determine spatial contours corresponding to the sets of presence times; determine a respective spatial position for each of the pointing times; determine inclusion of the respective spatial position within one of the contours; determine an interpolated spatial contour, between two spatial counters, corresponding to a pointing time.

In accordance with a further aspect, the present invention provides a method performed by a computer for retrieving information relevant to objects appearing in a display of a video signal in response to a user of the computer requesting the video signal. The method comprises: acquiring a content directory (overlay directory) of the video signal from a video-overlay server, the content directory storing content information relevant to a set of tracked objects; acquiring the video signal from a video source; starting the display of the video signal; and recording a time measurement and spatial coordinates of each selected point of a number of selected points on the display identified by a pointing device controlled by the user. Upon termination of the display, the following steps are performed: finding an object identifier in the content directory of an object, from among the set of tracked objects, corresponding to each selected point using the time measurement and spatial coordinates; and where the object identifier is found, storing a record comprising the object identifier and the time measurement in a cache memory of the computer.

BRIEF DESCRIPTION OF THE DRAWINGS

Embodiments of the present invention will be further described with reference to the accompanying exemplary drawings, in which:

FIG. 9 illustrates an exemplary global object directory created by the video-overlay server in accordance with an embodiment of the present invention;

FIG. 12 illustrates preset boundaries overlapping an object image appearing in different sizes at different frames in a video display, for use in an embodiment of the present invention;

FIG. 15 details an overlay directory comprising multiple records each corresponding to a tracked object image with adaptive boundaries, in accordance with an embodiment of the present invention;

FIG. 40 illustrates an object tracking process considered in the software implementation of FIG. 27 in accordance with an embodiment of the present invention;

DETAILED DESCRIPTION

Terminology

Figure 1:
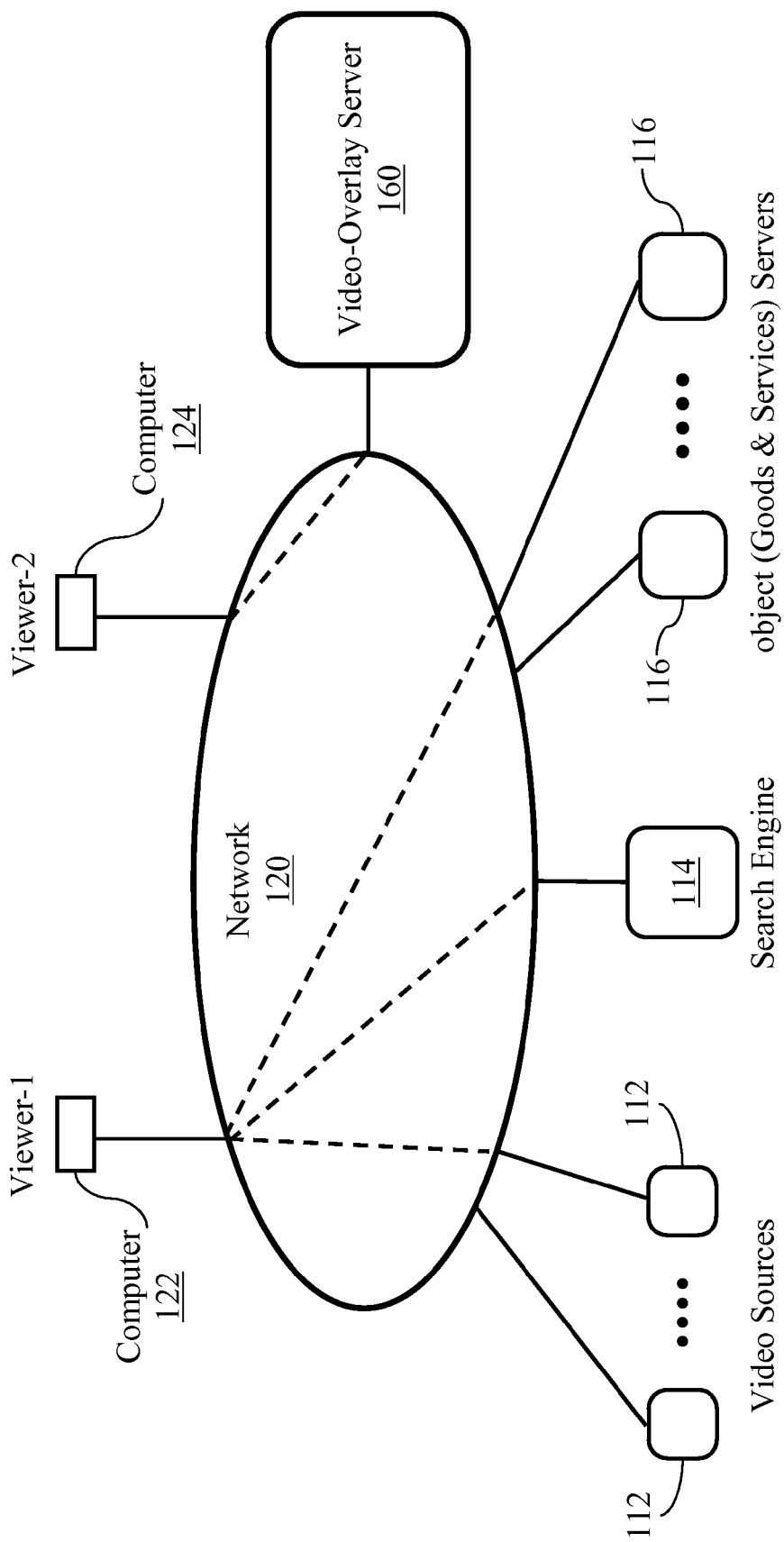
FIG. 1 illustrates a system for acquiring information relevant to objects viewed in a display of a video signal through a video-overlay server in accordance with an embodiment of the present invention.

Video source: A server computer providing video recordings or streaming video signals, also being referenced as a video server.

Object server: A server computer providing information relevant to specific objects, also being referenced as an object server. An object may be a product or a service, in which case the object server may be referenced as a product server. In the present application, the terms object server and product server may be used interchangeably and are assigned the same reference numeral 116.

Authoring computer: A computer acquiring a specific "authoring tool" (a set of computer executable instructions) from a video-overlay server (also called overlay server) is referenced as an authoring computer.

Viewing computer: A computer acquiring a specific viewing tool (a set of computer executable instructions) called an "augmented display tool" from the video-overlay server is called a viewing computer. A computing device may function as both an authoring computer and a viewing computer if both the authoring tool and the augmented display tool are installed thereon.

Object record: An object record, stored in a computer readable medium, which contains information pertinent to a respective object such as an identifier, an image (icon), a title, description, and network addresses of servers providing more detailed information relevant to the object. If the object is a product, a respective object record (product record) may serve as advertising material.

FIG. 1 illustrates a system for acquisition of information pertinent to displayed objects in a video display. The system comprises video sources 112, each providing video signals to viewers through a network 120, a search engine 114 stored in a computer readable medium, and object servers 116, each providing information related to respective objects. An object may be a merchandise item, such as an industrial or agricultural product, as well as services such as appliance repairs.

A first viewer using a computing device 122 having a display screen and equipped with conventional display software accesses one of the video sources 112 to receive a video signal. The viewer may get further information regarding a displayed object in the displayed video signal, by accessing search engine 114, to get general information, such as nutritious value of an edible product or a consumer report on a product, and an object server 116 which may provide product pricing and ordering information.

A second viewer using a computing device 124, in accordance with an embodiment of the present invention, having a display screen, accesses a video-overlay server 160 (also referenced as overlay server 160 for brevity) to receive a video signal. The overlay server 160 comprises a processor and a computer readable medium for storing thereon various software instructions as will be described in detail below. The video-overlay server 160 responds by providing computer 124 with necessary software to enable computer 124 to access a proper video source 112 and to get information on a displayed object by simply pointing at the object ("clicking the object") using a pointing device.

Figure 2:
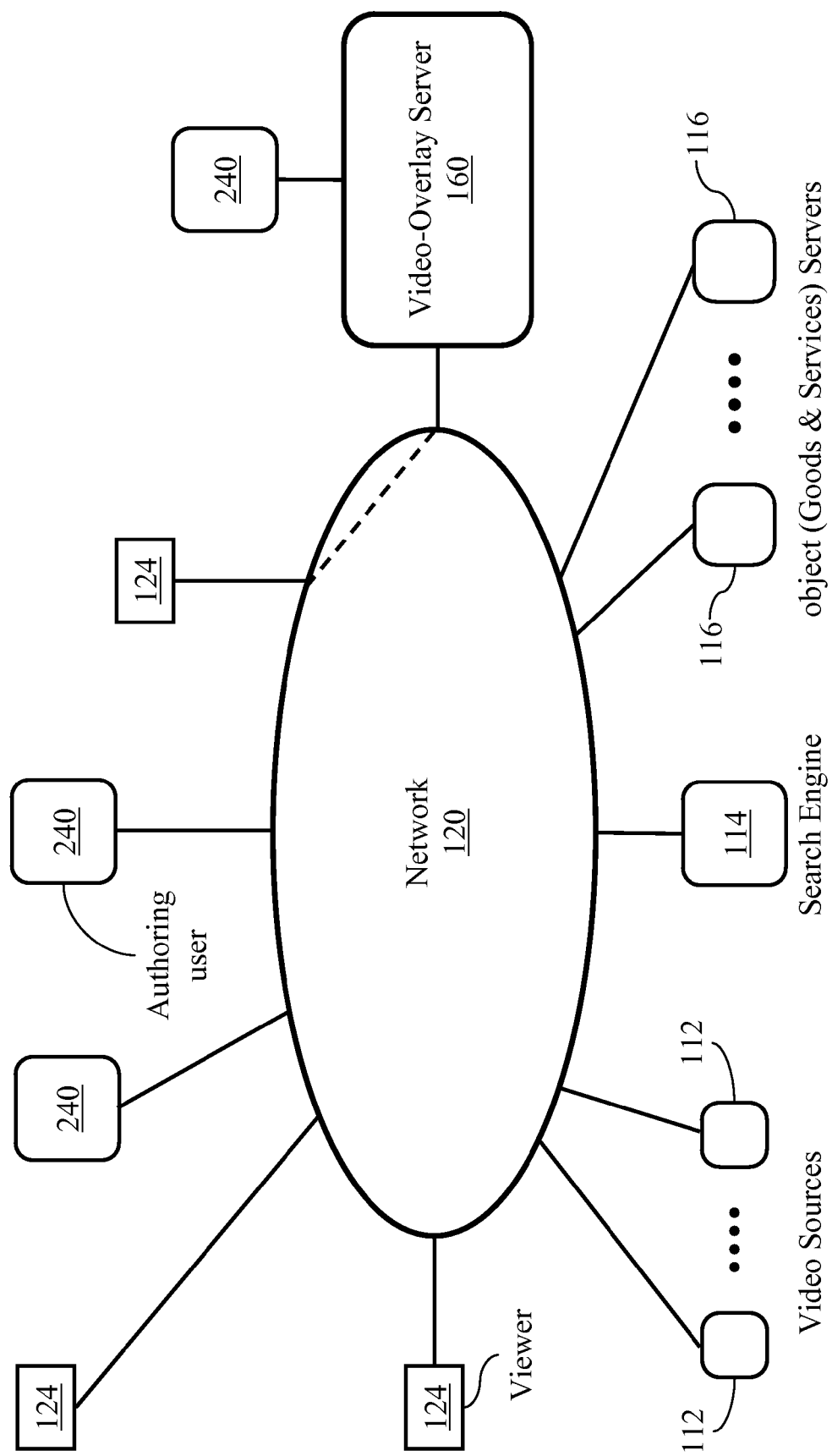
FIG. 2 illustrates the system of FIG. 1 connecting to a plurality of authoring computers, a plurality of video sources, a plurality of viewing computers, a search engine, and a plurality of object servers in accordance with an embodiment of the present invention.

FIG. 2 illustrates system of FIG. 1, as viewed by the second viewer, in further detail. The video-overlay server 160 may support concurrent sessions of viewers using computer devices 124. A plurality of authoring computers 240 contribute to constructing and updating a video-overlay database installed in the computer readable medium of the video-overlay server 160. Video-server 160 may be directly connected to authoring computers 240, one of which being illustrated in FIG. 2. Other authoring computers 240 may access the video-overlay server through network 120. An authoring computer 240 is a general-purpose computer or a special-purpose computer, which is loaded with an authoring software tool provided by video-overlay server 160, the authoring software tool being stored in a computer readable medium. Several authoring computers 240 may function concurrently to populate the video-overlay database supported by video-overlay server 160.

Process Overview

Figure 3:
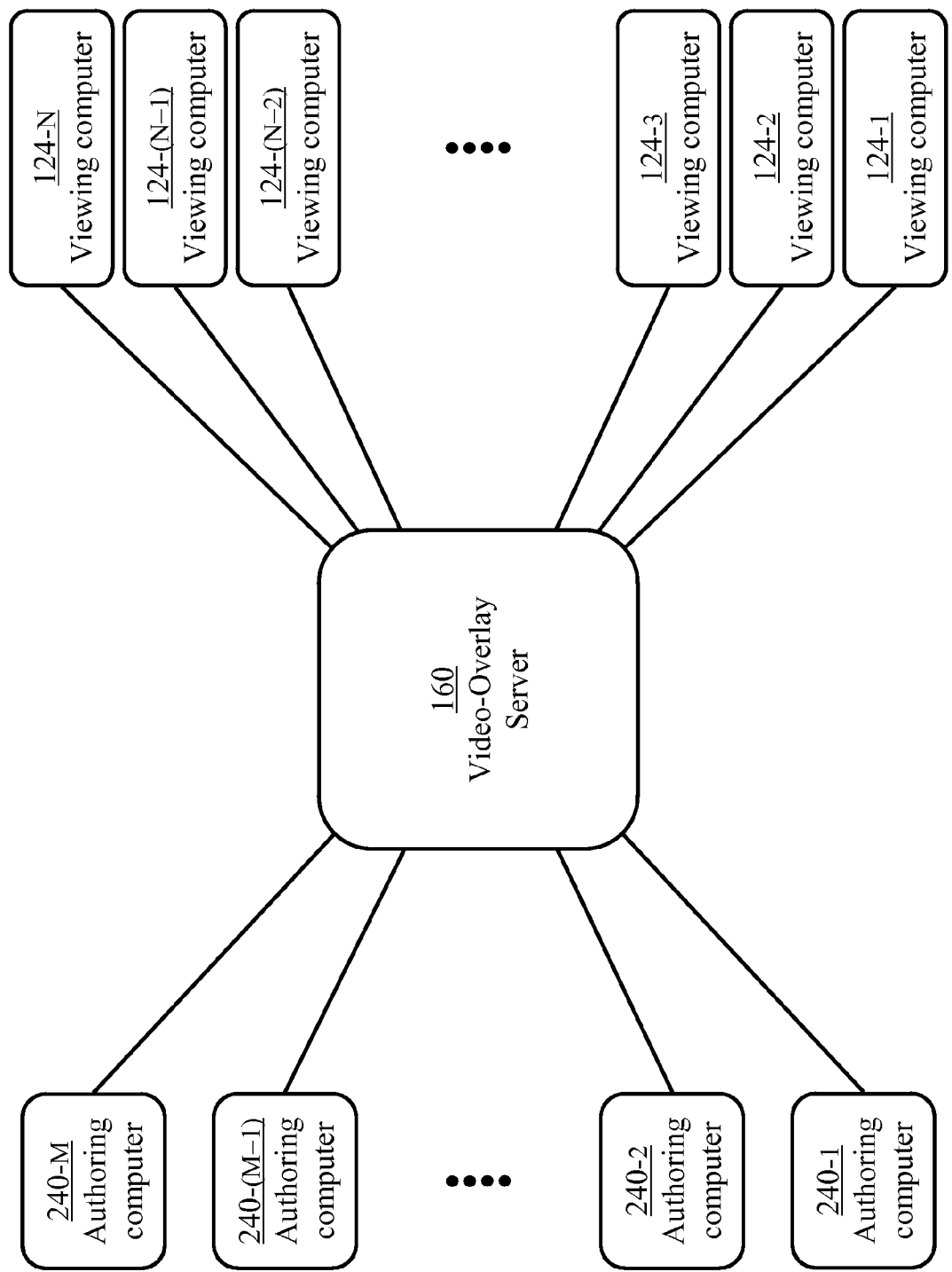
FIG. 3 illustrates a video-overlay server receiving video-overlay data from a plurality of authoring computers and providing the video-overlay data to a plurality of viewing computers in accordance with an embodiment of the present invention.

FIG. 3 illustrates the system of FIG. 2 with a focus on the connectivity of video-overlay server 160 to a number, $M \geq 1$, of authoring computers 240, individually identified as 240-1 to 240-M, and a number, $N \geq 1$, of viewing computers individually identified as 124-1 to 124-N.

Figure 4:
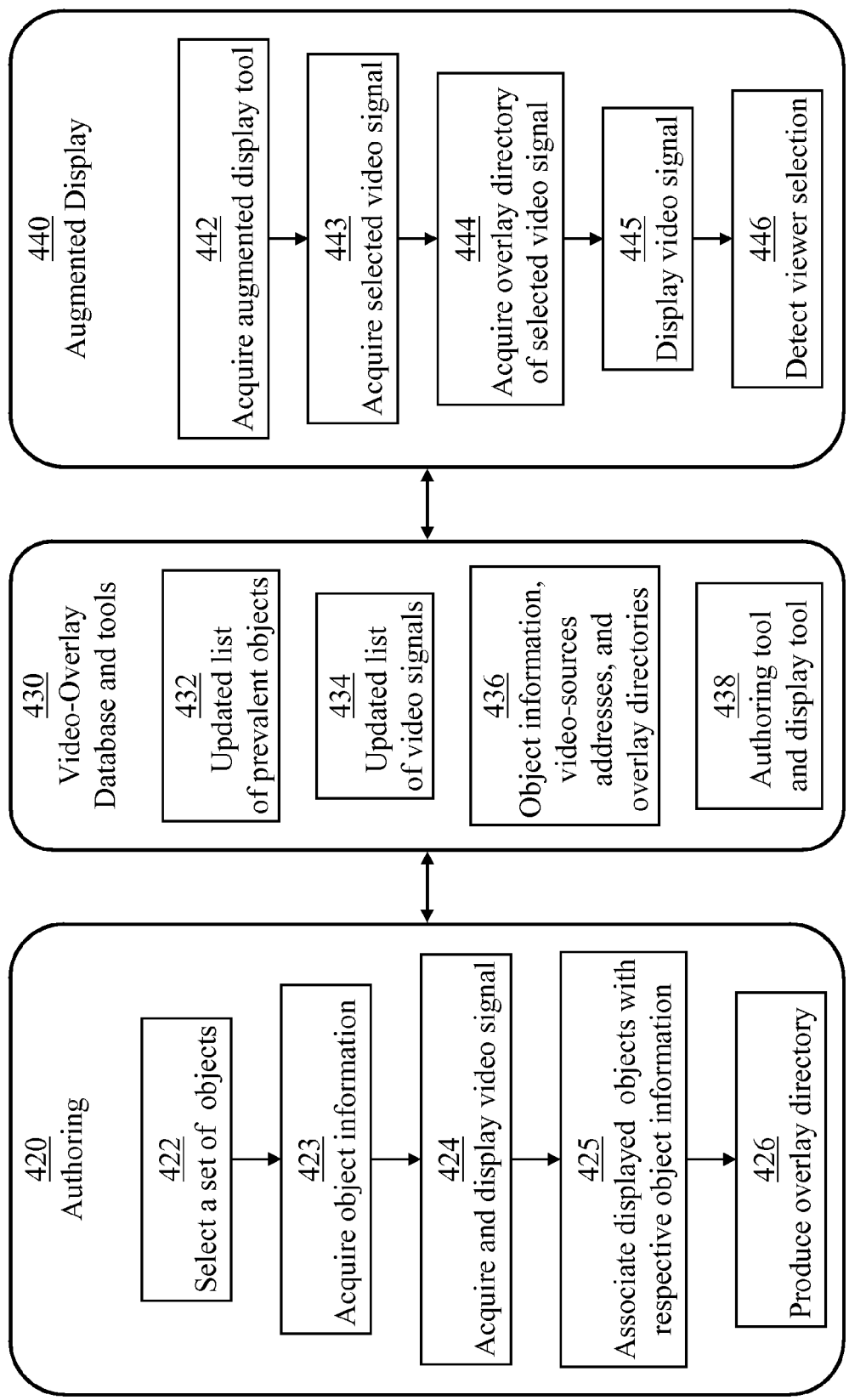
FIG. 4 illustrates basic processes performed at an authoring computer, the video-overlay server, and a viewing computer in accordance with an embodiment of the present invention.

FIG. 4 illustrates two basic processes, authoring 420 and augmented display process 440, of the system of FIG. 2. The authoring process 420 partly creates the video-overlay database 430 using a number of authoring computers 240. In step 422, a user of an authoring computer 240 acquires an authoring tool from video-overlay server 160 and selects a set of objects (goods or services) to track during viewing a visual display of a video signal. The selected set of objects may be defined after a precursor viewing of video recordings of interest. Alternatively, the selected set may be extracted from a global set of popular objects held in the video-overlay database 430. In step 423, the user of the authoring computer 240 acquires information relevant to each of the objects, in the selected set of objects, through search engine 114 and selected object servers 116. The information may include images, descriptions, and network addresses of other servers providing relevant information. In step 424, the user of authoring computer 240 selects a video signal and finds a network address of a video source 112 providing the video signal. The user acquires and displays the video signal and points to selected displayed objects, from among the selected set of objects, using a pointing device. In step 426, the authoring tool installed in a memory of the authoring computer 240 is activated to produce an overlay directory for the video-signal under consideration.

The video-overlay database 430 is stored in the computer readable medium of the overlay server 160 and is maintained by the overlay server 160. It contains a list 432 of desirable objects, and a list 434 of video signals for which corresponding overlay directories are stored in the computer readable medium. A section 436 of the database 430 contains information relevant to each object in list 432 and each video signal in list 434. The video-overlay server 160 also comprises a set of software tools 438, including an authoring tool, a display tool, and emissary instructions for establishing two-way communication sessions between the overlay server and other external computers, collectively labeled as 438 in FIG. 4.

The augmented-display process 440 starts with acquiring an augmented-display tool from video-overlay server 160 (step 442). A viewer, using a computer 124 sends a request to video-overlay server 160 to acquire a specific video signal. The video signal may be identified by a title or a serial number of a corresponding video recording. The overlay server 160 responds with a network address of an appropriate video source 112 (step 443). The augmented-display tool communicates with video-overlay server 160 to acquire an overlay directory corresponding to the video signal (step 444) and communicates with the appropriate video source 112 to acquire the video signal. The viewing computer displays the video signal (step 445) and detects viewer selections (step 446). The augmented-display tool selects a start time for displaying the video signal, detects the viewer's selection of displayed objects, and retrieves respective information from the video-overlay server 160 and, where necessary, from object servers 112.

Video-Overlay Server

Figure 5:
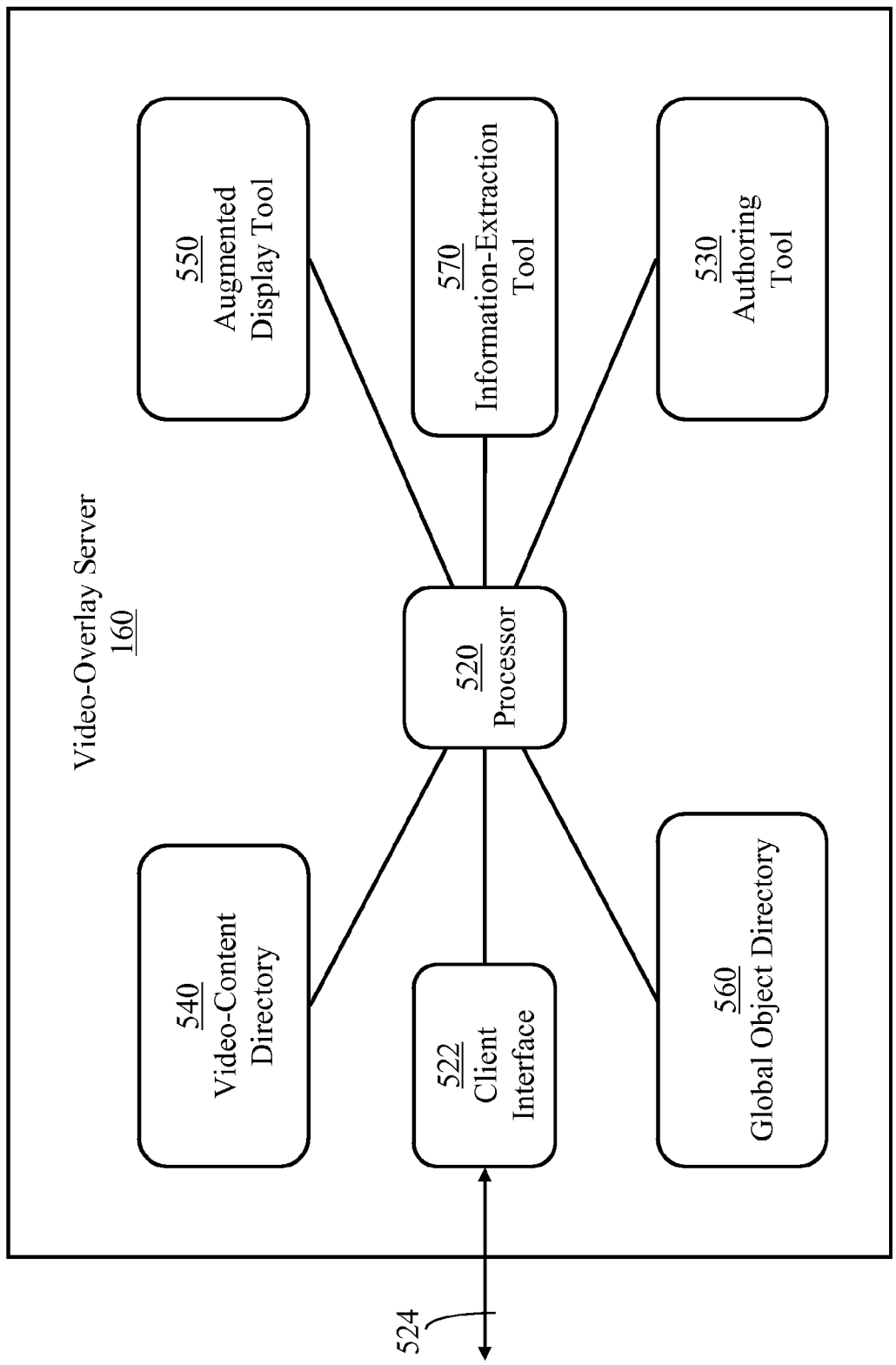
FIG. 5 illustrates a video-overlay server storing an authoring tool, an augmented-display tool, a video-content directory, and a global object directory in accordance with an embodiment of the present invention.

FIG. 5 illustrates components of a video-overlay server 160. The video-overlay server 160 comprises at least one processor 520 (only one is indicated), an authoring tool 530 and an augmented-display tool 550 stored in a computer readable medium accessed by the overlay server 160. A client interface module 522, also stored in the computer readable medium of the overlay server 160, manages communication, over a multiplexed link 524, between processor 520 and clients which include both authoring computers 240-1 to 240-M and viewing computers 124-1 to 124-N.

Overlay server 160 receives overlay directories from authoring computers 240 and adds them to overlay database 430. A received overlay directory comprises both object-tracking data and associated object information. Overlay directories (also called content directories) received from authoring computers 240 are appended to a video-content directory 540. All directories are stored in a computer readable medium accessed by the overlay server 160. A video signal may display several objects and a given object may be common in many video signals. Therefore, to reduce the search effort in the authoring process, object information received from the authoring computers are assembled in an object directory 560, also stored in a computer readable medium of accessed by the overlay server 160.

Figure 6:
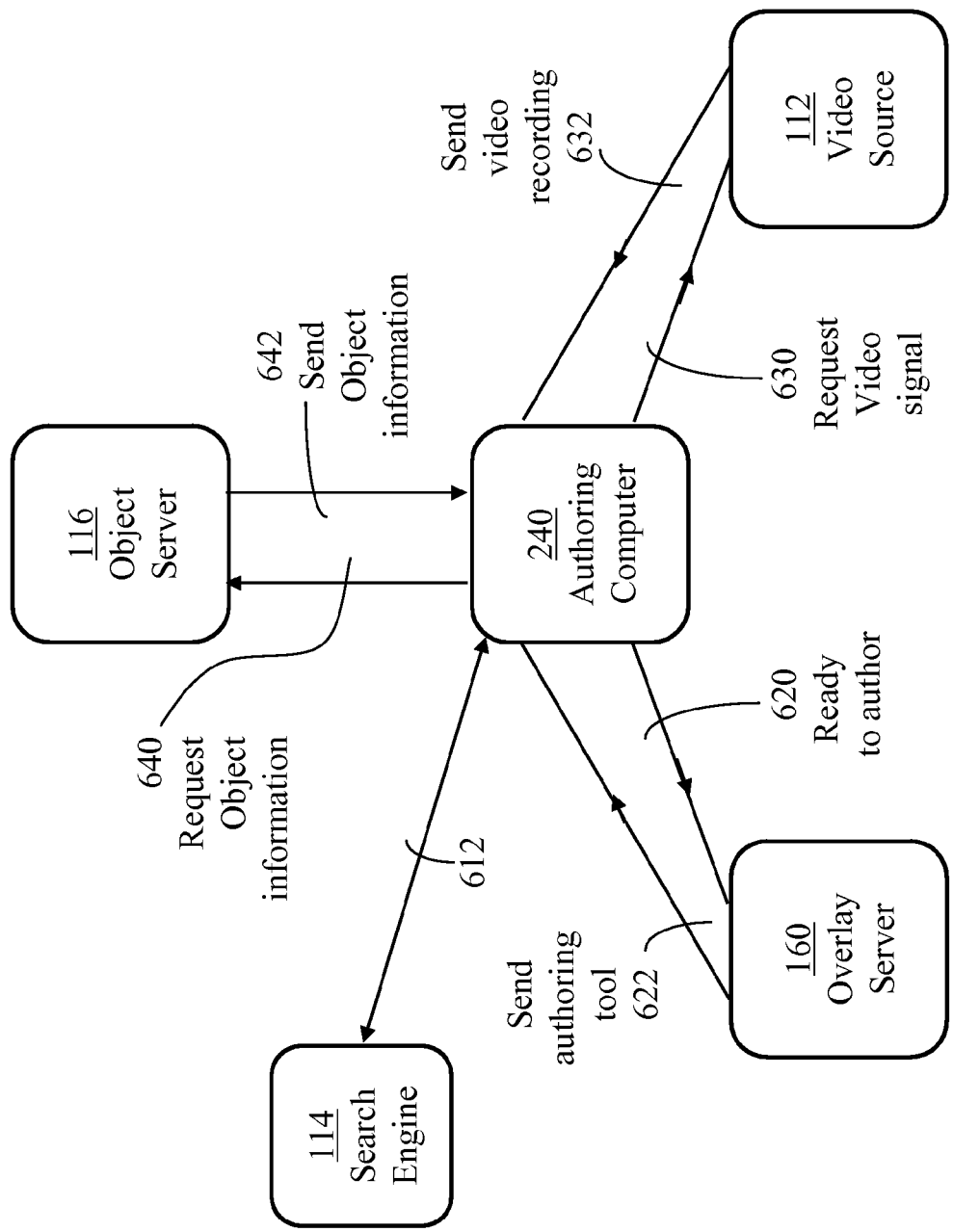
FIG. 6 illustrates interaction of an authoring computer with a video-overlay server, video sources, and an object server in accordance with an embodiment of the present invention.

FIG. 6 illustrates interaction of an authoring computer 240 with other system components in an authoring process. The authoring computer 240, prompted by a user (author), communicates with the overlay server through a connection 620 to request starting an authoring process. Connection 620 may be a direct connection or a connection through network 120. The overlay server 160 responds by sending an authoring tool through a connection 622. The authoring computer then gets an identifier of a selected video recording to be authored and an address of a video source 112 providing the selected video recording. The identifier may be a title or a serial number of the video recording. The video recording may be selected by the user of the authoring computer or provided by the overlay server. The address of the video source 112 may be provided by the user or the overlay server 160. The authoring computer sends a request, through a connection 630, to the video source 112 and receives the requested video recording through a connection 632. The user of authoring computer 240 may access a search engine 114, through a connection 612, to acquire information relevant to a set of objects of interest. The user may also obtain network addresses of servers 116 providing further information on the objects of interest. The objects may include products, services, or educational material.

The authoring computer accesses a server 116 through a connection 640 to request object information, and the object server 116 sends the requested information through a connection 642. The authoring computer may extract specific information content, subject to contractual agreements, and send the extracted content to the overlay server 160 for inclusion in the global object directory (described with reference to FIG. 5) maintained by the overlay server 160. The user of authoring computer 240 may annotate extracted content before sending the content to the overlay server 160.

Figure 7:
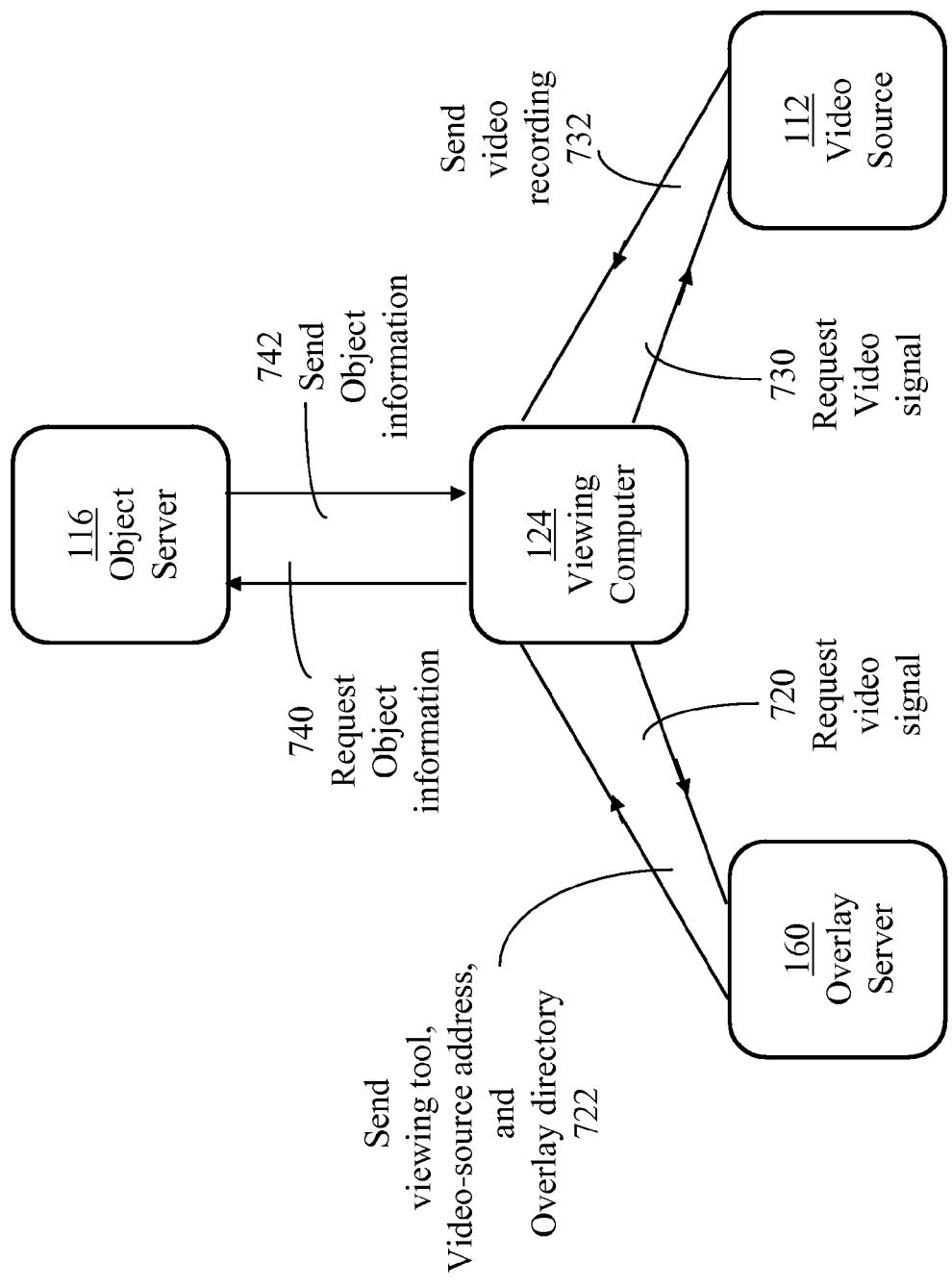
FIG. 7 illustrates interaction of a viewing computer with a video-overlay server, video sources, and an object server in accordance with an embodiment of the present invention.

FIG. 7 illustrates interaction of a viewing computer 124 with other system components in a viewing process. The viewing computer 124, prompted by a user (a viewer), sends a request through a connection 720 to receive a video recording (video signal). The overlay server 160 responds by sending, through a connection 722, (1) an augmented display tool, (2) a network address of a video source 112 providing the requested video recording, and (3) an overlay directory associated with the requested video recording. The viewing computer 124 sends a request, through a connection 730, to video source 112 to receive the video recording. The video source responds by sending the video recording through a connection 732. The viewing computer 124 displays the video recording using the augmented display tool. The viewer may point to objects appearing in the display, using a pointing device such as a "mouse", to indicate interest in further information relevant to the object. The augmented display tool determines a time instant, at which the viewing computer detects a viewer's selection, and position on a display screen of a selected object. The augmented display tool operates in either of two modes. In a first mode, the viewer points to objects in a continuous display and gets information relevant to the selected objects in a separate session. In a second mode, the display is interrupted when the viewer points to an object and is resumed after acquiring and displaying information relevant to the object.

The augmented display tool instructs the viewing computer 124 to acquire basic object information from the global object directory maintained by video server 160. The basic information may also include network addresses of a number of object servers 116 providing further details. To acquire further detailed information, as prompted by the viewer, the augmented display tool instructs the viewing computer 124 to link to an object server 116 selected by the viewer from the number of object servers determined from the global object directory. The viewing computer 124 establishes a connection 740 to the selected object server 116 and receives detailed object information from the object server 116 through a connection 742.

Authoring Process

Figure 8:
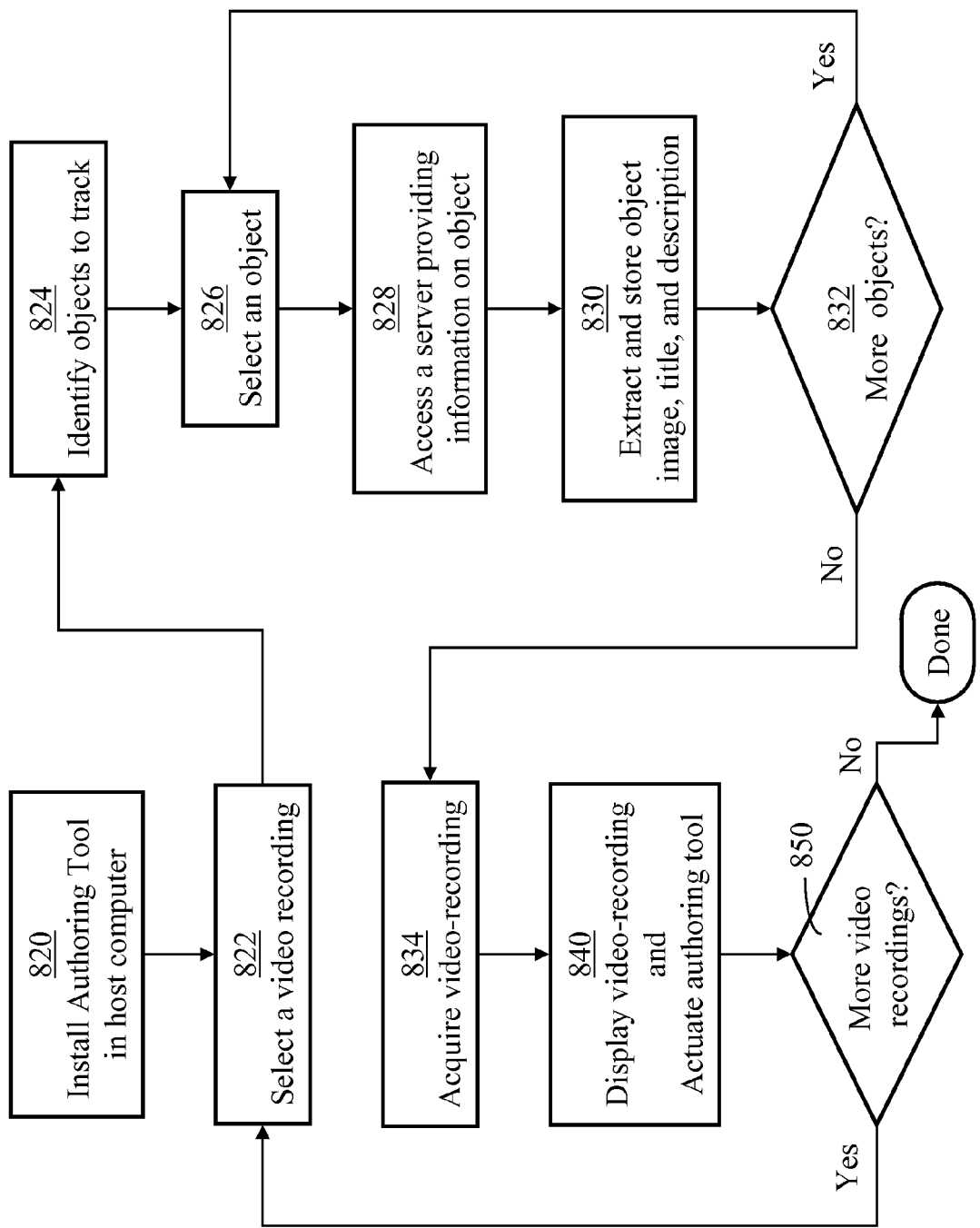
FIG. 8 further details an authoring process outlined in FIG. 4 in accordance with an embodiment of the present invention.

FIG. 8 illustrates a process of authoring implemented by an authoring computer 240 during an authoring session. The process starts by installing authoring tool 530 in the authoring computer (step 820). A user of the authoring computer 240 selects a video signal (step 822) either from a list, obtained from overlay server 160, of candidate video signals (not illustrated) or according to the user's own search effort. The user further identifies objects to track (step 824) which may be selected from list 432 stored in overlay database 430. The user selects an object (step 826) and determines an object server 116 providing relevant information. A network address of the object server may be readily available in global object directory 560. In step 828, the user accesses the object server and extracts information (step 830) such as an image, title, and description of the object. When it is determined in step 832 that all objects identified in step 824 have been considered, the user (author) is ready to create an overlay of the video signal. The video signal is acquired (step 834) from a respective video source 112 and displayed on a screen associated with the authoring computer (step 840). The authoring tool 530 creates an overlay directory of the video signal under consideration based on the user's selections of displayed objects as will be described below. If the user intends, in step 850, to create an overlay directory for another video signal, step 822 is revisited and followed by steps 824 to 850. Otherwise, the authoring session is complete.

Object Directory

FIG. 9 illustrates a global object directory 560 stored in a computer readable medium accessed by the overlay server 160, which provides object information for each object in a list of selected objects considered for advertising or further illustration. The list of selected objects may be created independently of the authoring process or created during authoring processes performed by users of authoring computers 240. The object information comprises an object identifier 912, an object image 914, an object description 916, and a set 918 of network addresses of sites providing further information of a respective object. Other object descriptors may be added. The directory 560 of FIG. 9 covers 8191 objects. It is contemplated that a display of a specific video signal may include a much smaller number of objects which may be extracted from global directory 560.

Object-Tracking Data

During an authoring session, a user of an authoring computer 240 starts a display of a video signal and activates an authoring tool to track a number of objects. A new overlay directory (content directory) is created for the video signal. The user points to an object using a pointing device (i.e., clicks on an image of the object on a screen with the pointing device). The authoring tool captures the time of pointing from a time indicator of the authoring computer and stops the display at the end of a current video frame. The user may encircle the object to define its spatial boundaries and may extract information relevant to the tracked object from a variety of sources. The authoring tool then resumes the display of the video signal and captures the time of display-restart from the time indicator of the authoring computer 240.

The authoring tool calculates the pointing time, of the selected point on the screen to which the user pointed, relative to the start time of the video-signal display. The pointing time entered in the overlay record is the time of appearance of the selected point in a continuous (uninterrupted) display of the video signal. When an object is selected (clicked) for the first time after the start of a display, the pointing time determined according to the computer time indicator is entered in the overlay directory (content directory). The authoring tool accumulates display-interruption time and, for each subsequent selection (clicking) of the tracked object during the session, subtracts the accumulated interruption time from the respective pointing time indicated by the time indicator of the authoring computer.

Figure 10:
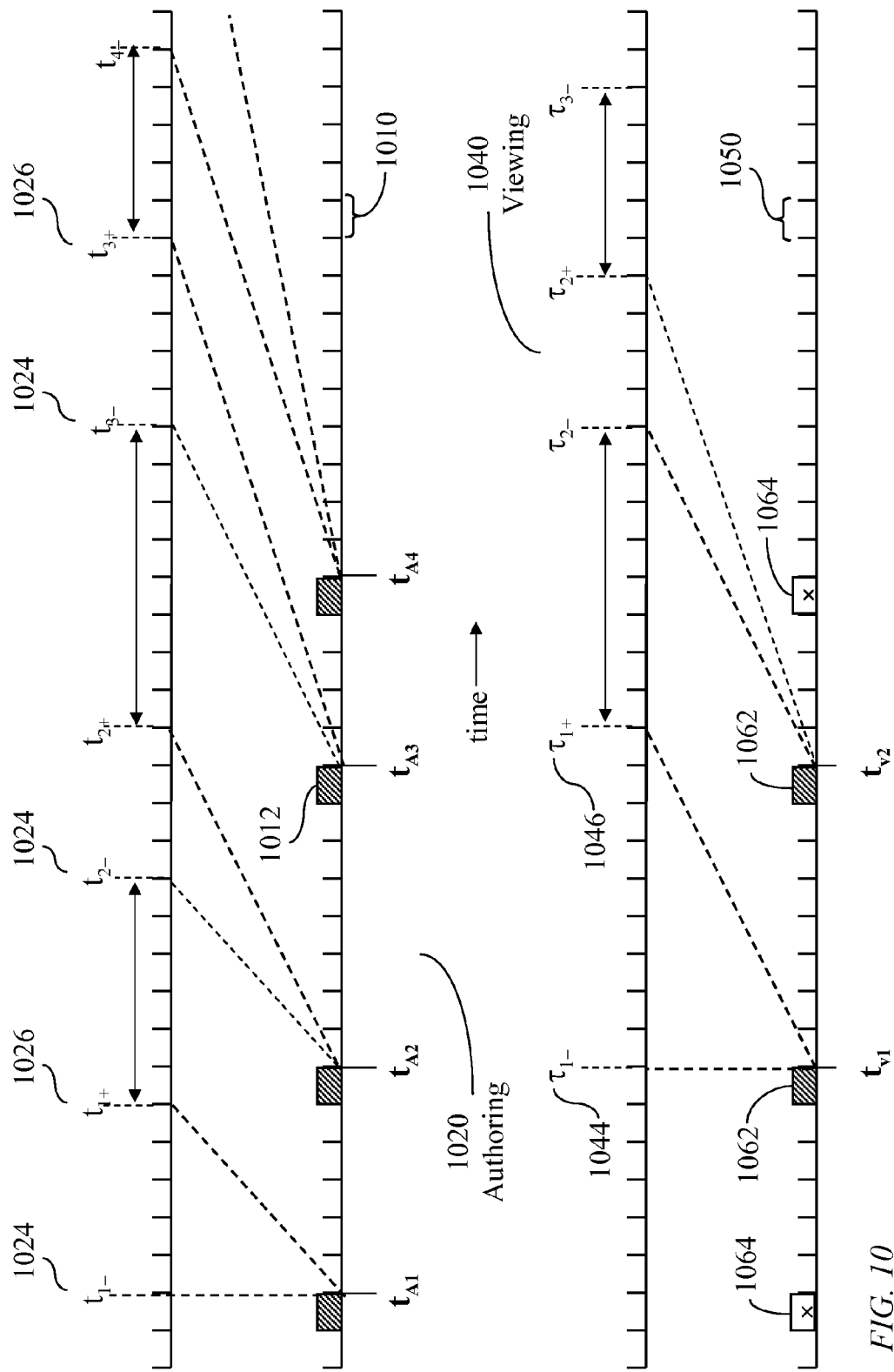
FIG. 10 illustrates time tracking during an authoring process where video-display is interrupted to associate illustrative data with an object image and during a viewing process where video-display is interrupted to associate an object image with respective illustrative data in accordance with an embodiment of the present invention.

FIG. 10 illustrates timing of a tracked object in an authoring process 820. The time domain is organized into time frames, each time frame corresponding to a frame of the video signal. The display start time is determined from the authoring-computer time indicator. When a user selects an object using a pointing device, the authoring tool 530, installed in the authoring computer 240, stops the display and a current video-signal frame is displayed repeatedly until the user resumes the display. In FIG. 10, the stopping times are referenced as 1024, the start times are referenced as 1026. The time frames during which authoring processes are carried out are referenced as 812 and each other time frame is referenced as 810. In a first selection of the tracked object, the display is stopped at time $t_{1-}$ which corresponds to an end of a current frame and resumed at time $t_{1+}$. The authoring tool enters the pointing time, $t_{41}$, determined from the computer time indication after subtracting the display start time, in a record corresponding to the tracked object in the overlay directory (content directory) of the video signal. The accumulated interruption time is now $(t_{1+}-t_{1-})$.

In a second selection of the tracked object, the display is stopped at time $t_{2-}$ and resumed at $t_{2+}$. The authoring tool enters the pointing time, $t_{42}$, determined from the computer time indication, after subtracting the start time and the interruption time interval $(t_{1+}-t_{1-})$, in the record corresponding to the tracked object in the overlay directory. The accumulated interruption time is now $(t_{1+}-t_{1-})+(t_{2+}-t_{2-})$.

In a third selection of the tracked object, the display is stopped at time $t_{3-}$ and resumed at $t_{3+}$. The authoring tool enters the pointing time, $t_{43}$, determined from the computer time indication, after subtracting the start time and the accumulated interruption time $(t_{1+}-t_{1-})+(t_{2+}-t_{2-})$, in the record corresponding to the tracked object in the overlay directory. The accumulated interruption time is now $(t_{1+}-t_{1-})+(t_{2+}-t_{2-})+(t_{1+}-t_{1-})$ In a display of the video signal in a viewing session 840 in a viewing computer 124, the time domain is organized into time frames, each time frame 850 corresponding to a frame of the video signal. The duration of a time frame 850 may differ slightly from the duration of a time frame 810 because the clock of an authoring computer is not phase-locked to the clock of the viewing computer. This, however, is inconsequential because time is measured as a count of clock periods in a respective computer.

The viewing display start time is determined from the viewing-computer time indicator. When a viewer selects an object using a pointing device, the augmented-display tool stops the display and a current video-signal frame is displayed repeatedly until the viewer resumes the display. The viewing stopping times are referenced as 844 and the start times are referenced as 846. The viewer may select some of the appearances of the tracked object. In the illustrated example, the time frames during which the viewer selects a tracked object are referenced as 862 and the time frames, encompassing the tracked object, during which the viewer does not select the tracked object are referenced as 864.

In a first selection of the tracked object, the display is stopped at time $\tau_{1-}$ which corresponds to an end of a current frame and resumed at time $\tau_1^+$. The augmented-display tool 550, installed in the viewing computer 124, uses the pointing time, $t_{v1}$, determined from the viewing-computer time indication after subtracting the start time, to retrieve information relative to the tracked object from the overlay directory. The accumulated interruption time is now $(\tau_{1+}-\tau_{1-})$.

In a second selection of the tracked object, the display is stopped at time $\tau_{2-}$ and resumed at $\tau_{2+}$. The augmented-display tool uses the pointing time, $t_{v2}$, determined from the viewing-computer time indication, after subtracting the start time and the interruption time interval $(\tau_{1+}-\tau_{1-})$, to retrieve information relevant to the tracked object from the overlay directory. The accumulated interruption time is now $(\tau_{1+}-\tau_{1-})+(\tau_{2+}-\tau_{2-})$.

Notably, a viewer is likely to select a given object only a small number of times. However, the authoring process may capture numerous appearances of the object to facilitate identifying the object.

Figure 11:
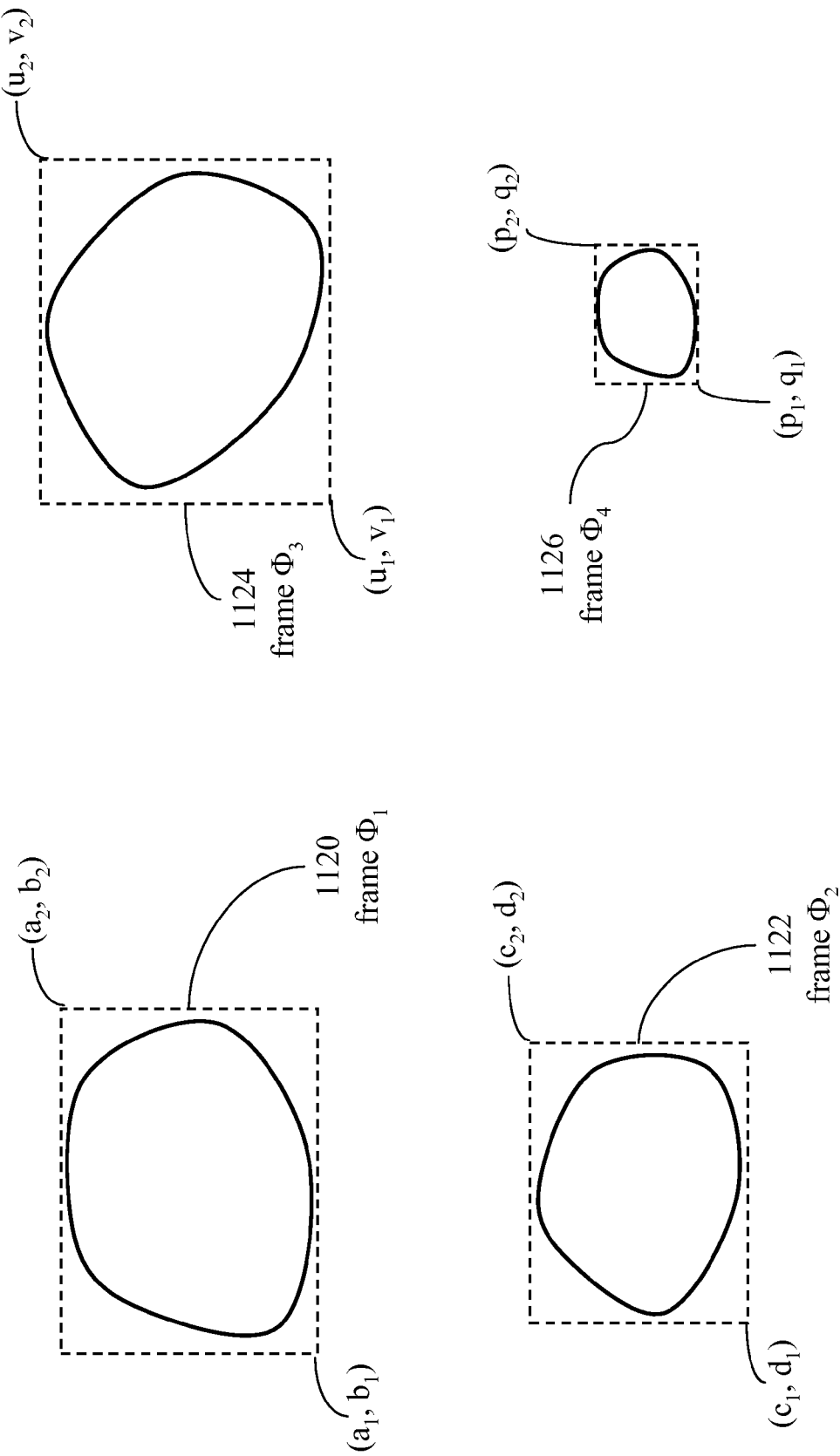
FIG. 11 illustrates adaptive boundaries encircling an object image appearing in different sizes at different frames in a video display, for use in an embodiment of the present invention.

FIG. 11 illustrates images of an object appearing in four frames, significantly distant from each other, in a display of a video signal in an authoring computer 240. The object appears in different sizes and angular displacements, as typically observed in tracking a moving object. In frame $\Phi_1$, the object is bounded by a rectangle 1120 defined by diagonal points of coordinates $(a_1, b_1)$ and $(a_2, b_2)$. In frame $\Phi_2, \Phi_3$, and $\Phi_4$, the object is bounded by rectangles 1122, 1124, and 1126, defined by diagonal points of coordinates $\{(c_1, d_1), (c_2, d_2)\}$, $\{(u_1, v_1), (u_2, v_2)\}$, and $(p_1, q_1), (p_2, q_2)\}$, respectively. The contour enclosing an image of the object is selected to be rectangular for ease of reproducing at a viewing computer 124. Other contours, of circular or elliptic shapes for example, or contours approximating the actual shape of an object, may also be used.

The coordinates $(a_1, b_1)$ are uniquely defined by a time instant within frame $\Phi 1$ at which the first diagonal point appears in the display, and the coordinates $(a_2, b_2)$ of the second diagonal point are uniquely defined by a time instant within frame $\Phi_1$. Likewise, the coordinates of each point in frames $\Phi_2, \Phi_3$, and $\Phi_4$ are uniquely defined by a time instant within a respective frame. Thus, in a first representation, the image of the object may be defined by a frame number and two time instants within a frame period. For example, contour 1120 may be defined by $\{\Phi_1, t_1, \text{and } t_2\}$, where $t_1$ and $t_2$ are the instants of time within frame $\Phi_1$ corresponding to the display of the two diagonal points. In a second representation of the same contour, the image may be defined by a frame number, and four numbers indicating two diagonal points. Thus, contour 1120 may be represented by $\{\Phi_1, a_1, b_1, c_1, d_1\}$. In a third representation of the same contour, the image may be defined by four numbers indicating two diagonal points and the pointing instant of time at which a user of the authoring computer selects (clicks on) a specific point within the image of the object. Thus, contour 1120 may be represented by $\{t^*, a_1, b_1, c_1, d_1\}$, where $t^*$ is the time of selecting (clicking on) the specific point relative to the starting time of display of the video signal at any computer (an authoring computer 240 or a viewing computer 124).

FIG. 12 illustrates the images of FIG. 11 with contours (1220, 1222, 1224, and 1226) of identical shapes and sizes encircling a selected point of each image selection. Each contour overlaps, but may not encircle, an object image appearing in different sizes at different frames in a video display.

Figure 13:
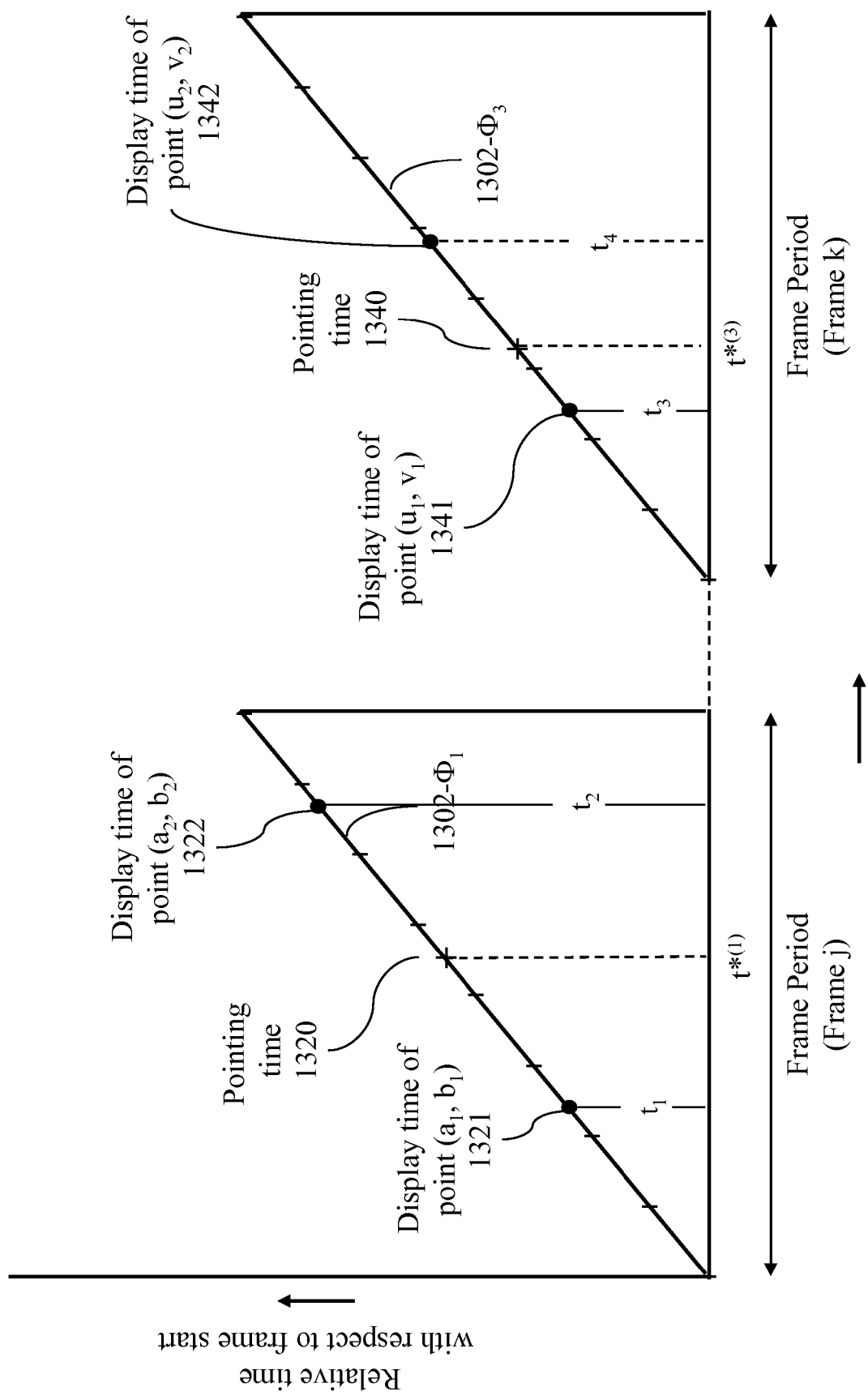
FIG. 13 illustrates display time instants corresponding to display coordinates of an object image appearing in two frames in a display of a video signal, for use in an embodiment of the present invention

FIG. 13 maps two images of the object of FIG. 11, spatially defined by contours 1120 and 1124, onto the time domain. The abscissa in FIG. 13 indicates time, relative to a starting time of display of a video signal in a computer, and the ordinate represents time with respect to the starting time of a frame. Thus, the slope of line 1002-$\Phi_1$, or line 1002-$\Phi_3$, is 1. The pointing time $t^{*(1)}$ within frame $\Phi 1$ identifies frame $\Phi 1$, and pointing time $t^{*(3)}$ within frame $\Phi_3$ identifies frame $\Phi_3$, in a future display of the video signal. The intra-frame time instants $t_1$ and $t_2$ correspond to diagonal points $(a_1, b_1)$ and $(a_2, b_2)$ respectively, and intra-frame time instants $t_3$ and $t_4$ correspond to diagonal points $(u_1, v_1)$ and $(u_2, v_2)$ respectively.

Figure 14:
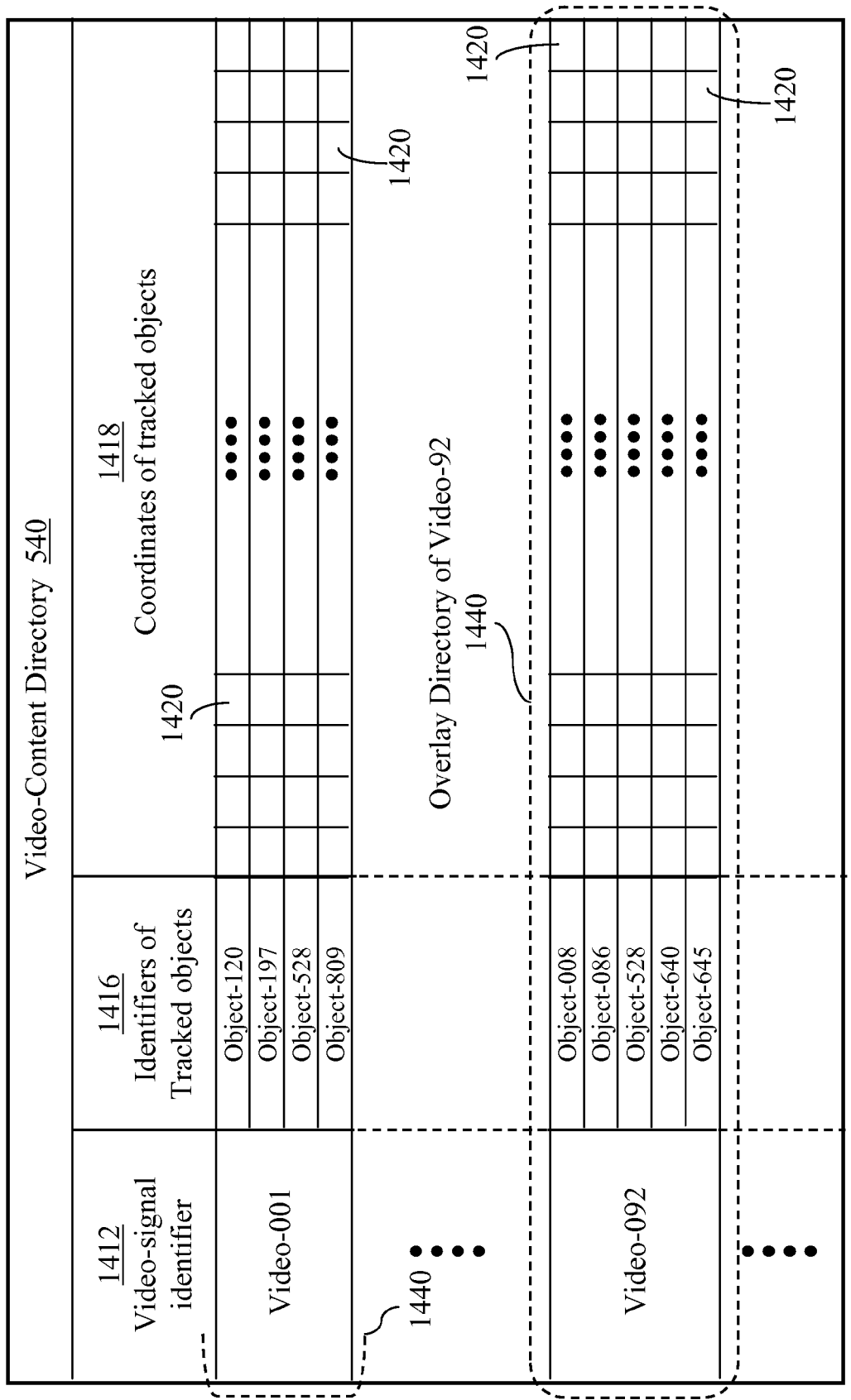
FIG. 14 illustrates an exemplary video-content directory maintained by a video-overlay server and comprising overlay directories for a plurality of video signals, in accordance with an embodiment of the present invention.

FIG. 14 illustrates a video-content Directory 540 (FIG. 5) maintained by video-overlay server 160. Video-content directory 540 includes an overlay directory 1440 (also called a content directory 1440) for each video signal (video recording) in list 434 (FIG. 4). Each overlay directory (content directory) contains a video-signal identifier (video-recording identifier) 1412, a set 1416 of identifiers of objects tracked in a display of a respective video signal, and a matrix 1418 of coordinates of tracked images of each tracked object in a set 1416 corresponding to the video signal. Directory 540 illustrates two overlay directories 1440 corresponding to video signals identified as Video-001 and video-092. Four objects, selected from global object directory 560 (FIG. 5 and FIG. 9) and identified as object-120, object-197, object-528, and object-809, are tracked in an authoring process of video-001. Five objects, also selected from global object directory 560 and identified as object-008, object-086, object-528, object-640, and object 645, are tracked in an authoring process of video-092.

FIG. 15 details an overlay directory 1440 corresponding to a video signal video-001 of FIG. 14. An authoring process of video-001 has tracked four objects; object-120, object-197, object-528, and object-809. Tracking data relevant to objects-120 and object-809 are illustrated. The authoring process tracked 88 images of object-120 and 64 images of object-809 in the same display of video-001. A first image of object-120 is captured at pointing time t1, and a last image is captured at pointing time $t_{88}$. For each pointing time $t_j$, $1 \leq j \leq 88$, two corresponding diagonal points of coordinates $(x_1^{(i)}, y_1^{(i)})$ and $(x_2^{(i)}, y_2^{(i)})$ are stored in the overlay directory (content directory). A first image of object-809 is captured at pointing time $\tau_1$, and a last image is captured at pointing time $\tau_{64}$. For each pointing time $\tau_j$, $1 \leq j \leq 64$, two corresponding diagonal points of coordinates $(u_1^{(i)}, v_1^{(i)})$ and $(u_2^{(i)}, v_2^{(i)})$ are stored in the overlay directory.

Figure 16:
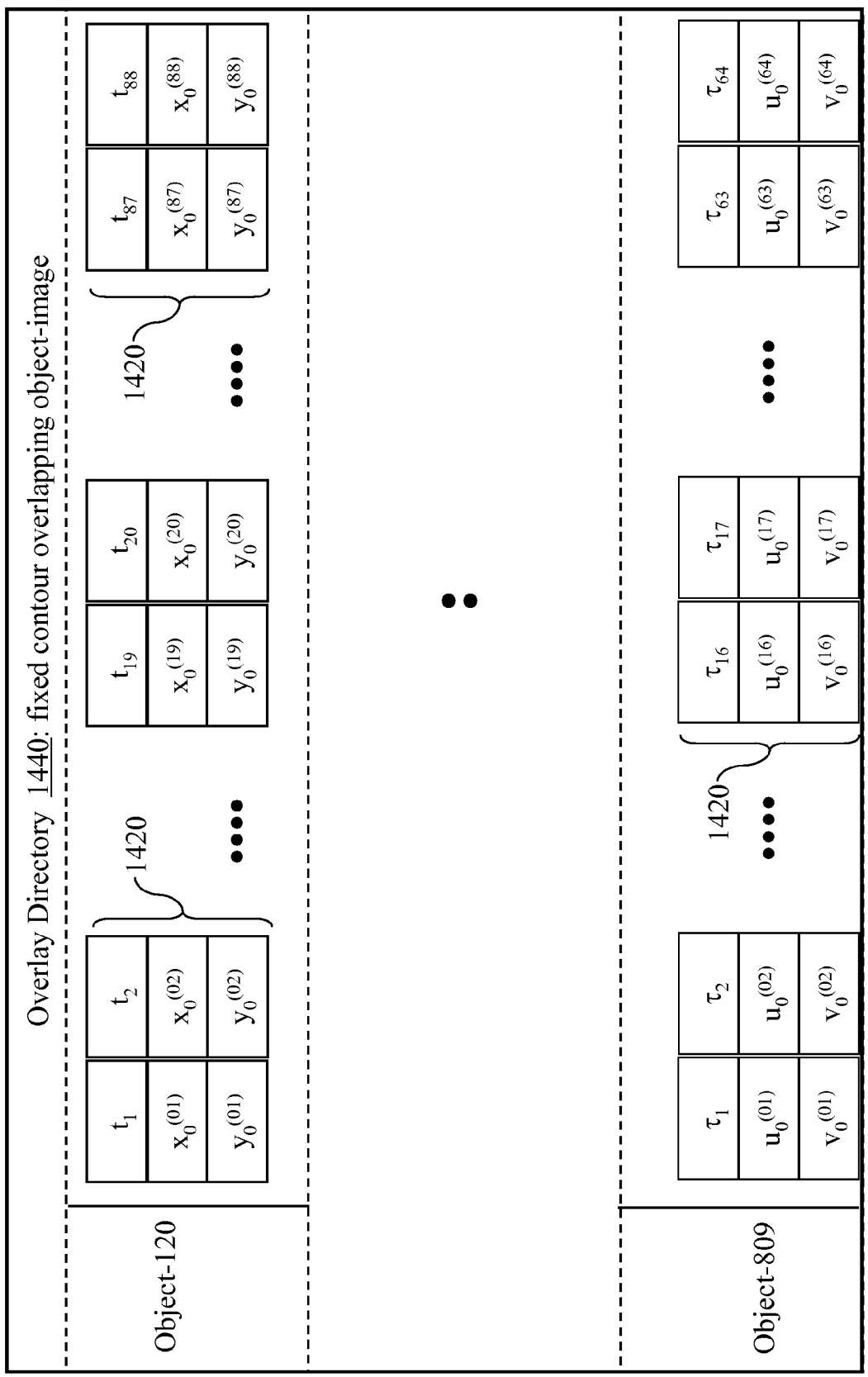
FIG. 16 details an overlay directory comprising multiple records each corresponding to a tracked object image with preset overlapping boundaries in a video signal, in accordance with an embodiment of the present invention.

FIG. 16 illustrates an alternative overlay directory 1440 corresponding to video signal video-001 of FIG. 14. The alternative overlay directory, also included in the video-content Directory 540, comprises multiple records each corresponding to a tracked object image with preset overlapping boundaries as illustrated in FIG. 12. The shape and size of the contour overlapping an image of the object are predefined. Hence, the position of only one reference point within the contour need be determined for each object image. A preferred reference point is a point which a user of an authoring computer 240 selects during an authoring process.

As in the example of FIG. 15, the authoring process tracked 88 images of object-120 and 64 images of object-809 in the same display of video-001. A first image of object-120 is captured at pointing time $t_1$, and a last image is captured at pointing time $t_{88}$. For each pointing time $t_j$, $1 \leq j \leq 88$, only one point of coordinates $(x_0^{(i)}, y_0^{(i)})$ is stored in the alternative overlay directory. A first image of object-809 is captured at pointing time $\tau_1$, and a last image is captured at pointing time $\tau_{64}$. For each pointing time $\tau_j$, $1 \leq j \leq 64$, only one point of coordinates $(u_0^{(i)}, v_0^{(i)})$ is stored in the overlay directory (content directory).

Figure 17:
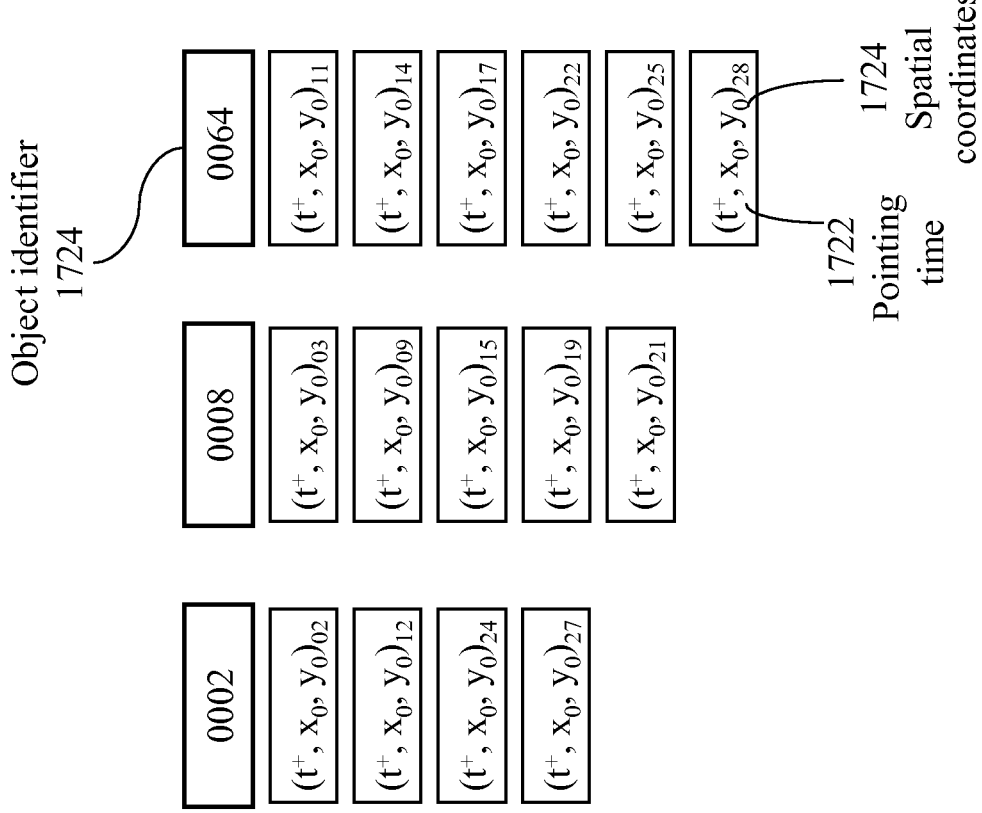
FIG. 17 illustrates data recorded during an authoring session in which object images are tracked without interrupting the display of a video signal in accordance with an embodiment of the present invention.

FIG. 17 illustrates data recorded during an authoring session in which object images are tracked without interrupting the display of a video signal. The authoring computer 240 records an instant of time $t^+$ and a position $(x_0, y_0)$ of a point, which the user selects, on the display screen of the authoring computer. The user may point to several object images during an authoring session. The user may select different object images of an object several times during the continuous display of the video signal in order to facilitate tracking the object during a viewing process which relies on interpolation as will be described below with reference to FIG. 21. In FIG. 17, a point within an object image selected by the user in a $j^{th}$ selection is represented by temporal-spatial coordinates $(t^+, x_0, y_0)_j$, $1 \leq j \leq G$, where G is the number of times the user selects (points to) an object images. The image selections are identified by serial numbers 1 to G and the index j identifies a selection number regardless of the object image selected. An object image may appear in numerous frames but may be captured in a much smaller number during an authoring session. The recorded information may be held in a cache memory for processing at the authoring computer and generating an overlay directory to be sent to overlay server 160.

In the example of FIG. 17, the user of authoring computer 240 has pointed, during an interrupted display of a video signal, to 28 object images of objects listed in the global object directory 560 of FIG. 9 which contains object records of 8191 objects. The user pointed to objects of identifiers 0002, 0008, 0064, 0256, 0812, and 1088. The authoring tool installed in the authoring computer groups recorded coordinates of objects, according to object identifiers 1724, to formulate a tracking record for the object. For example, object 0002 was selected by the user during selection indices 02, 12, 24, and 27 and the tracking record of object 0002 includes temporal spatial coordinates 1722 and 1724 denoted $(t^+, x_0, y_0)_{02}$, $(t^+, x_0, y_0)_{12}$, $(t^+, x_0, y_0)_{24}$, and $(t^+, x_0, y_0)_{27}$. The authoring tool installed in authoring computer 240, and stored in a computer readable medium of the authoring computer 240, instructs the authoring computer 240 to link to relevant object servers to acquire object information. For each tracked object (0002, 0008, 0064, 0812, 1088) the authoring computer 240 communicates to overlay server 160 a respective tracking record, for inclusion in video-content directory 540, and respective object information for inclusion in global object directory 560.

Viewing Process

Figure 18:
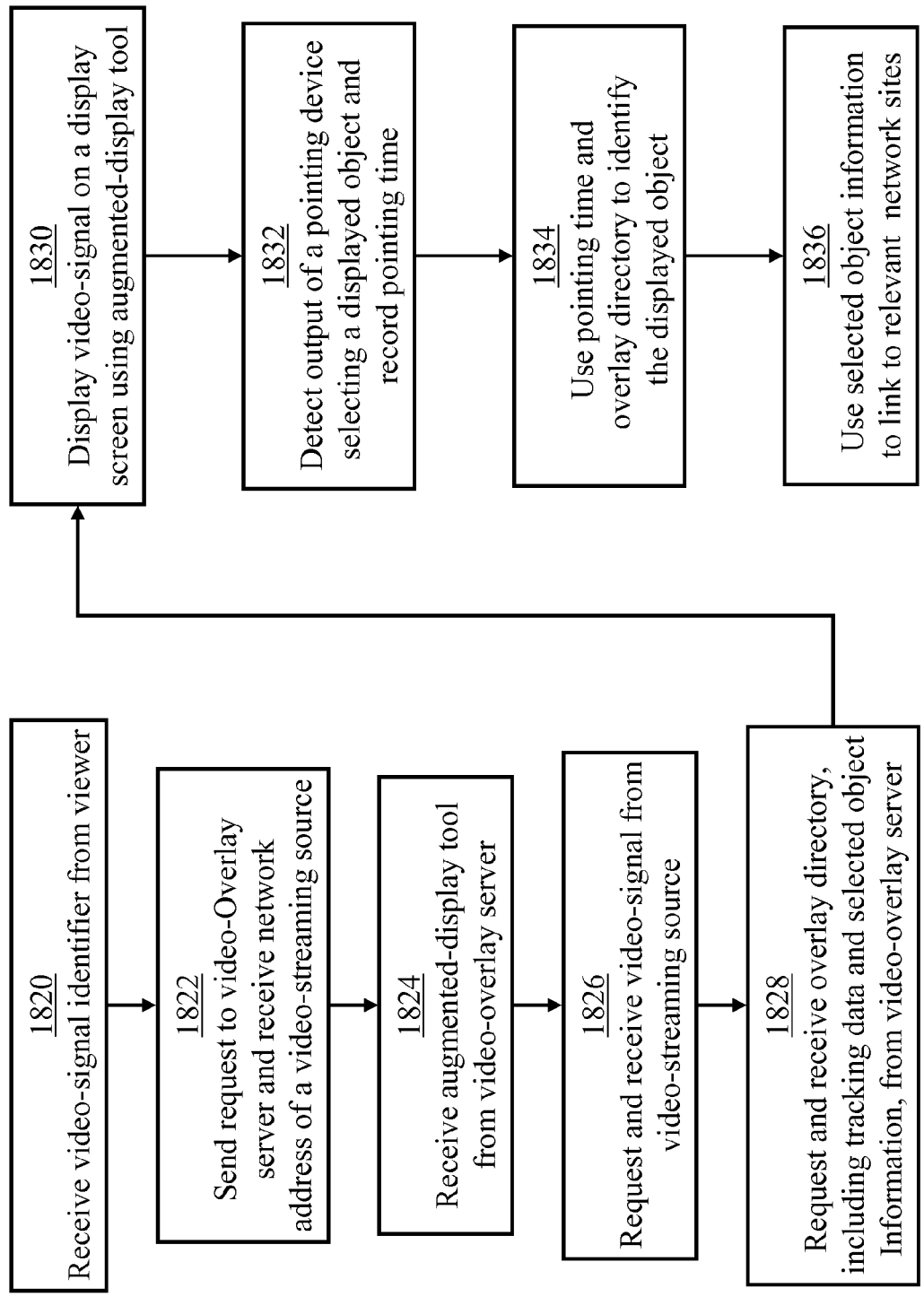
FIG. 18 illustrates a process of augmented display of a video-signal in accordance with an embodiment of the present invention.

FIG. 18 illustrates a process performed at a viewing computer 124 using an augmented-display tool acquired from video-overlay server 160. In step 1820, the viewing computer 124 receives a request from a viewer to display a specific video signal. In step 1822, the viewing computer 124 forwards the request to overlay server 160 and receives from the overlay server 160 network addresses of video-streaming servers providing the requested video signal. In step 1824, the viewing computer 124 receives the augmented display tool from the overlay server 160. In step 1826, the augmented-display tool selects a video-streaming server, and causes the viewing computer to request the specific video signal from the selected video source (video-streaming server) 112. The viewing computer receives the video signal and, in step 1828, the augmented-display tool 550 causes the viewing computer 124 to request an overlay directory (content directory) 1440 (FIG. 14 and FIG. 15), corresponding to the specific video signal, from the overlay server 160.

In step 1830, the viewing computer 124 displays the specific video signal under control of the augmented display tool 550. The viewer may point to an image of an object to indicate interest in further information on the object. The viewing computer then records the pointing time (step 1832). The viewer is given a choice to continue viewing the display and view the sought information after completion of the display of the entire video signal, or to interrupt the display of the video signal to view the sought information. In either case, steps 1834 and 1836 are performed to identify the object and link to relevant network sites.

In the interrupted-display mode, the augmented-display tool causes the viewing computer to stop displaying the specific video signal, as illustrated in FIG. 10, and perform steps towards acquiring the sought information.

In an uninterrupted mode, the display of the video signal continues independently of the actions of the viewer, and the augmented-display tool 550 causes the viewing computer to store the pointing time instants in a cache memory. Upon completion of the video-signal display, the user may activate the augmented display tool to obtain object information in a separate session.

Figure 19:
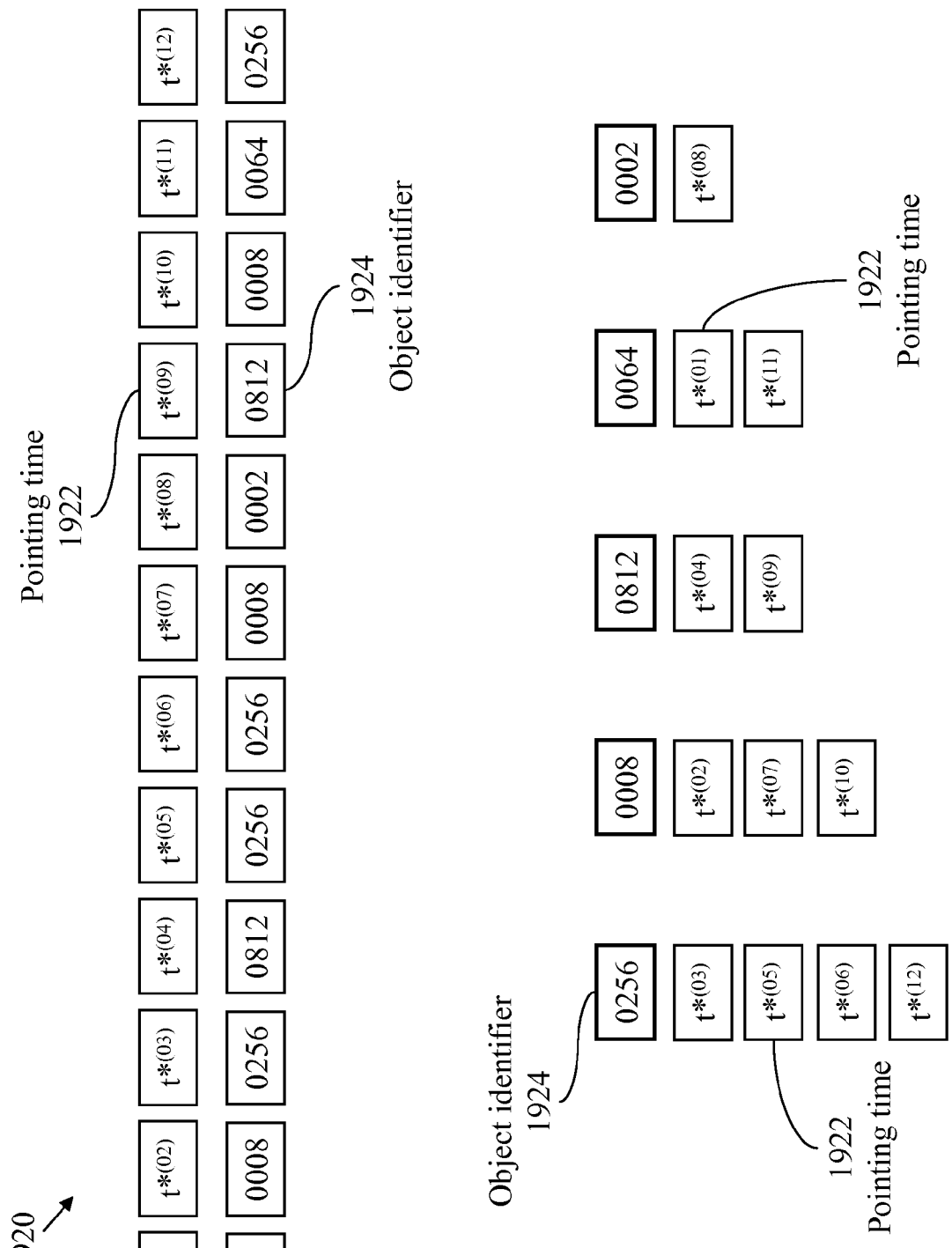
FIG. 19 illustrates data recorded during an augmented viewing session in which object images are tracked without interrupting the display of a video signal in accordance with an embodiment of the present invention.

FIG. 19 illustrates data 1920 recorded during a viewing session in which a viewer tracks object images without interrupting the display of a video signal and the augmented display tool, installed in a computer readable medium of a viewing computer 124, records temporal and spatial data for use in a separate illustrative viewing session. In the example of FIG. 19, the viewer pointed to object images 12 times during a viewing session. The augmented display tool recorded the time instants at which the viewing computer 124 detected the viewer's selections and corresponding spatial coordinates. Twelve time instants 1922 denoted $t^{*(01)}$ to $t^{*(12)}$, together with spatial coordinates of respective positions on a display screen, were recorded. The spatial coordinates are not illustrated. The augmented display tool associated each selected object image with an object identifier 1924. After completion of the viewing session, the augmented display tool determined that five objects with object identifiers 0002, 0008, 0064, 0256, and 0812, were selected by the viewer. Object 0256 was selected four times and object 0002 was selected once. The augmented display tool extracts information relevant to each identified object and display the extracted information in an order selected by the viewer. The display order may be determined according to the number of times an object-image is selected or according to temporal order of selection. In the former case, information relevant to object 0256 would be displayed first and in the latter case information relevant to object 0064 would be displayed first. The recorded information 1920 may be held in a cache memory for processing at the viewing computer and presenting to a viewer.

Figure 20:
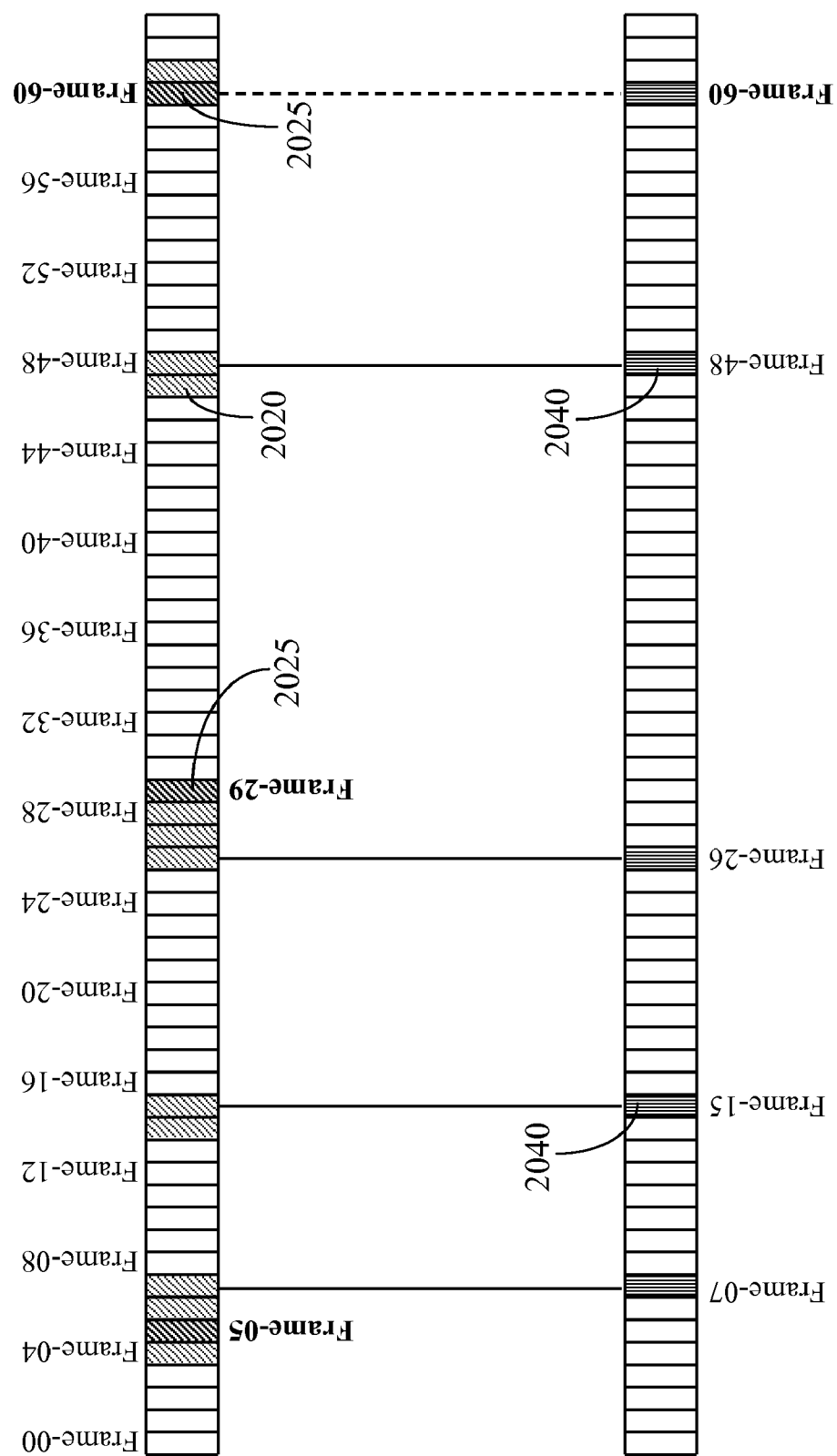
FIG. 20 illustrates object appearance and tracking during an authoring process and a viewing process of a video signal for use in an embodiment of the present invention.

FIG. 20 illustrates object appearance and tracking during an authoring process and a viewing process of a video signal. During an authoring process, an object appeared within a number of video signals during time intervals 2020 and 2025.

A user of an authoring computer 240 pointed at the object and the authoring computer recorded pointing time instants within frames 05, 29, and 60. During a viewing session, a viewer using a viewing computer 124 having stored thereon the augmented display tool 550 points at images of the object and the viewing computer recorded selection times instants 2040 within frames 07, 15, 26, 48, and 60. Each of the object images captured by the viewing computer 124 during frames 07, 15, or 26 is identified using an interpolation process as described with reference to FIG. 21. The object image captured during frame 60 is identified directly.

Object Recognition

When an object is displayed on a viewing computer, the viewer may point to any point within the image of the object. The augmented-display tool determines the pointing time t* and corresponding coordinates (x, y). The overlay directory 1440

Figure 21:
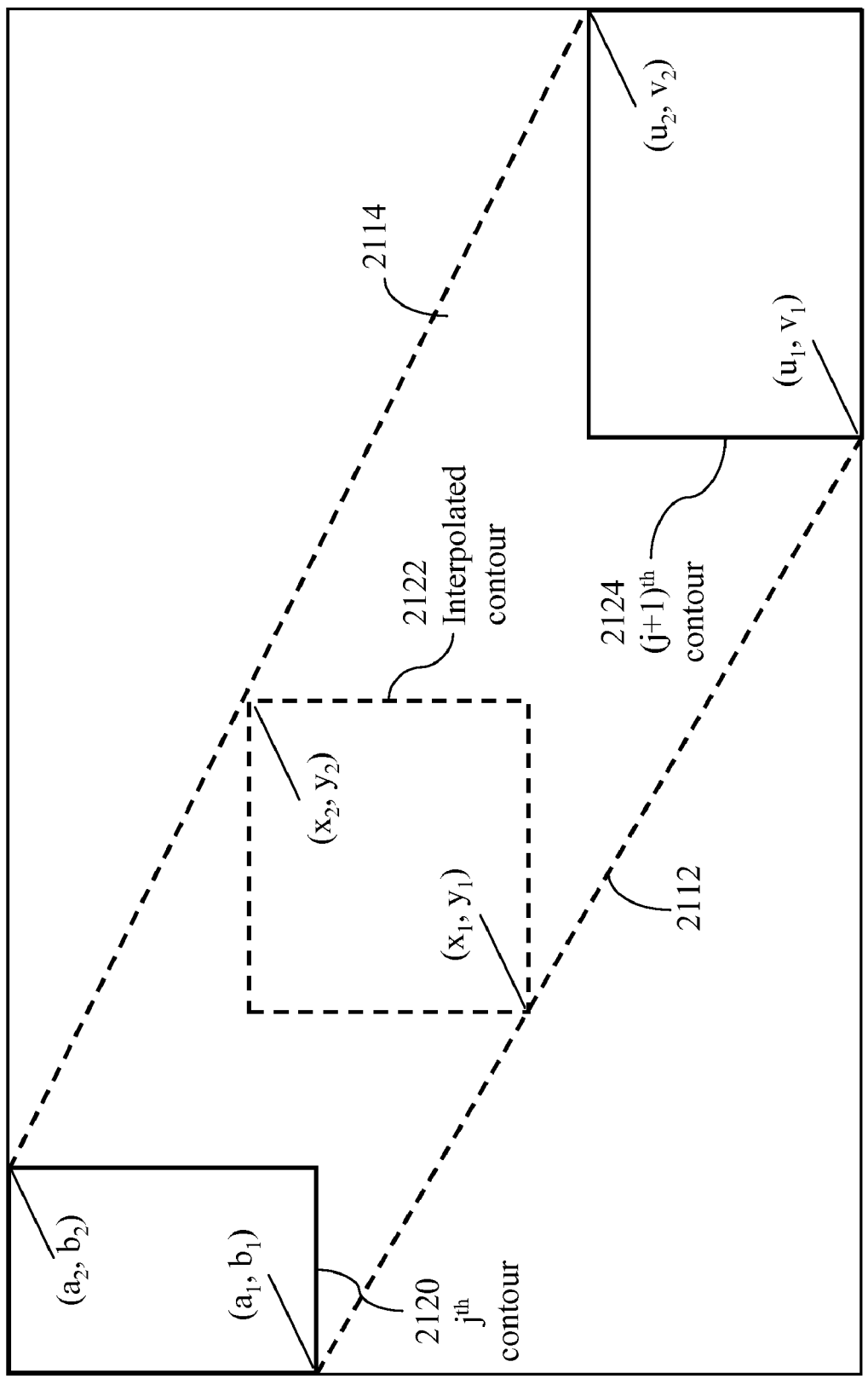
FIG. 21 illustrates interpolation of two adaptive boundaries of an object image in accordance with an embodiment of the present invention.

FIG. 21 illustrates a process of interpolation. A point of spatial coordinates (x, y) is determined to be within the rectangle defined by diagonal points $(a_1, b_1)$ and $(a_2, b_2)$ ($j^{th}$ contour 2120) if $a_1 \leq x \leq a_2$ and $b_1 \leq y \leq b_2$.

The rectangular shapes approximating the contours of the tracked object at two observation instants $t_1$ and $t_2$ are defined by two diagonals, one diagonal connecting point $(a_1, b_1)$ to point $(a_2, b_2)$ corresponding to $j^{th}$ contour 2120, and the other diagonal connecting point $(u_1, v_1)$ to point $(u_2, v_2)$ corresponding to $(j+1)^{th}$ contour 2124. For consistency, a diagonal defining a rectangle is selected to be of positive slope.

The contour of the tracked object appearing at time t, $t_1 \leq t \leq t_2$, may be approximated by interpolation by a rectangle 2122 bounded by lines 2112 and 2114 defined by a diagonal connecting a first point of spatial coordinates $(x_1, y_1)$ to a second point of spatial coordinates $(x_2, y_2)$, where $x_1, y_1, x_2$, and $y_2$ are determined as:

$x_1 = \alpha u_1 + (1-\alpha)a_1$ and $y_1 = \alpha v_1 + (1-\alpha)b_1$; and $x_2 = \alpha u_2 + (1-\alpha)a_2$ and $y_2 = \alpha v_2 + (1-\alpha)b_2$;

where $\alpha = (t-t_1)/(t_2-t_1)$.

A spatial position, defined by a point (x, y), is determined to be within the interpolated rectangle if $x_1 \leq x \leq x_2$ and $y_1 \leq y \leq y_2$.

Figure 22:
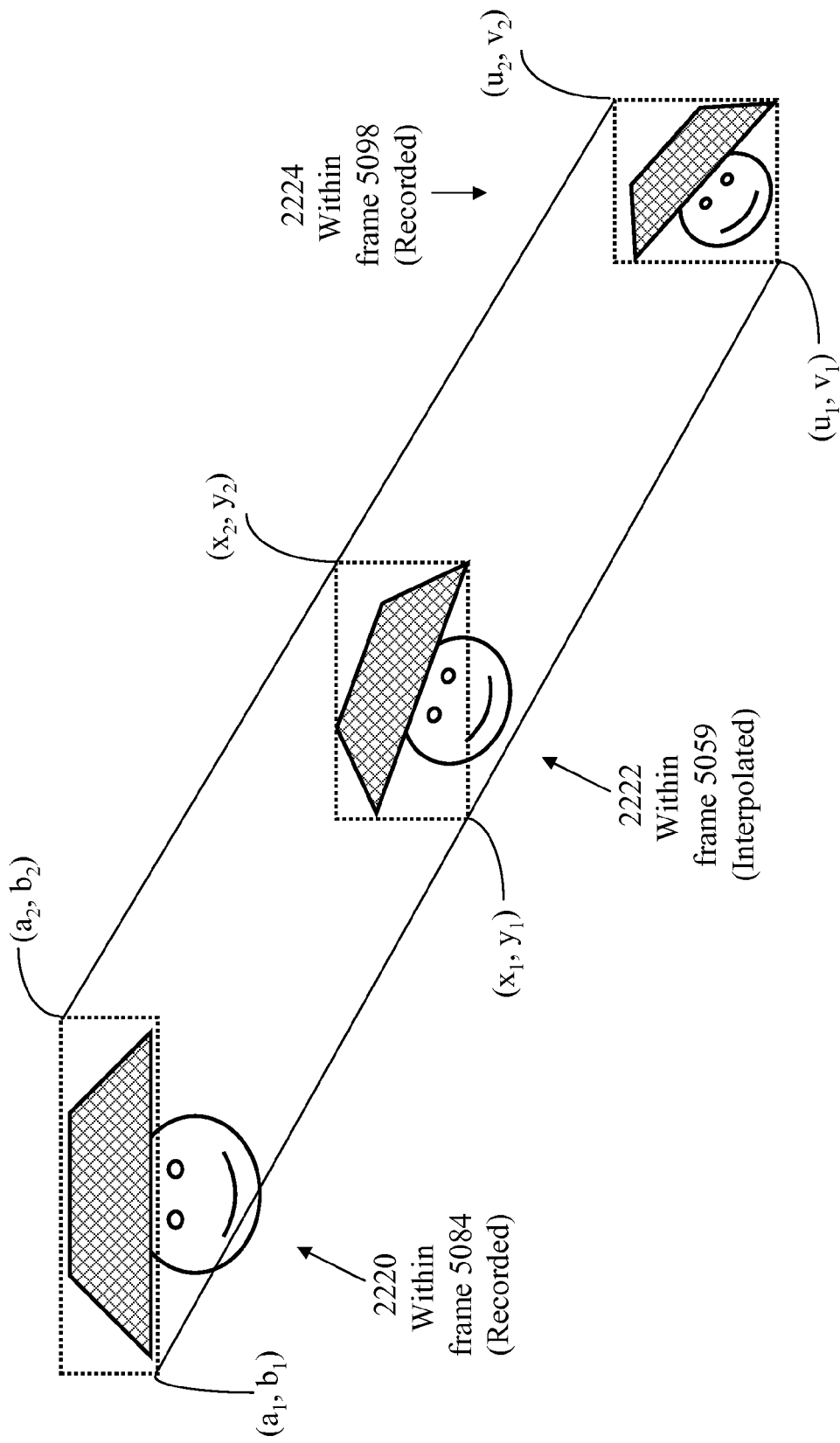
FIG. 22 illustrates the interpolation process of FIG. 21 for an exemplary object image in accordance with an embodiment of the present invention.

FIG. 22 illustrates the interpolation process of FIG. 21 for an exemplary moving object. An object image 2222 is selected during video frame 5059 by a viewer of a video recording using a viewing computer 124 having installed thereon the augmented display tool 550. The augmented display tool acquires an overlay directory (content directory) associated with the displayed video recording from the overlay server 160. The viewer pointed to a point within the object image 2222. In order to identify the object corresponding to object image 2222, the augmented display tool examines the overlay directory to determine if an object has been captured during frame 5059 in the authoring process that produced the overlay directory. If so, the augmented display tool determines whether the position to which the viewer pointed is within the contour associated with the object in the overlay directory. Otherwise, the augmented display tool finds two neighboring images 2220 and 2224 of a common object in the overlay directory and determines an interpolated contour corresponding to frame 5059. The neighboring images are contained within rectangular contours defined by diagonal points $\{(a_1, b_1), (a_2, b_2)\}$ in frame 5084, and $\{(u_1, v_1), (u_2, v_2)\}$ in frame 5098 and the interpolated contour is defined by diagonal points $\{(x_1, y_1), (x_2, y_2)\}$. The common object is not necessarily the object selected by the viewer. If the position to which the viewer pointed is within the interpolated contour, the augmented display tool determines that the common object is the object sought by the viewer. Otherwise, new neighboring images of another object may be considered.

Figure 23:
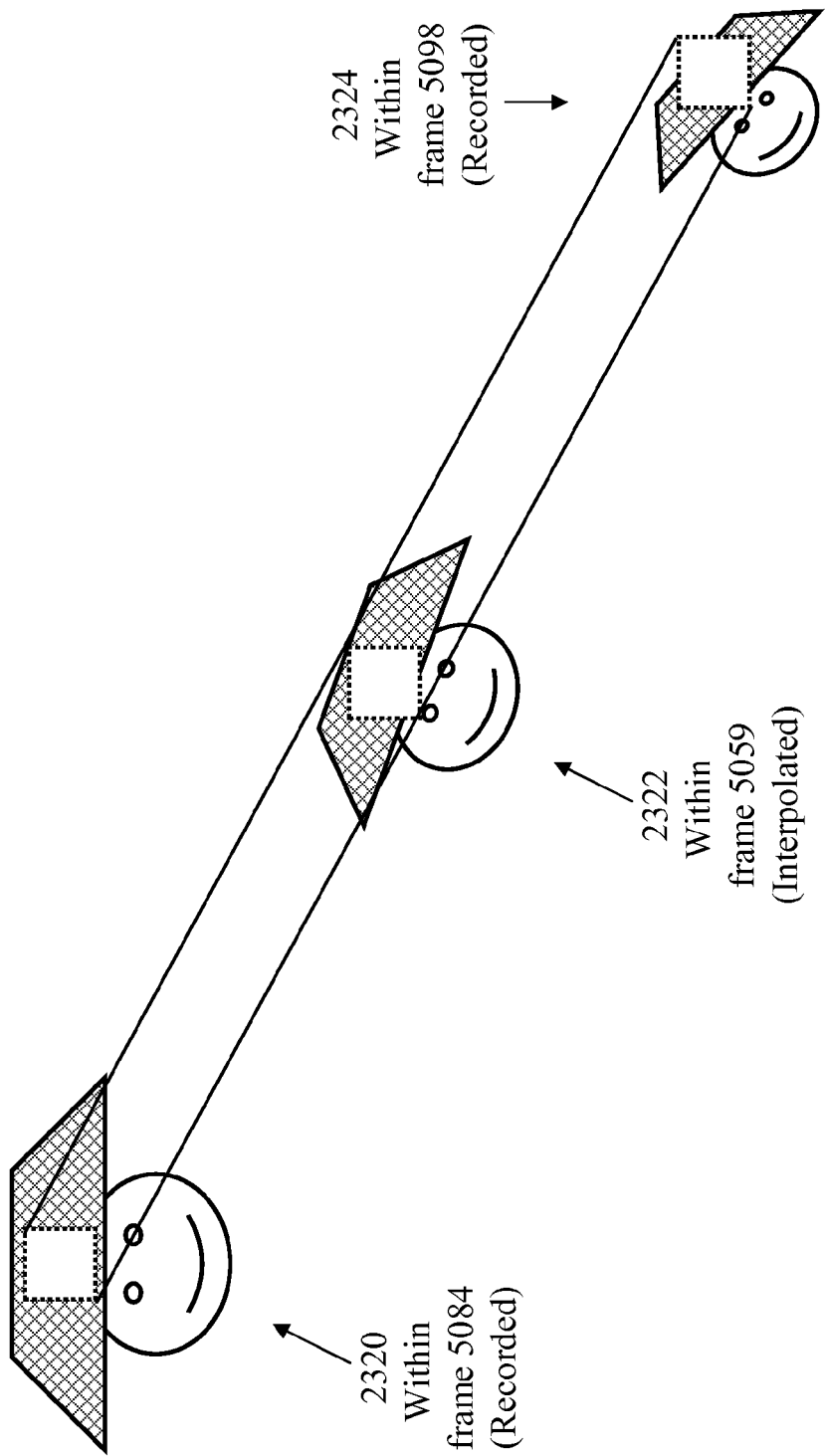
FIG. 23 illustrates an interpolation process for the exemplary object image of FIG. 22 using preset overlapping boundary in accordance with an embodiment of the present invention.

FIG. 23 illustrates the interpolation process of FIG. 21 for the exemplary moving object of FIG. 22 with reference numerals 2320, 2322, and 2324 corresponding to reference numerals 2220, 2222, and 2224, respectively. The main difference between the interpolation processes of FIG. 22 and FIG. 23 is the shape of the contour defining an object image. In FIG. 22, a contour surrounds an object image and may, therefore, assume different sizes and shapes according to linear and angular movements of a tracked object. In FIG. 23, a standardized shape of a predefined size overlaps an object and is positioned relative to a single point selected in an authoring process. In FIG. 23, the standardized shape is a square of a predefined width and the single point may be at the centre of the square or at a pre-selected corner. The interpolation process of FIG. 23 is simpler than that of FIG. 22.

Figure 24:
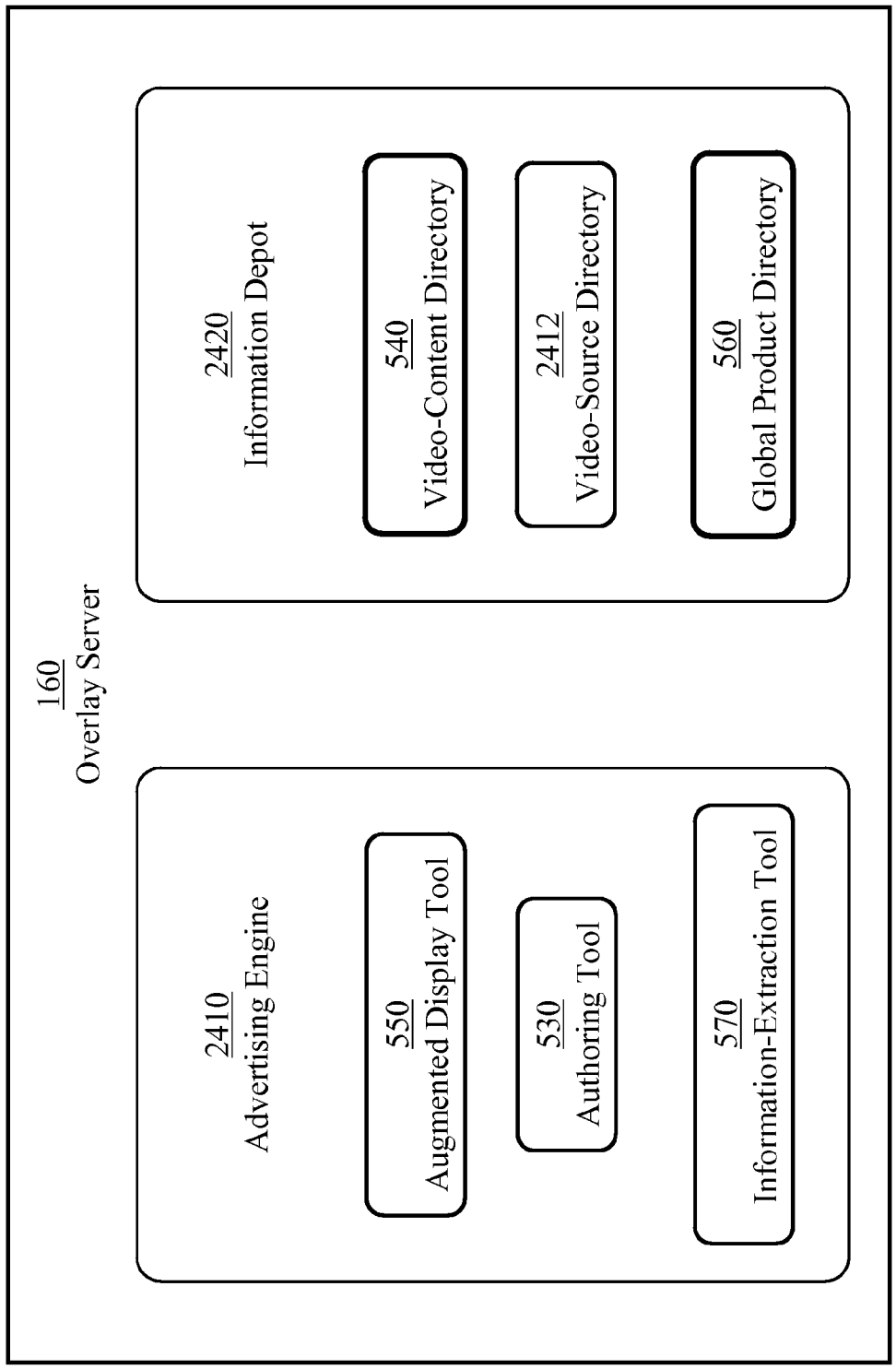
FIG. 24 illustrates an advertising engine and an information depot forming an overlay server in accordance with an embodiment of the present invention.
Figure 25:
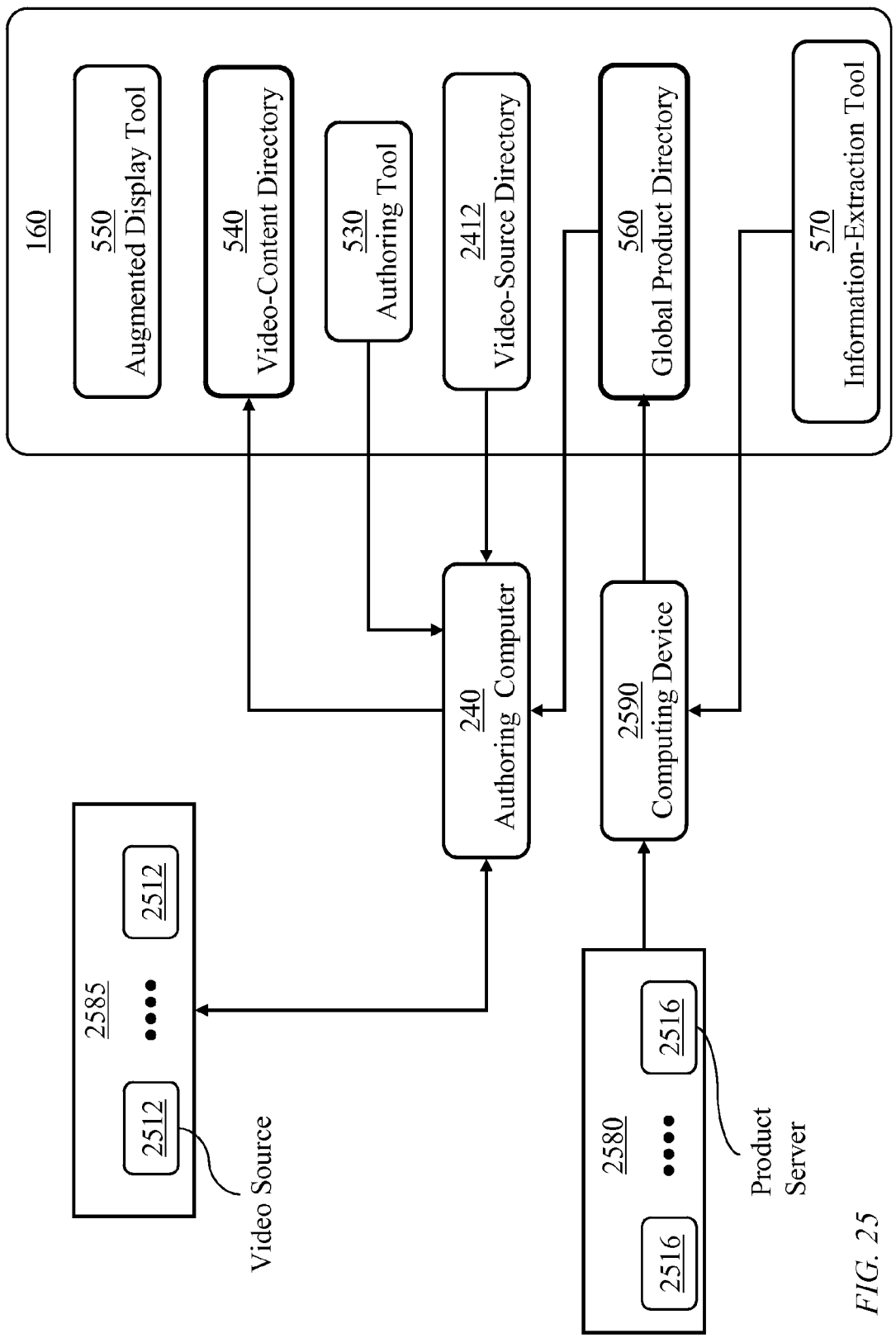
FIG. 25 illustrates a distributed system for linking content of video signals to information sources, in accordance with an embodiment of the present invention.
Figure 26:
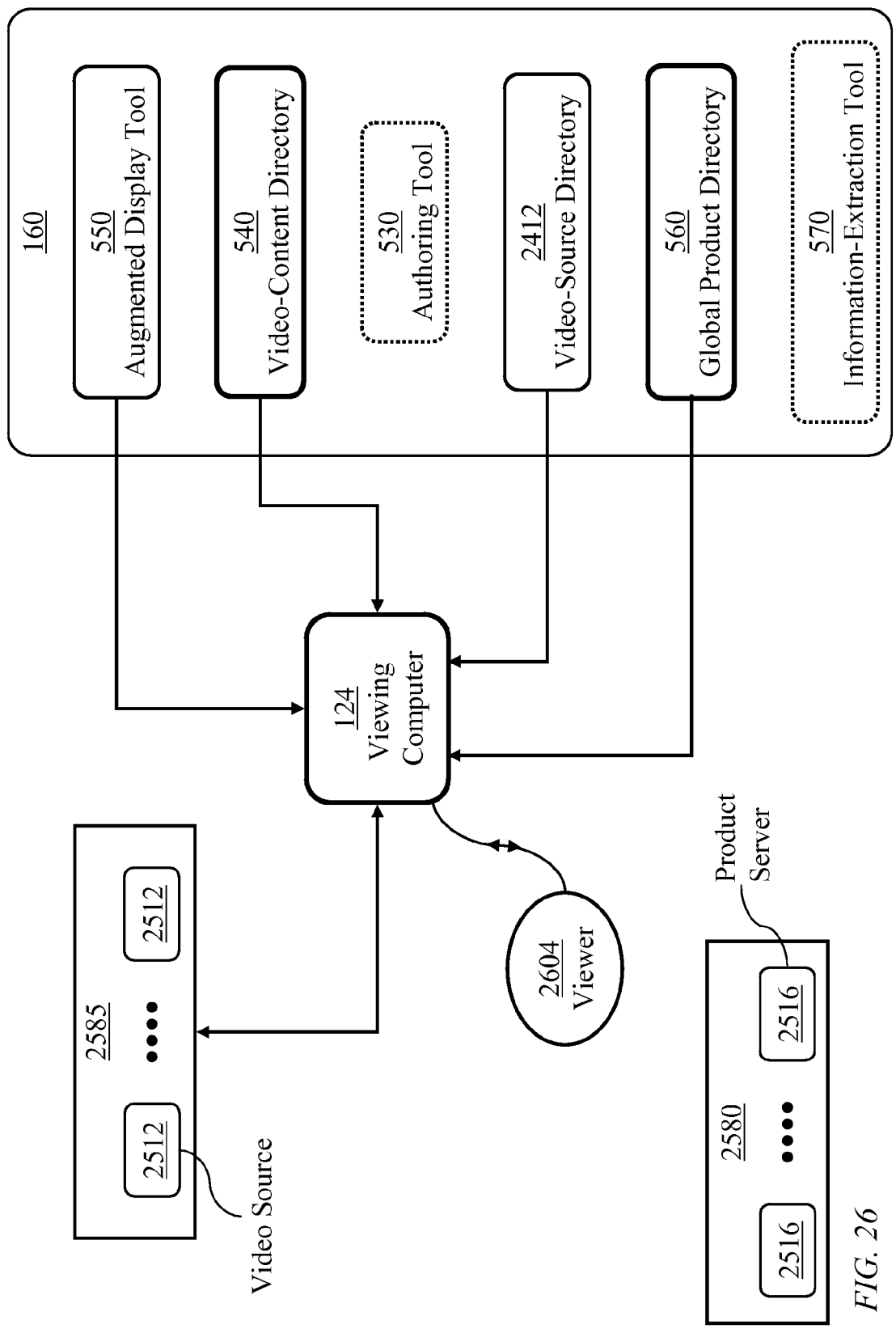
FIG. 26 illustrates a part of the system of FIG. 25 activated when a viewer requests display of a video recording, in accordance with an embodiment of the present invention.

FIG. 24 illustrates an alternative representation of the overlay server 160, forming a component of a distributed system shown in FIG. 25 and FIG. 26, for product advertising by linking content of video recordings to product information sources. The overlay server 160 comprises an advertising engine 2410 and an information depot 2420, both stored in a computer readable medium accessed by the overlay server 160.

The advertising engine comprises an information-extraction tool 570, an authoring tool 530, and an augmented display tool 550, all comprising computer readable instructions stored in the computer readable medium accessed by the overlay server 160.

The information-extraction tool 570, installed in a computing device 2590, collects product information, pertinent to a set of products, from product data bases through a network and assembles the product information in a global product directory 560. The product databases may be stored in a computer readable storage medium of product servers 2516 (FIG. 25) maintained by product advertisers. The information-extraction tool 570 may annotate extracted product information according to input provided by a user of a computer hosting the information-extraction tool.

The authoring tool 530 is stored and installed in a computer readable medium of each of authoring computes 240, which may be collocated with the overlay server 160 or connecting to the overlay server 160 through a network. The authoring tool 530 may contain computer-readable instructions which cause an authoring computer 240 to insert a static image of a product in the display of a respective video recording to facilitate associating a moving image of the product with a respective product identifier. Static images of products may be acquired from the global product directory 560. Prompted by a user of an authoring computer 240, the authoring tool 530 tracks product images appearing in a display of a video recording received from a video source and associates product identifiers with the product images to produce a tracking record for a selected product. A tracking record relates each selected product image to respective information collected by the information-extraction tool 570. The product identifiers may be conveniently derived from static product images appearing on the periphery of a display of a video signal. Each tracking record contains a time instant and spatial position of each appearance of an image of a particular product in a display of a respective video recording The augmented-display tool 550 is installed in a viewing computer 124. Prompted by a viewer 2604 (FIG. 26) using the viewing computer 124, the augmented-display tool 550 tracks product images appearing in a display of an augmented video recording for which a tracking record has been produced in an authoring process. The viewing computer 240 displays selected product information corresponding to product images selected by the viewer.

The augmented display tool 550 may cause a viewing computer 124 to insert static product images, acquired from global product directory 560, to enable fast association of a product identifier with a product image.

The information depot comprises a video-source directory 2412, a global product directory 560, and a video-content directory 540, all stored in a computer readable medium accessed by the overlay server 160. The video-source directory 2412 contains network addresses of video sources 2512 (FIG. 25), selected from among a plurality 2585 of video sources, which provide video recordings of interest. The video-content directory 540 stores overlay directories of a set of video recordings produced by the authoring tool 530. The global product directory 560 stores product information, collected by the product-extraction tool 570, for a set of products. The product information includes: (1) a list of product identifiers of the set of products; a product image for at least one product in the set of products; a title and description for each product in the set of products; and at least one network address of a product server 2516 (FIG. 25), selected from among a plurality 2580 of product servers, providing information relevant to each product in the set of products.

The system for product advertising relies on several authoring computers, each of which may connect directly or through a network to the advertising engine 2410 and the information depot 240. Each authoring computer 240 installs the authoring tool 530 and accesses the video source directory 2412 to obtain network addresses of selected video sources. Prompted by a user, an authoring computer 240 requests and receives a particular video recording from a video source and implements instructions of the authoring tool to track specific product images appearing in a display of the particular video recording to produce a tracking record. The specific product images are selected by the user of the authoring computer 240. The authoring computer 240 accesses the global product directory to obtain particular product information relevant to the specific product images selected by the user and sends the tracking record and the particular product information to the overlay server to be stored in the information depot 2420.

The advertising engine 2410 distributes the augmented-display tool to a number of viewing computers 124 and each viewing computer 124 may access the video-content directory 2412 to acquire an overlay directory associated with a respective video recording.

The product-advertising system supports a plurality of viewing computers 124 each viewing computer 124 storing thereon a copy of the augmented display tool 550. A viewing computer 124 implements instructions of the augmented display tool 550 to send a request to the overlay server to acquire a video recording. The overlay server 160 responds by sending: (1) instructions of an augmented display tool 550; (2) an overlay directory corresponding to the requested video recording; and (3) a network address of a video source providing the requested video recording. The viewing computer 124 requests and receives the video recording from the video source. Upon displaying the video recording, the augmented display tool 550, the augmented display tool 550 tracks images of specific products belonging to the set of products selected by a user of the viewing computer and maintained in the global product directory 560, and extracts, from the global product directory, product information relevant to the specific products.

The augmented display tool may operate in either of two modes. In a first mode, the viewing computer interrupts a display of a video recording in order to extract the product information. In a second mode, the viewing computer extracts product information after completion, without interruption, of a display of a video recording. The augmented display tool 550 may also instruct the viewing computer 124 to send identifiers of the specific products to the overlay server 160 for statistical analysis of product demand.

Thus, the method for product advertising according to the present invention comprises steps of: (1) creating a list of product identifiers of a set of products; (2) creating a list of video-recording identifiers of a set of video recordings; (3) acquiring network addresses of product servers 2516, each product server providing information relevant to at least one of the set of products; (4) acquiring collective product information relevant to the set of products from the product servers 2516 through the network; (4) sending the collective product information through a network to an overlay serve 160; (5) acquiring network address of video sources 2512 collectively providing the set of video recordings; (6) requesting and individually receiving the set of video recordings from video sources 2512.

For each video recording received from a video source 2512, the method comprises steps of; (a) producing a display on a computer screen; (b) pointing to images in the display corresponding to the set of products; (c) formulating a tracking record comprising a product identifier, a pointing time, and spatial coordinates for each image; and (d) sending the tracking record to the overlay server through the network.

Software Implementation

Figure 27:
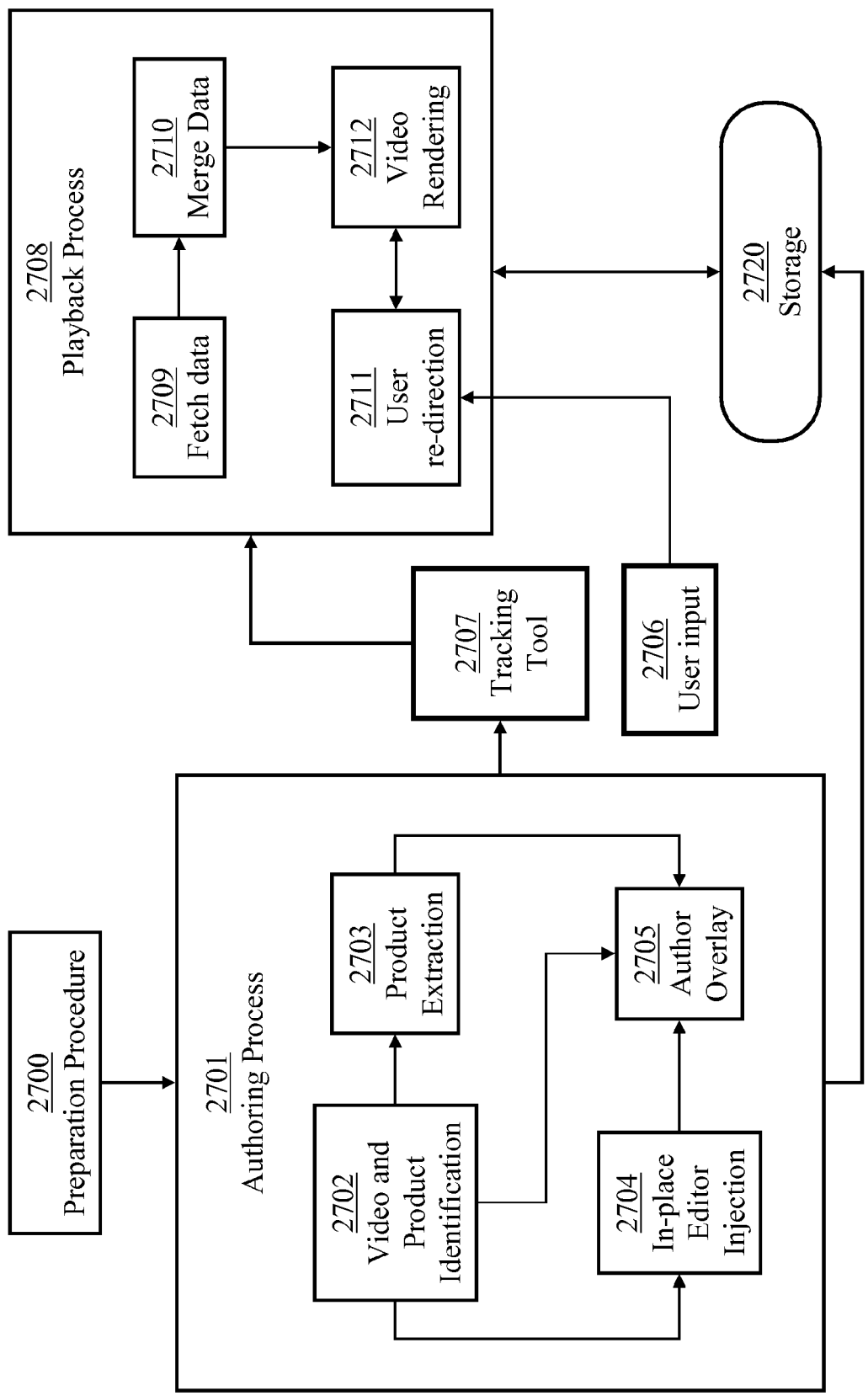
FIG. 27 illustrates software implementation the system of FIG. 2 in accordance with an embodiment of the present invention.

FIG. 27 illustrates software modules of a system for product advertising according to an embodiment of the present invention. The system comprises at least one processor and a computer readable medium having computer readable instructions stored thereon for execution by the processor, to from the following modules: preparation module 2700, an authoring module 2702, a playback module 2708, a user input module 2706, an object-tracking tool 2707, and a storage module 2720. The playback module comprises a component 2709 for obtaining data, a component 2710 for merging data from different sources, a user-redirection component 2711, and a video-rendering component 2712.

Creating a product video overlay uses various components. One component is an Extraction "Bookmarklet", comprising instructions stored in a computer readable medium, which enables a user to extract products from various web sites, and another component is an Overlay Author/Viewer component that allows a user to associate extracted products with the location and time that the products appear in the video.

Once products have been extracted and correlated to content of a video recording using the authoring component, the result is a hyperlinked video that plays through a special video player that performs synchronization between the product images and the display of the video recording.

Figure 28:
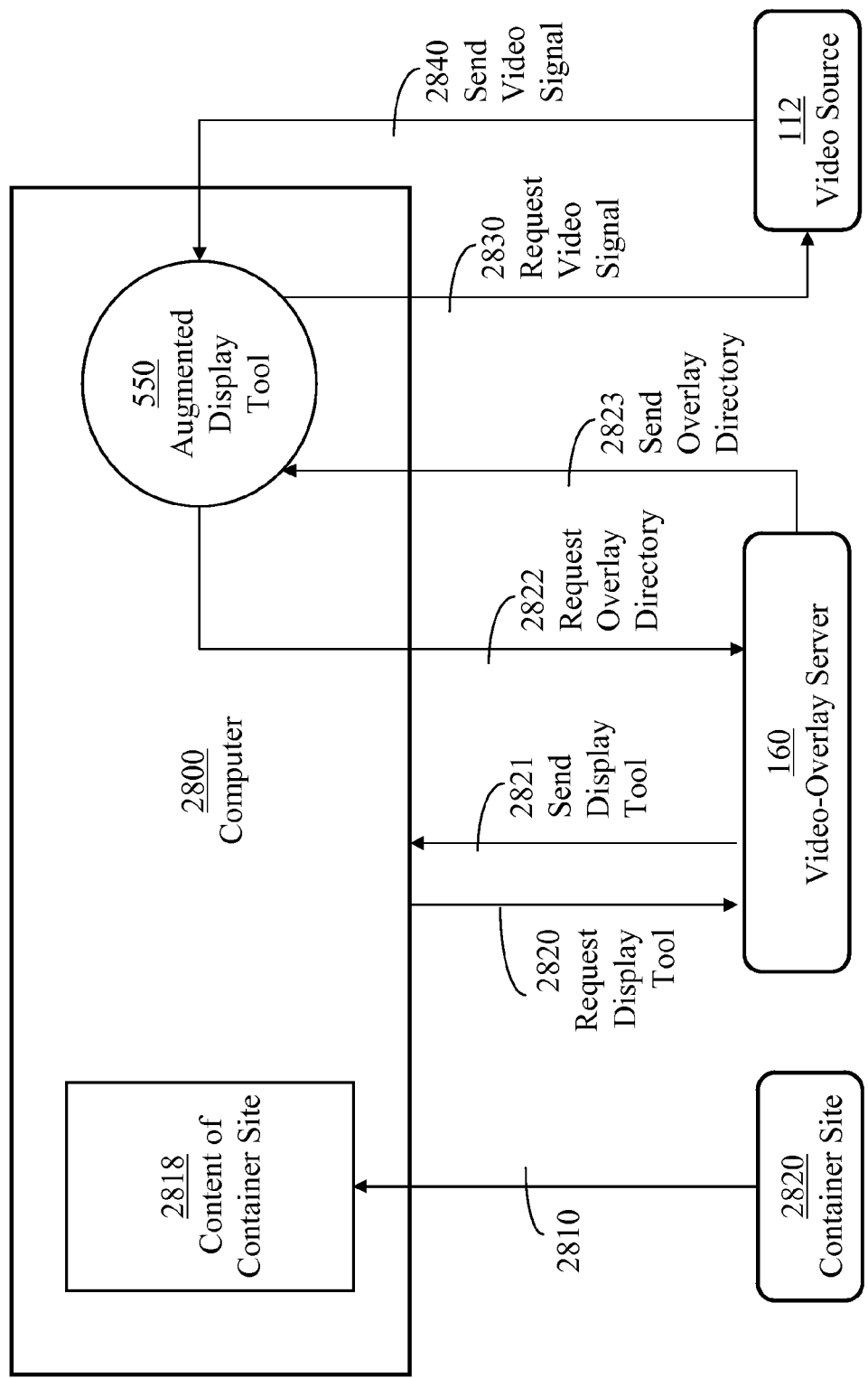
FIG. 28 details steps of a viewing process in accordance with an embodiment of the present invention.

The player is able to function when downloaded from the same web server that served the overlay metadata or any other site when used as an embeddable player. It enables users to shop, while viewing a video and redirects a user's browser to the retailer of a product when they make a product selection in the video. This functionality even works when the player is embedded in a JavaScript restricted environment. FIG. 28 illustrates information flow in the system of FIG. 27. A computing device 2800 stores content of a container site 2820 obtained through connection 2810, and an augmented display tool 550. The computing device 2800 sends a request 2820 to overlay server 160 to acquire a display tool. The overlay server 160 sends computer readable instructions including an augmented display tool through a connection 2821. The computing device 2800 installs the augmented display tool and sends a request to overlay server 160 through connection 2822 to acquire an overlay directory for a specific video recording. The overlay server 160 sends a respective overlay directory through a connection 2823. The installed augmented display tool 550 causes computing device 2800 to send a request to a video source 112 through a connection 2830 to acquire the specific video recording. The video source 112 sends the specific video recording through a connection 2840.

Software Implementation of an Authoring Process

Figure 29:
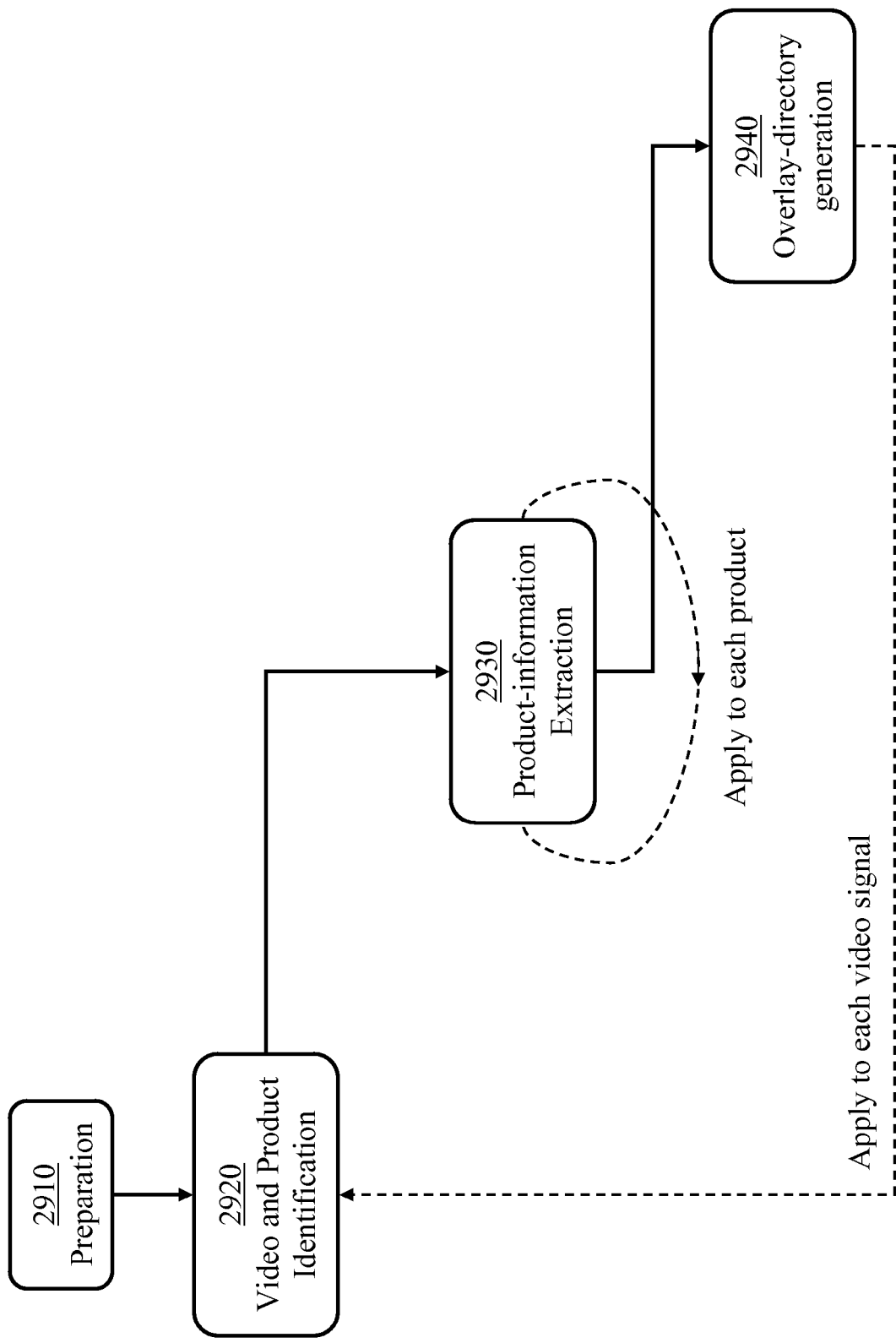
FIG. 29 illustrates steps of an authoring process in accordance with an embodiment of the present invention.

FIG. 29 provides an overview of software components activated in an authoring process. The components include a preparation module 2910, a video and product identification module 2920, a module 2930 for extracting product information (object information), and a component 2940 for creating overlay directories for video recordings. The authoring process requires a one-time preparation step in module 2910 to setup a user's browser with the authoring and extraction tools. Once the tools are installed, the author performs a procedure illustrated in FIG. 29 in order to extract products from locations on the web and mark up an overlay of a video recording with extracted products. Each step in the procedure is performed in the context of where the data, be it streaming video or production information, is viewed. The steps listed here and illustrated in FIG. 29 are further detailed below:

1. Locate a video that can be viewed online through a web page and identify the products selected to be marked up.
2. For each product, find the product web page where the details of the product are shown and extract a product catalog entry using a product extraction tool.
3. Using a video mark-up tool, mark-up an overlay of a video recording with the extracted product catalog entries by dragging the entries over an image of a product when the product image appears on a display screen. Follow the product image as it move around and then save metadata to a server for later viewing.

Preparation Module 2700

Before products can be extracted or a video can be marked up in-place, the user has to perform a one-time procedure which adds a tool to their browser in the form of a bookmark. In one known procedure, the user drags a bookmark from a site that hosts the overlay tool onto a browser toolbar. In another known procedure, the user needs right-click on the link and select 'Add to Favorites' and then confirm that the link should be added when any security warnings are opened in a browser alert dialog.

Instead of a traditional bookmark link that includes a title and URL, the tool bookmark has a title and a single line of JavaScript with no newline or carriage return characters. When the bookmark is clicked by the user, the JavaScript creates a dynamic HTML Document Object Model (DOM) SCRIPT element and appends it to the HEAD element in the current page. The script initializes event handlers that capture a selection made by a user, using a pointing device such as a "mouse", to enable extraction and editing features to function as described in the Extraction and Video Editing Step. The JavaScript bookmark link that allows the injection of functionality into a page which has already been served from a third party server takes a form similar to the exemplary form below:

```
"javascript:var host = 'www.overlay.tv'; var script =
document.createElement('SCRIPT');
script.src = 'http://www.overlay.tv/javascripts/bookmarklet.js';
script.type = 'text/javascript';
var head = document.getElementsByTagName('HEAD')[0];
head.appendChild(script); void(0);".
```

Notably, the JavaScript bookmark link is cross-platform in the sense that the same JavaScript code works in all popular browsers such as Internet Explorer, Firefox, and Safari as well as on Linux, UNIX and Windows operating systems. It also does not require a program to be downloaded and executed, offering a friendly experience to authors.

Instead of a bookmark that runs JavaScript to inject functionality (a script) into a web page, in a modification to the embodiment of the invention, a browser plugin has been created for a browser. A user is required to run the plugin installation program for a browser, and the plugin would add a button to the browser toolbar. To extract a product or mark-up a video, the user would press the plugin button instead of the bookmark link.

Video and Product Identification Module 2702

The first step of locating a video is performed by a user with a web browser that is equipped with the Adobe Flash plug-in that allows the viewing of Flash Streaming video in the .FLV format. The user needs to watch the video and identify the products that are to be tagged and the location on the web of each product page.

Product Extraction Module 2703

Figure 30:
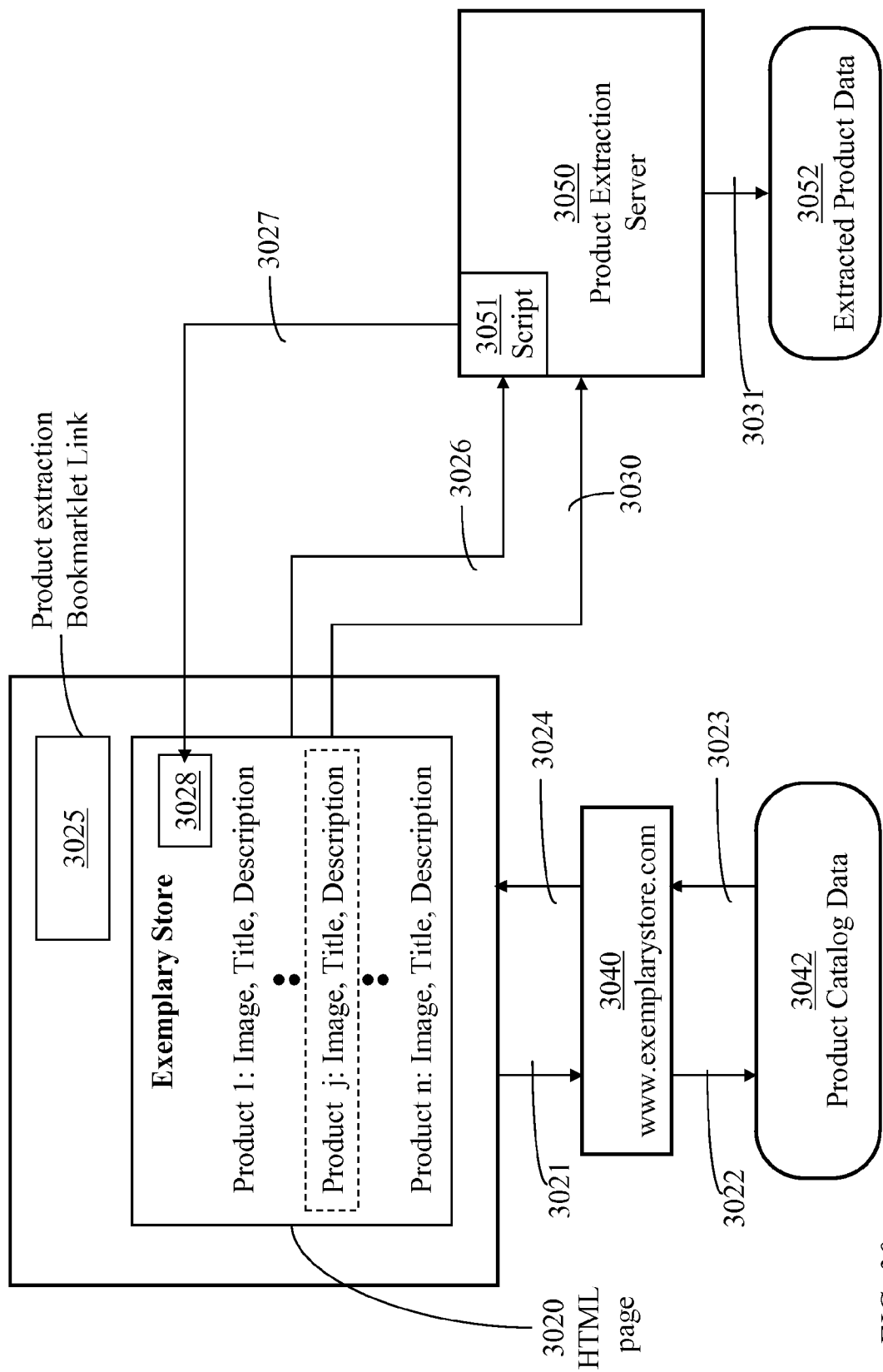
FIG. 30 illustrates a product extraction component of the software implementation of FIG. 27 in accordance with an embodiment of the present invention.

The product extraction bookmarklet is an application that enables a user to harvest a product catalog entry from a web site by using mouse clicks and mouse selections on assets such as text and images in a remote web page. FIG. 30 provides an overview of the chronological steps of a process of product-information extraction. The information is acquired from a product catalog 3042 and organized in product-extraction server 3050 (using script 3051) into extracted product data 3052 stored in a computer readable medium. An HTML page 3020 contains a list of products of a store labeled as Exemplary store. The process follows steps 3021, 3022, 3023, 3024, 3025 (setting a "bookmarklet link"), 3026, 3027, 3028, 3030, and 3031.

The bookmarklet can be invoked while visiting any web site in order to extract product information from the site. In FIG. 30, a product with a product identifier "Product j" is extracted from an example web site. The steps are as follows:

1. The user visits an online web store called Exemplary Store by typing http://www.exemplarystore.com into the address bar in their browser. The browser performs a GET HTTP request to the www.exemplarystore.com server.
2. The web server receives a GET request from the browser client and starts to generate a response. To generate the response, several techniques may be used by the site and multiple backend application servers may be consulted. Generally one or more databases may be queried for content and/or product information that should be rendered on the page requested by the user.
3. The database returns data back to the component in the Exemplary Store that is responsible for rendering HTML from a database result set and the page is rendered.
4. The HTML including product information such as title, description, price and product image for example, is returned to the browser. The browser renders the HTML page according to the layout included in it and shows the product information in the page.
5. The user clicks on the Product Extraction Bookmarklet Link in the browser link bar and its JavaScript dynamically inserts a new script element into the DOM of the current page.
6. The new script insertion causes the browser to perform a GET request for the new script from the product extraction web server.
7. The Product extraction web server responds with the script.
8. The new script executes and injects the product asset extraction functions, event handlers and menu as described with regard to the In-place Editor Injection module 2704 (Bookmarklet script section) below.
9. The user clicks on a set of assets representing pieces of the product catalog entry. Each time an image or object is selected, the user is prompted by a dialog (a dynamically added HTML DIV, not a popup) to choose which attribute the object or image represents, i.e., is it the main product image or a supplemental view of the product. Each time some text is selected, the user is prompted to select which attribute the text represents, title, description, or else, and is given the opportunity to edit the selected text. When the user has completed the capture of attributes from the page, they select the "Preview" link from the extraction menu where the captured product catalog entry is previewed and finally they click the "Transfer" link from the preview dialog.
10. When the "Transfer" link is clicked, the script performs an HTML POST to the Product Extraction Server and includes all of the information that the user selected.
11. The Product Extraction Server receives the product POST request, parses and validates all product attributes and ensures that all are well-formed and that all mandatory attributes are included. It then creates a product catalog entry record that is linked to the page that the POST came from and stores the record to the Product Extraction Product Catalog database. A thumbnail-sized product image of the product URL is created by downloading the image from the web site, resizing it to standard dimensions and then storing it on the server.

The overall effect is that a product catalog entry in an unknown format in the source database has been extracted and moved to a known format in the target database.

Figure 31:
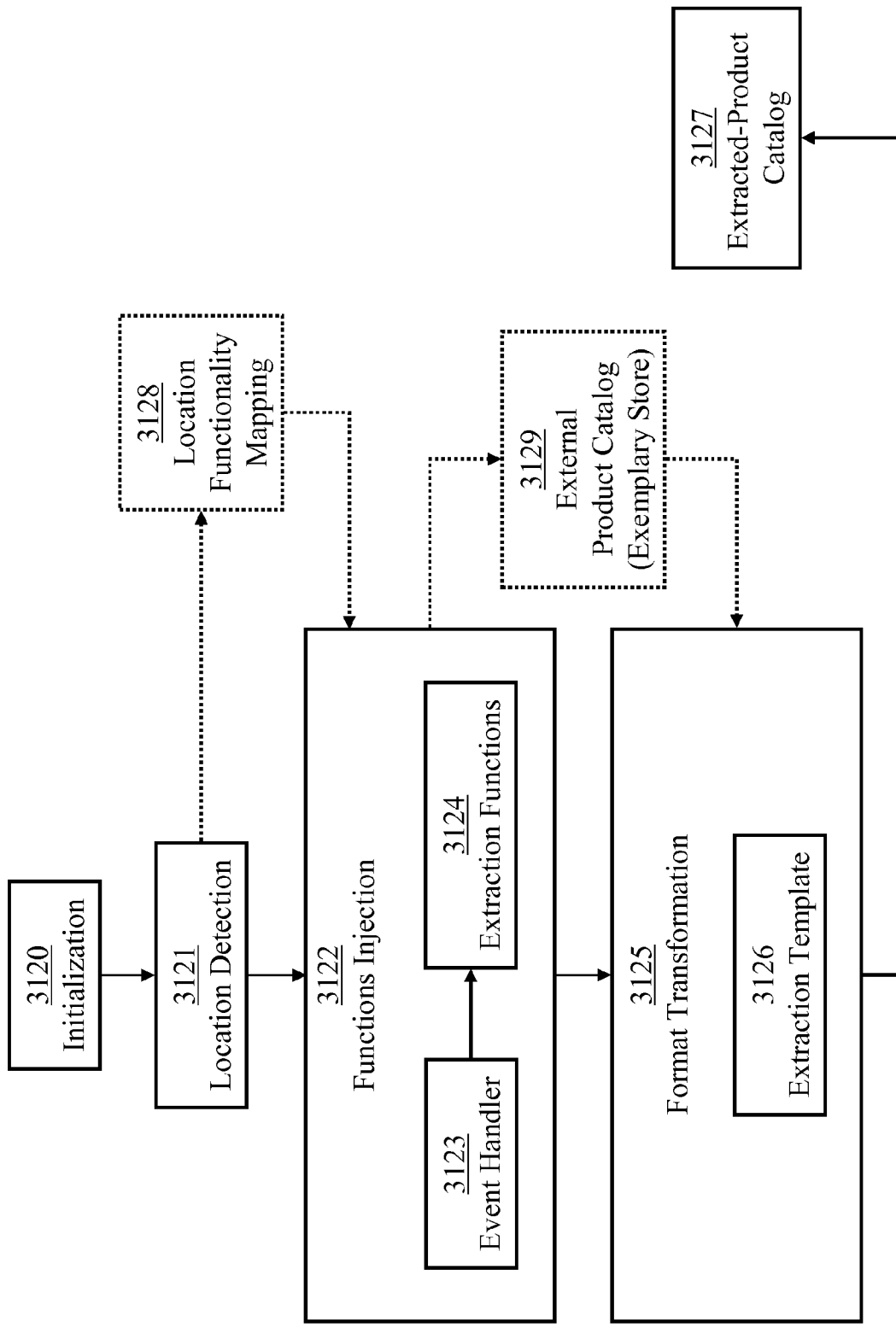
FIG. 31 illustrates functional details of the product extraction component of FIG. 30 in accordance with an embodiment of the present invention.
Figure 32:
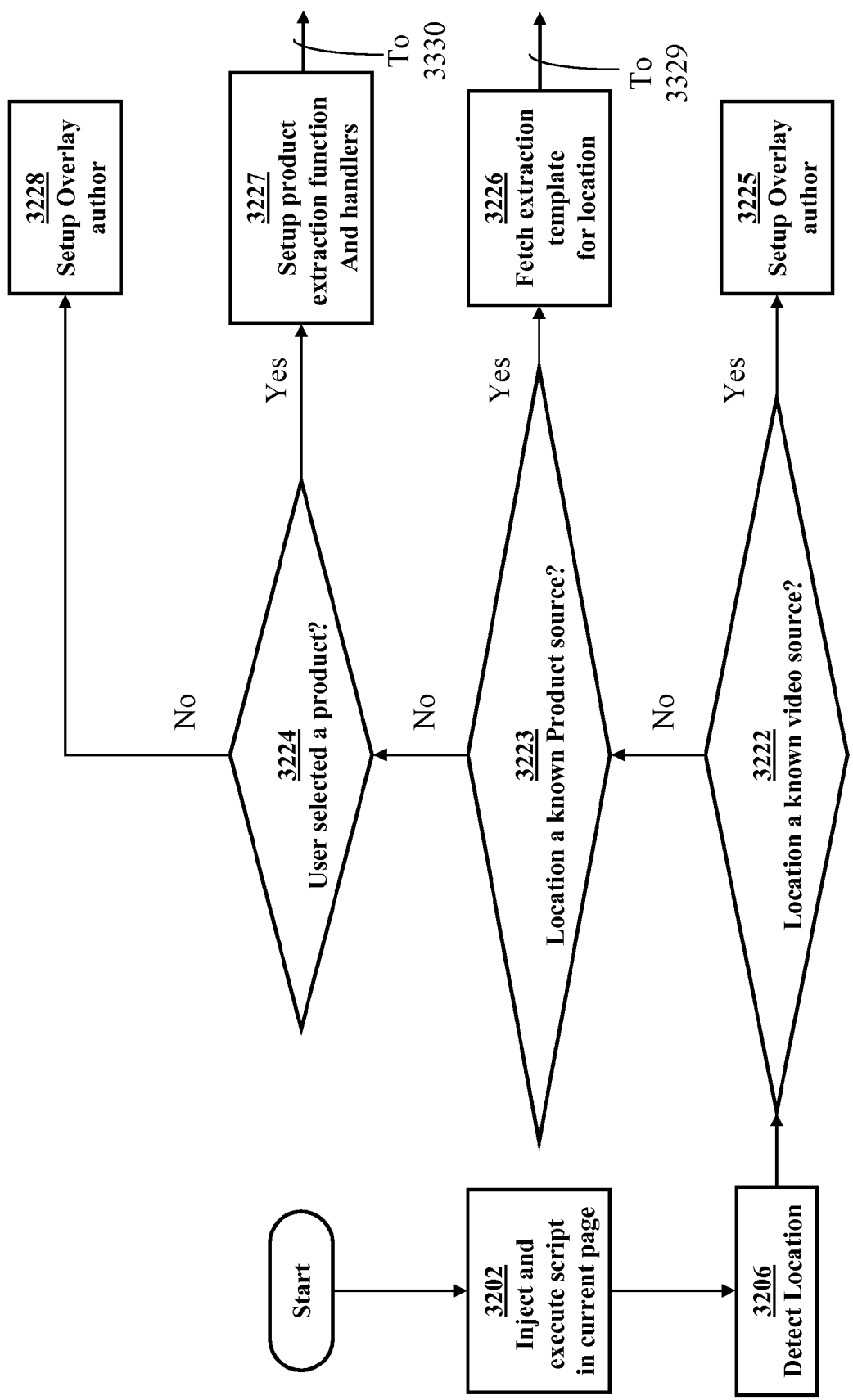
FIG. 32 illustrates software implementation details of the product extraction component of FIG. 30 in accordance with an embodiment of the present invention.
Figure 33:
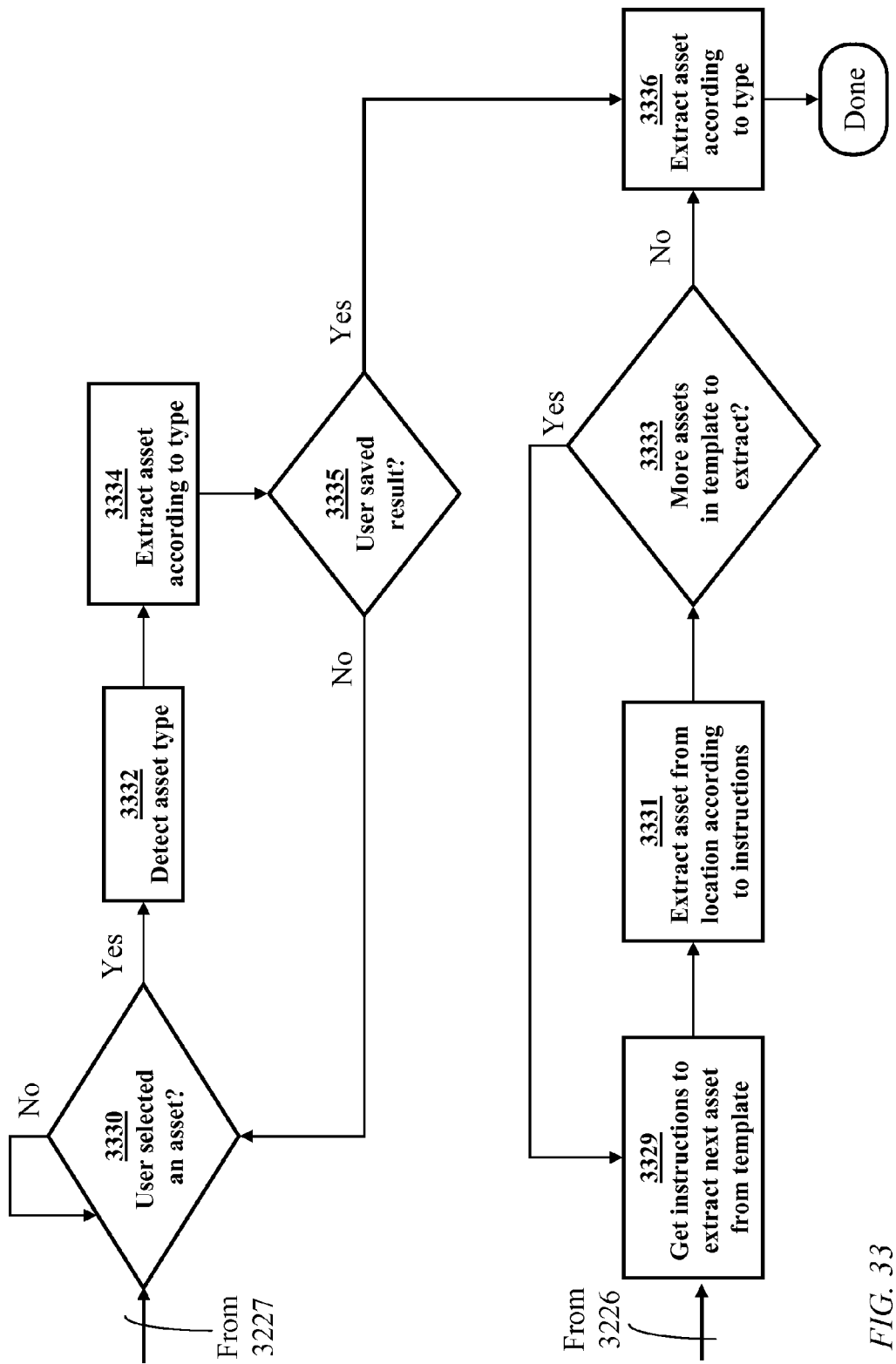
FIG. 33 illustrates additional software components of the product extraction component of FIG. 30 in accordance with an embodiment of the present invention.

A detailed structure of the Product Extraction module 2703 and its operation are illustrated in FIG. 31, FIG. 32, and FIG. 33.

FIG. 31 details the product-extraction procedure. These include initialization (3120), location detection (3121), functions injection (3122), and format transformation (3125). The functions injection process (3122) includes event handling (3123) and an extraction process (3124). The format transformation 3125 uses an extraction template 3126.

FIG. 32 illustrates software implementation details of the product extraction component of FIG. 30. Step 3202 injects and executes script in a current page. Step 3026 detects location. In step 3222 if the detected location is a video source, step 3225 is implemented to setup an overlay authoring process. Otherwise, step 3223 determines whether the detected location is a product source. If so, step 3226 fetches an extraction template. Otherwise, step 3224 determines if a user has selected a product. If so, step 3227 implements a product extraction function. Otherwise, an overlay author is setup in step 3228.

FIG. 33 illustrates additional software components of the product extraction component. Following step 3226 of FIG. 32, steps 3329 and 3331 are performed and if it is determined in step 3333 that all assets in the template are extracted, assets are organized according to type in step 3338. Otherwise, step 3329 is revisited to extract another asset. Following step 3327 of FIG. 32, step 3330 determines if a user has selected an asset. If so, step 3332 detects the asset's type and step 3334 extracts assets according to type.

In-Place Editor Injection Module 2704 (Bookmarklet Script)

When the bookmarklet is clicked, the JavaScript in the bookmark is executed. The script appends a new SCRIPT element inside the HEAD element of the current page which causes the browser to execute that script in the context of the current page.

Figure 34:
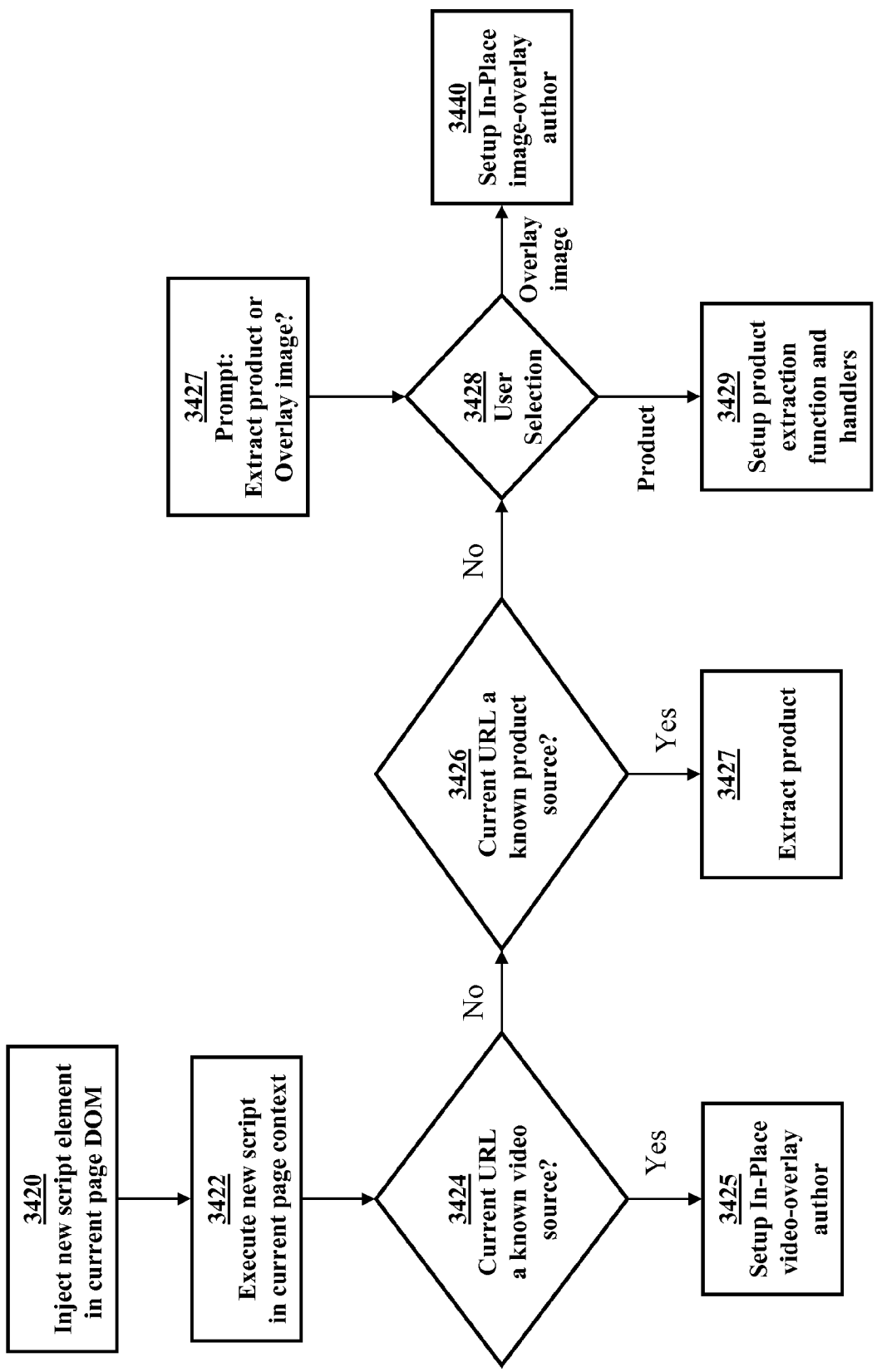
FIG. 34 illustrates an editor injection block in the software implementation of FIG. 27 in accordance with an embodiment of the present invention.
Figure 35:
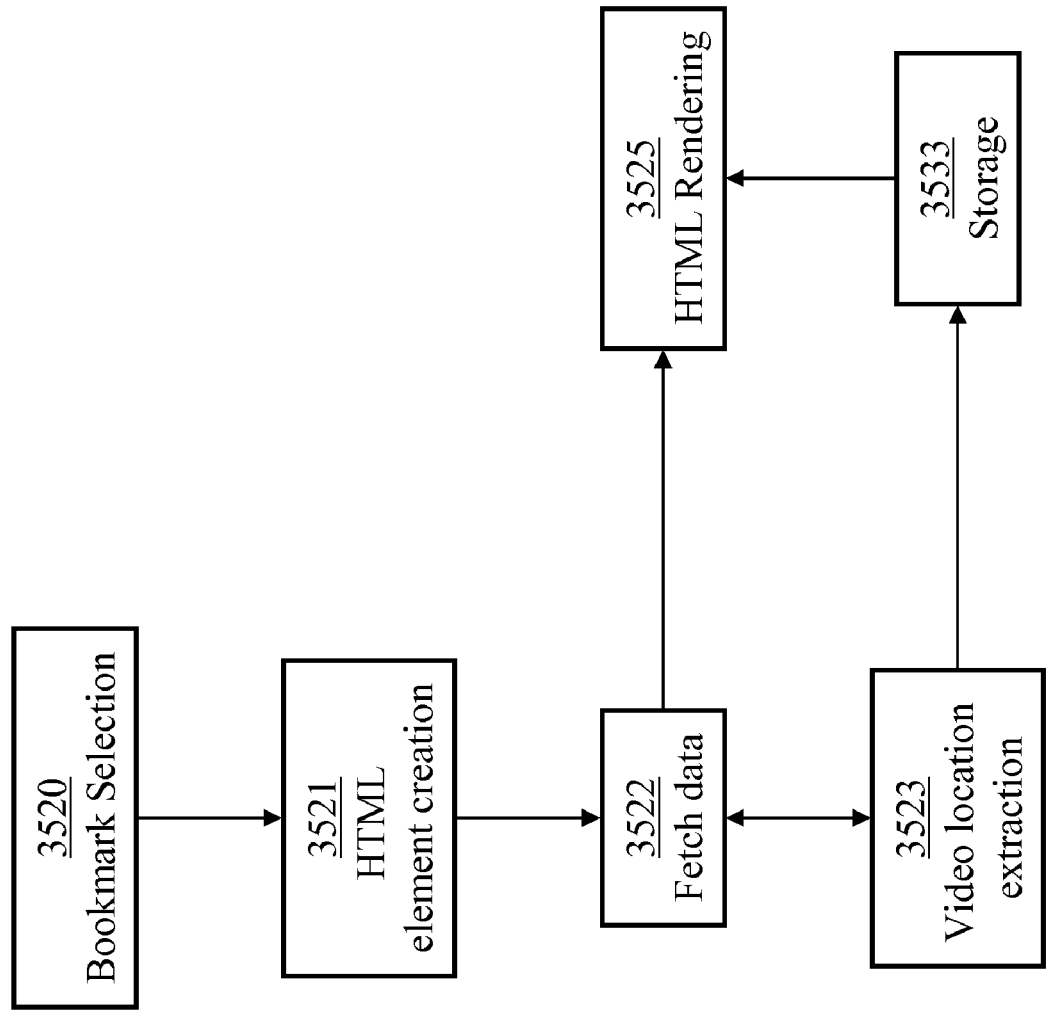
FIG. 35 illustrates further details of the editor injection block of FIG. 34 in accordance with an embodiment of the present invention.
Figure 36:
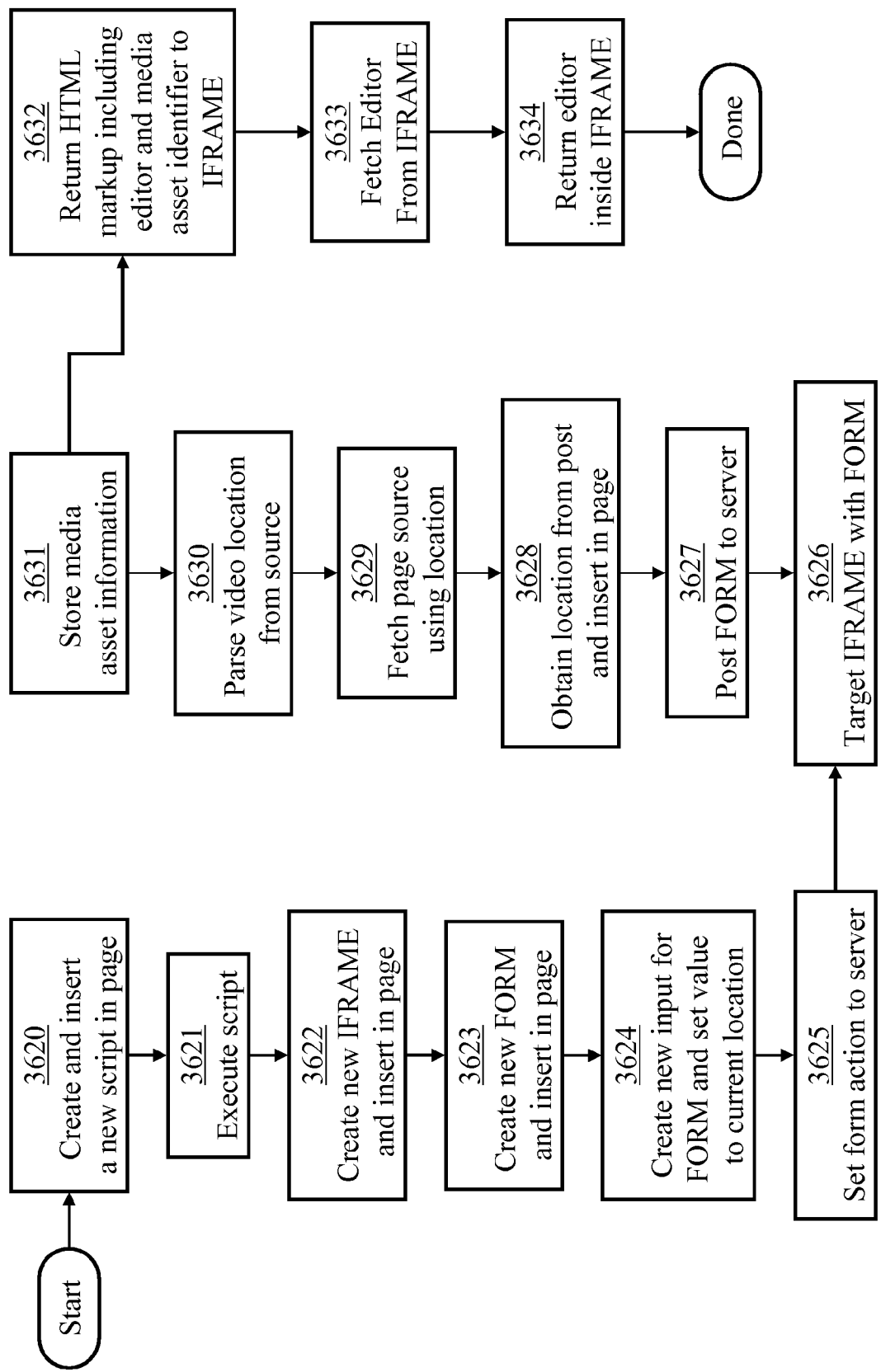
FIG. 36 details software components of the editor injection block of FIG. 34 in accordance with an embodiment of the present invention.

When the injected script is executed, it first checks whether the URL to the current page is a match with a URL to a site from which it is able to automatically extract a product or automatically startup an in-place overlay authoring tool. This is done by matching the URL against regular expressions for a set of known URL's. If there is a match with a URL for a known video source, an in-place authoring tool is injected into the DOM of the page, otherwise a set of asset extraction functions and event handlers are registered in the page. FIG. 34 illustrates the logic in a flowchart. FIG. 35 and FIG. 36 further illustrate the software implementation of the In-Place Editor Injection 2704 in more detail.

In-Place Video Overlay Author (2705)

The In-Place Video Overlay Author is a video player that loads up user-specific data from a server which did not serve the original page and allows a user to mark up a video that is in a current page. It appears to an end user that the authoring functions are part of a present page because one player is substituted with another authoring player.

The challenge is that functionality originating from one domain is being added to a page that was served by another domain all on the client side and browsers prevent communication between documents that originate from different domains. Standard linking, embedding and client-side scripting methods are insufficient to support this type of injected web functionality.

Figure 37:
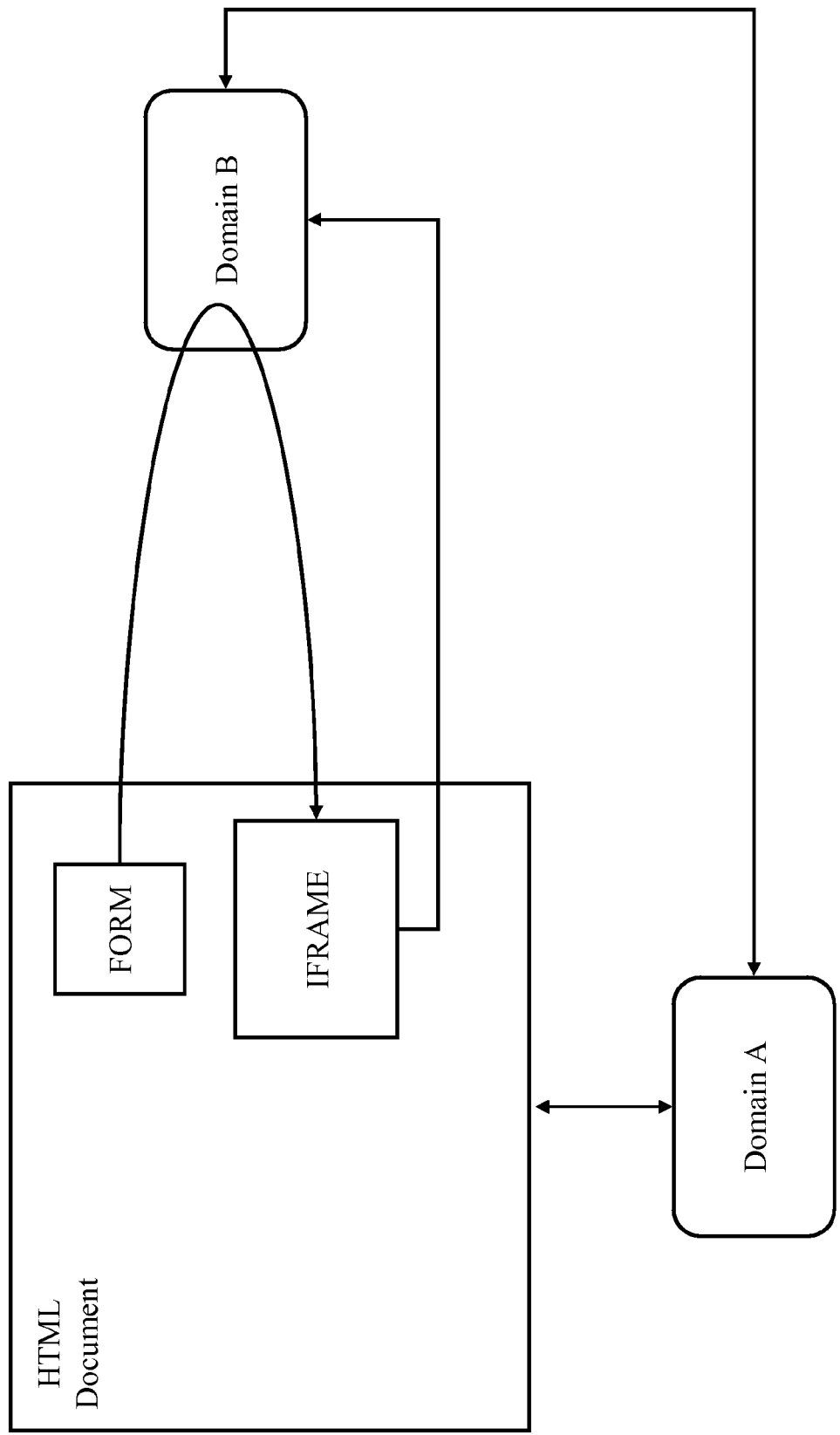
FIG. 37 illustrates software components for facilitating communications between servers of different domains.

A dynamic "FORM" targets a dynamic "IFRAME" with the result of a proxy request to Domain B. With Domain B performing actions on the IFRAME's behalf:
IFRAME can be added to document served by Domain A with the bookmarklet
IFRAME can stream video content from Domain A
IFRAME can obtain information from its parent via the FORM post
IFRAME can communicate with Domain B to read and save information FIG. 37 illustrates the above process.

In-Place Image Overlay Author

The In-Place Image Overlay Author operates in the same manner as the Video Author except with static images. The image authoring player needs to be:
- introduced in-place in any page on top of any image;
- able to read information from a page to which it is added; and
- able to communicate via AJAX with a different domain from the one which served the original page.

The process described above is also used by the image author.

Figure 38:
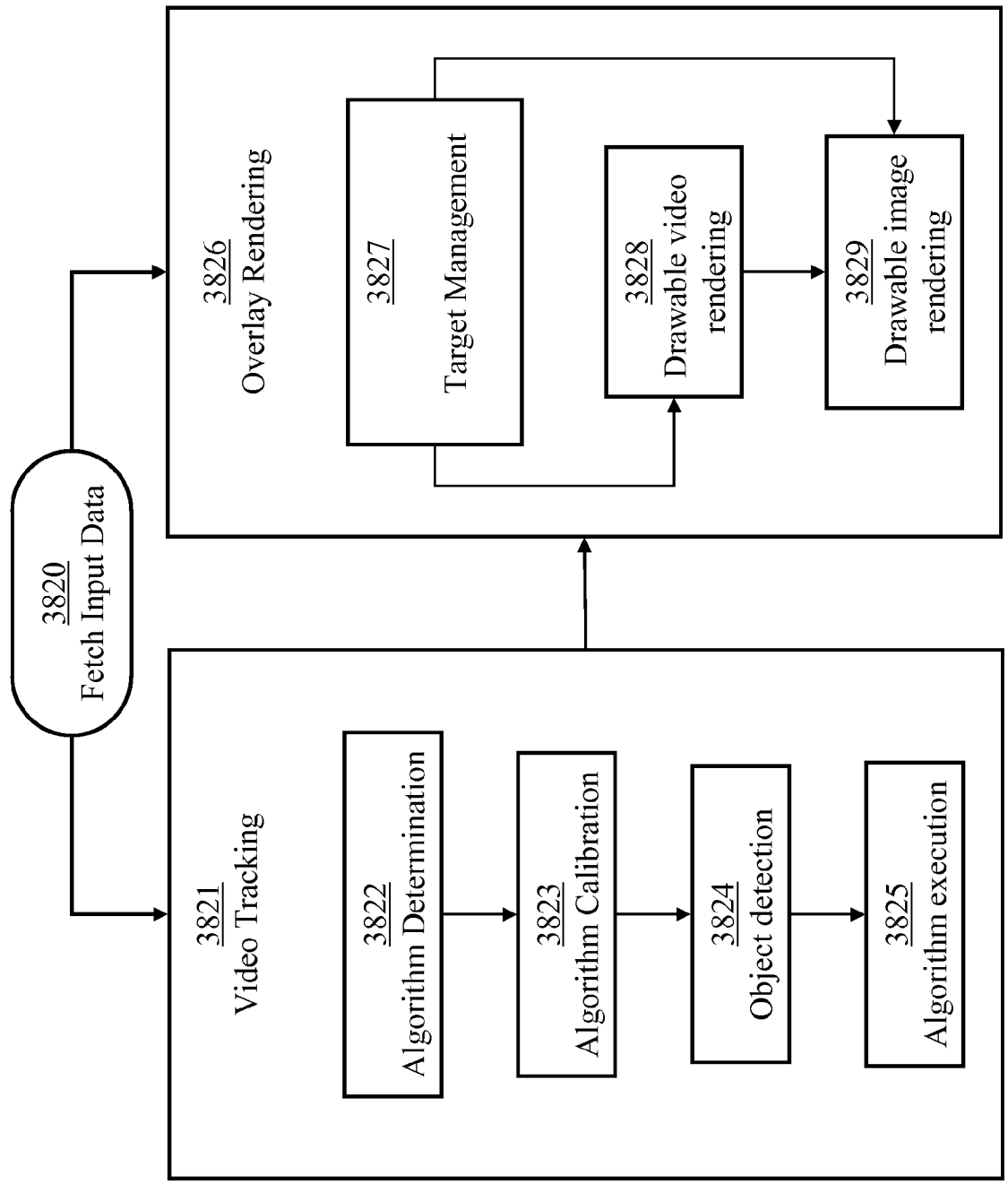
FIG. 38 is a functional diagram for an author overlay block in the software implementation of FIG. 27 in accordance with an embodiment of the present invention.
Figure 39:
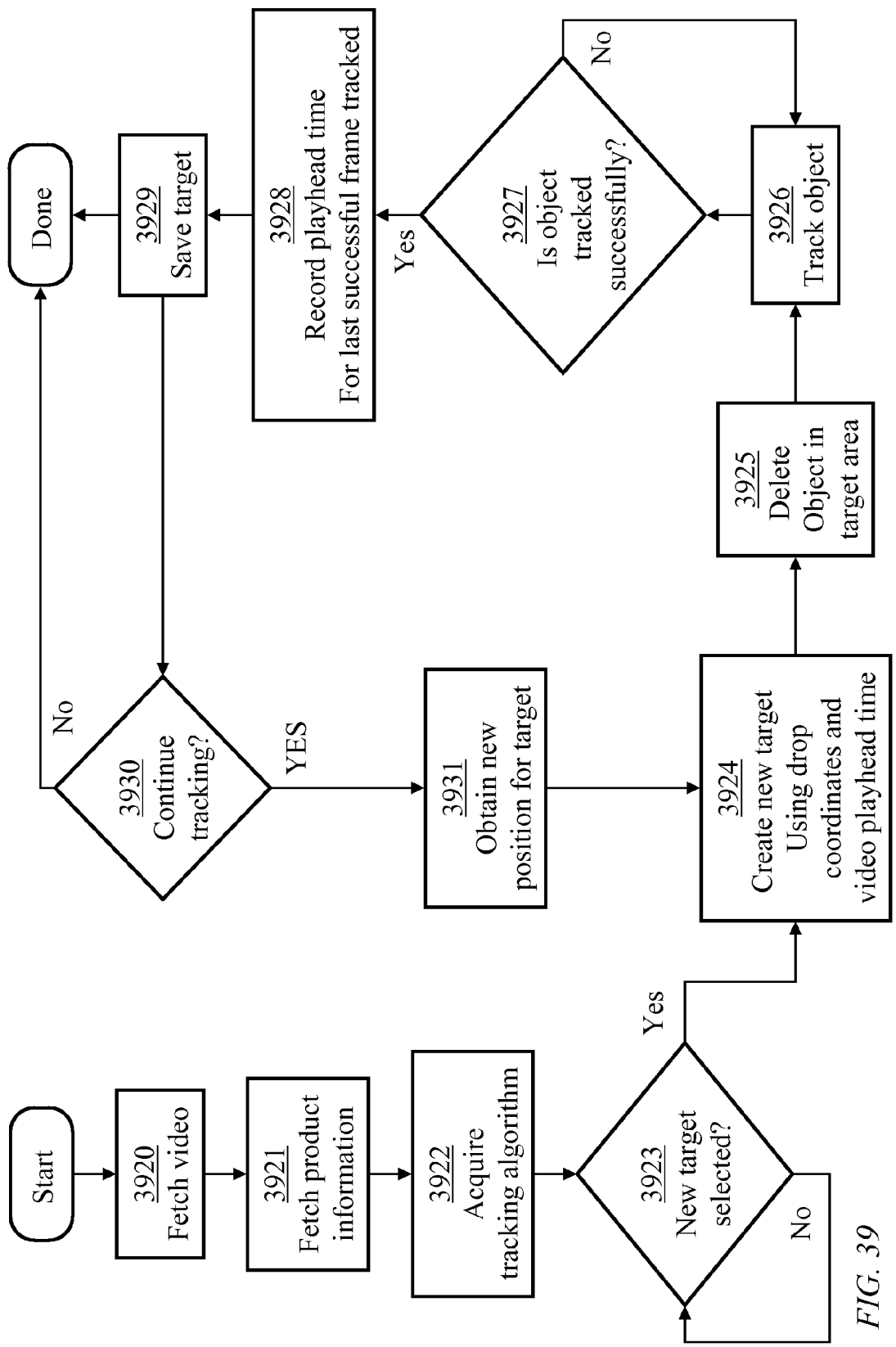
FIG. 39 illustrates details of the author overlay block of FIG. 38.

A detailed functional diagram of the Author Overlay module 2705 and its operation are illustrated in further detail in FIG. 38 and FIG. 39.

Mark-Up Video In-Place (Object Tracking Module 2707)

Extracted products are synchronized with a video stream using the in-place authoring tool to record where and when those products appear in the video. The process involves a combination of manual steps to indicate which products are associated with a certain area on screen and automatic object tracking which follows the object over time until the object becomes to obscured to track, the camera angle or scene changes.

The steps that a user performs to markup a video with a product are illustrated in FIG. 40, which comprises FIG. 40A to FIG. 40H.

Once an in-place author has been injected into the page, the user logs into the overlay server by pressing 'Login' and supplying credentials. This causes the author component to perform a GET request to the overlay server and if the login is a success, the author component makes a request for all of the user's harvested products.

The user advances the video display until a product that the user wants to mark up is first shown on screen (FIG. 40A). As indicated in FIG. 40B, the user drags a product image and drops it onto the location of where the product is on the screen. When the object is dropped, a selection window sized to match the size of the product thumbnail is shown on the video. The user resizes the selection to match the area that the object takes up, forming a bounding box around the object. The user also selects how the object should be tracked (manually, or using a particular object tracking algorithm).

As illustrated in FIG. 40C and FIG. 40D, a bounding box is formed around the object in the video. If the user selects manual tracking, the user moves to a future position in the video display and moves the selection around the objects' new position. Each time the user positions an object, a "keyframe" is created marking that the object was at position x, y at time t. When a user moves to a time in between keyframes, the positions of all objects on screen are linearly interpolated. The user repeats this process until the object's movement is approximated. The user can also choose to end the selection at a particular position in the video or start it sooner.

When the user saves the session, the targets are POSTed to the server in a compressed XML representation. The representation includes the start time, stop time and tracking type and for manual mode as well as the keyframe information.

If the user selects to use an object tracking algorithm instead of manual tracking, the authoring system starts the execution of the selected object tracking algorithm and runs it until the algorithm stops (FIG. 40E to FIG. 40H). The object detection algorithm is initialized with the bounding box that the user has manually sized. Depending on the algorithm selected, it could potentially run to the end of the video or until a confidence level is not met, at which point a final keyframe would be introduced.

The user then moves through the video and monitors how accurately the object is tracked over time. At any time, if the user feels that the object tracking has moved off course or that it should be stopped due to the object going off screen, the camera angle changing or the scene changing, the user either instructs the tool to end the tracking or the user inserts a new keyframe with a new position. Inserting a new keyframe re-initializes the object tracking at the new position and the algorithm runs again. This process is continued until the user is satisfied that all objects are tracked accurately at which point the user saves the session and the tracking information is stored to the overlay server.

In the example of FIG. 40E, a product is dragged on to the video at time t=23 s, and an automatic object tracking algorithm is selected. In FIG. 40F, the user has moved ahead to time t=41 s and found that the object is being tracked successfully and the bounding box is still surrounding the object. In FIG. 40G at time t=55 s, an object is starting to obstruct the view of the tracked object, but the algorithm is still able to cope. In FIG. 40H, at time 1 m 11 s, the user finds that the obstruction has almost completely covered the object and the algorithm has stopped. At this point, the user could choose to move ahead in the video where the object appeared back on screen, choose a different tracking algorithm or select to track the object manually.

Overlay Playback Module 2708

Figure 41:
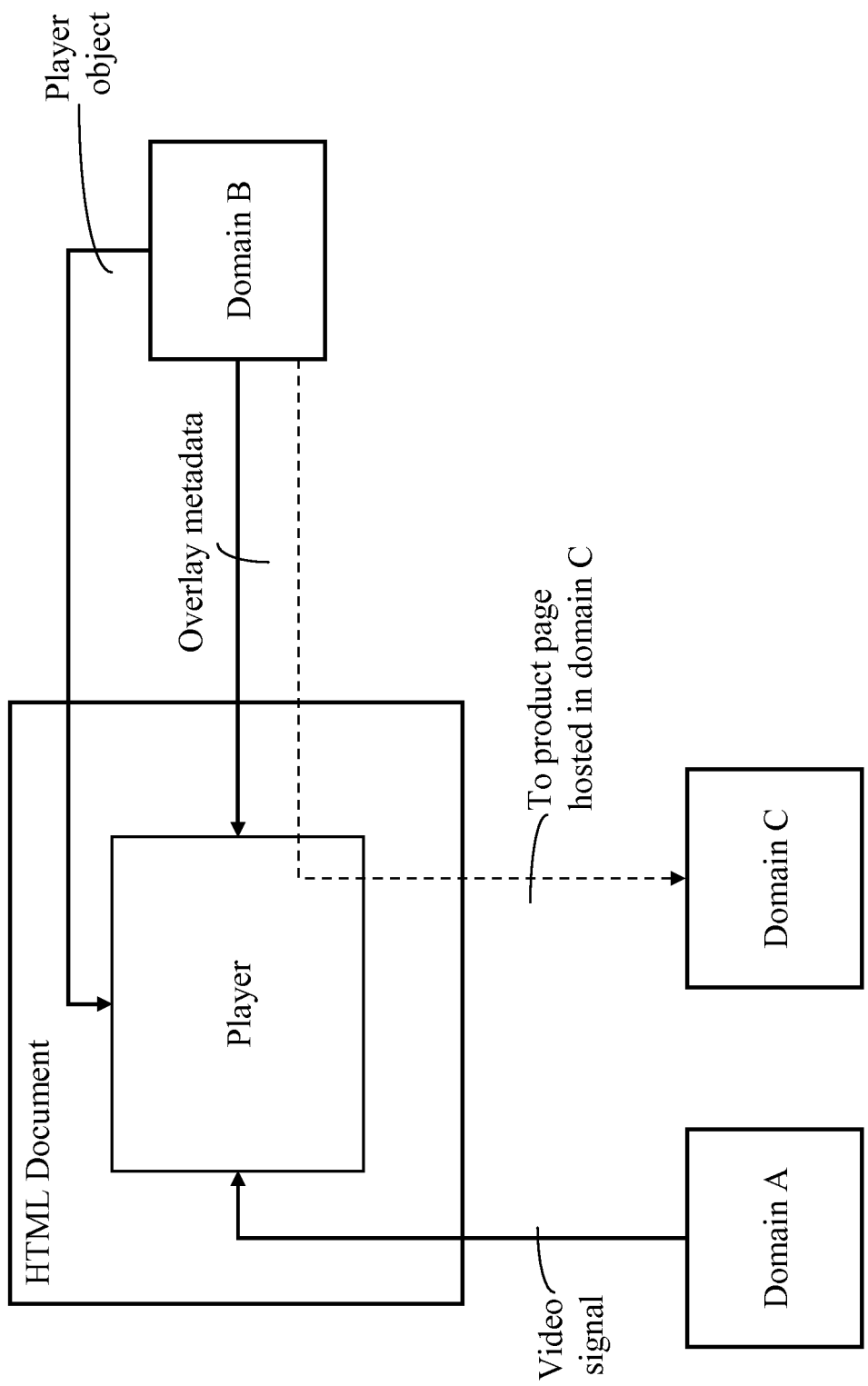
FIG. 41 illustrates a playback function considered in the software implementation of FIG. 27 in accordance with an embodiment of the present invention.
Figure 43:
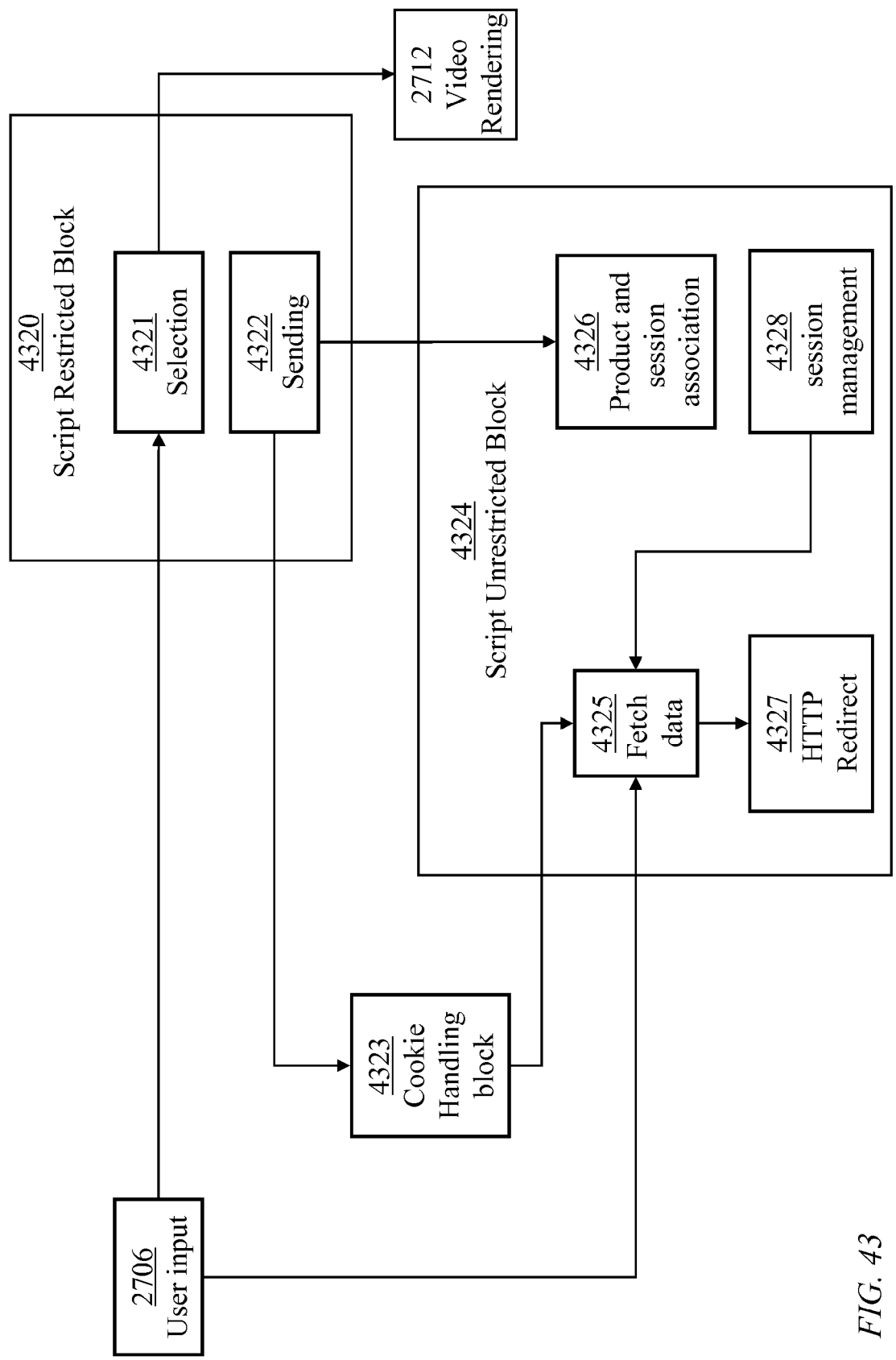
FIG. 43 illustrates a functional diagram for a user redirection block in the software implementation of FIG. 27.

Once an overlay has been authored over top of a streaming video and the data has been stored on an overlay server, playback in a non-restricted environment involves the operation of the Overlay Author component with the authoring features disabled. This means that products are time-synchronized by the player and markers are shown on the screen at the appropriate time and coordinates. Since authoring is not required, there is no need for a bookmarklet, dynamic FORM or IFRAME, or a proxy server. FIG. 41 illustrates operation of the Overlay Playback module 2708 in detail, in particular, the figure illustrates the playback operation with video streaming from Domain A and Overlay information arriving from Domain B and time synchronization occurring in the player. It also shows that when a user clicks on a product in an overlay (FIG. 27, module 2706), the request is proxied through Domain B so that the click can be tracked (FIG. 27, module 2707), and then the user is redirected to the product site (FIG. 27, module 2711). Further details of the structure and operation of the User Re-Direction module 2711 are illustrated in FIG. 43.

The process illustrated in FIG. 41 functions when the player is allowed to use JavaScript which is typical when there is an understanding or relationship between Domain A and Domain B that JavaScript is required. A problem arises when Domain A does not allow players that it serves to use JavaScript because the player is not able to change the browser location without JavaScript. If Domain B is to send an HTTP redirection, it would not alter the location of the browser since the request was an asynchronous request made by the Player not the main document.

In this type of script-restricted environment, a different solution is required. Although the player can still request data from Domain B, it is unable to have any affect on the page including the ability to change the current document location.

The solution involves the use of a button wrapped in a link outside of the player. Being outside the player, it can cause the browser to change locations by virtue of the fact that it is an HTML link.

Figure 42:
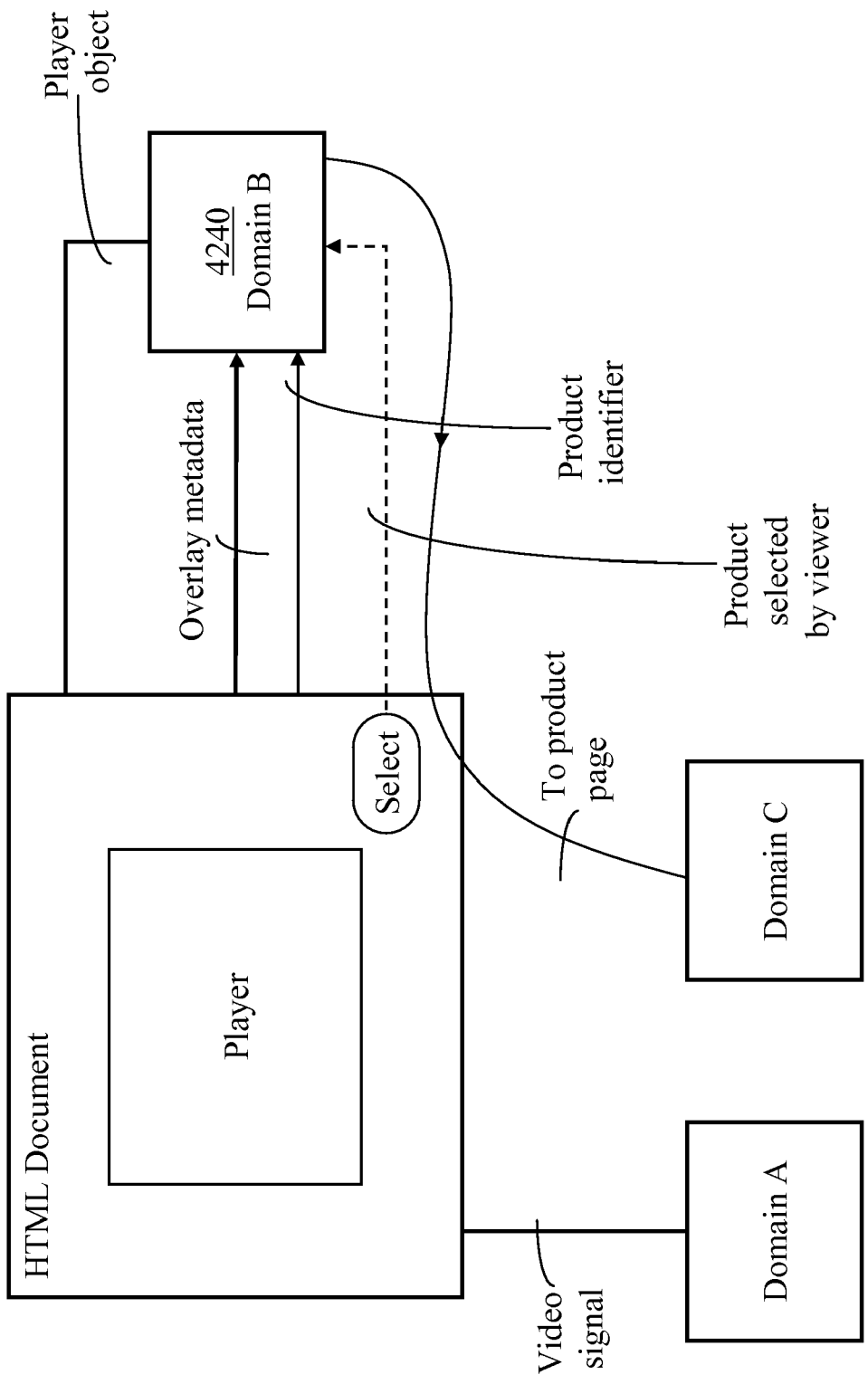
FIG. 42 illustrates inter-domain communication activated in the playback function of FIG. 41 in accordance with an embodiment of the present invention.

The use of server side sessions on Domain B is also required for this solution to function. Instead of the player making a call to Domain B to track the click, and then using JavaScript to change the location of the browser, the player sends an AJAX call to Domain B when the user selects a product but then tells the user (visually) to click on a selection button. The AJAX call stores the product identifier in a server-side session for that user. The link around the button is linked to a URL on Domain B which inspects the contents of the server-side session for the user and then performs an HTTP redirect to the final product page. The above noted solution is illustrated in FIG. 42.

A computer readable medium, e.g., a memory such as non-volatile memory, or DVD, CD-ROM, floppy or else, having computer readable instructions stored thereon, when executed by a processor, to perform the steps of the method described above, are also provided.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. A method of linking content of a video signal to information sources, the method comprising:
creating, at a server having a processor, an object directory having a plurality of object records, each object record containing:
an identifier of a respective object selected from a plurality of objects;
an image of said respective object;
a description of said respective object; and
a set of network addresses of servers providing further description of said respective object;
storing said object directory in a memory device associated with said server;
acquiring a plurality of video recordings and a plurality network addresses of sources of said video recordings;
creating, at said server, a video-content directory having a plurality of overlay directories, each overlay directory corresponding to a respective video recording from among said plurality of video recordings, each said overlay directory containing:
an identifier of a respective video recording;
a set of identifiers of selected objects tracked in a display of said respective video recording; and
coordinates of at least one tracked image of each said selected object;
storing said video-content directory in said memory device;—
receiving at said server a request from a computer for access to a specific video recording; and
upon ascertaining that said specific video recording belongs to said plurality of video recordings, sending from said server to said computer:
a network address, from among said plurality of network addresses, providing said specific video recording;
a specific overlay directory, from among said plurality of overlay directories, corresponding to said specific video recording;
sending, from a communication module of said server to each authoring computer, of a plurality of authoring computers, authoring instructions which cause said each authoring computer to:
access a video-source directory, stored in said server, containing network addresses of a plurality of video sources, to obtain a network address of a selected video source;
access said object directory;
acquire a specific video recording from said selected video source;
track specific product images belonging to said object directory and appearing in a display of said specific video recording to produce an overlay directory of said specific video recording; and
transmit said overlay directory to said server;
receiving said overlay directory from said each authoring computer at said communication module; and
appending said overlay directory to said video-content directory.

2. The method of claim 1 further comprising sending, from said server to said computer, an augmented-display module for:
producing a display, at said computer, of a video signal read from said specific video recording;
synchronizing said specific overlay directory with said video signal;
detecting a selection, by a user of said computer, of an image of a specific object, said specific object belonging said plurality of objects;
identifying a position of a content item, corresponding to said display of said specific object, within said specific video recording; and
extracting, from said specific overlay directory, an identifier of said specific object.

3. The method of claim 2 further comprising a step of receiving, at said server, an indication of said selection.

4. The method of claim 1 further comprising:
determining at said server, using said object directory, at least one network address of a network site providing information pertinent to said specific object; and
relaying to said computer said at least one network address.

5. The method of claim 1 further comprising sending from said communication module to each viewing computer of a plurality of viewing computers augmented display instructions which cause said each viewing computer to:
send a request to the server to acquire a specific video recording;
receive from the server:
an augmented display tool;
a specific overlay directory, corresponding to said specific video recording;
a network address of a video source providing said specific video recording;
request and receive said specific video recording from said video source;
track images, in a display of said specific video recording, of a specific product listed in an object directory maintained at the server; and
extract, from said object directory, product information relevant to said specific product.

6. The method of claim 1 further comprising:
producing data relating content of said respective video recording to display times of at least one object from among said plurality of objects relative to a time reference; and
incorporating said data in said each overlay directory.

7. The method of claim 1 further comprising:
producing data relating content of said respective video recording to spatial boundaries of successive displays of at least one object from among said plurality of objects; and
incorporating said data in said each overlay directory.

8. The method of claim 1 further comprising selecting said plurality of objects to include commercial products and services.

9. The method of claim 1 further comprising instructing said computer to send identifiers of objects, within said specific video recording, selected by a user of said computer to said server for statistical analysis.

10. A system for linking content of a video signal to information sources, the system comprising:
a server having a processor and at least one memory device, coupled to said server and comprising computer readable instructions for execution by the processor, storing:
an object directory having a plurality of object records, each object record containing:
an identifier of a respective object selected from a plurality of objects;
an image of said respective object;
a description of said respective object; and
a set of network addresses of servers providing further description of said respective object;
a plurality of video recordings; and
a plurality network addresses of sources of said video recordings;
a video-content directory having a plurality of overlay directories, each overlay directory corresponding to a respective video recording from among said plurality of video recordings, each said overlay directory containing:
an identifier of a respective video recording;
a set of identifiers of selected objects tracked in a display of said respective video recording; and
coordinates of at least one tracked image of each selected object;
and
a communication module for:
receiving at said server a request from a computing device to access a specific video recording; and
sending from said server to said computing device:
a network address, from among said plurality of network addresses, providing said specific video recording;
a specific overlay directory, from among said plurality of overlay directories, corresponding to said specific video recording;
sending, from said communication module to each authoring computer from among a plurality of authoring computers, authoring instructions which cause said each authoring computer to:
access a video-source directory, stored in said server, containing network addresses of a plurality of video sources, to obtain a network address of a selected video source;
access said object directory;
acquire a specific video recording from said selected video source;
track specific product images belonging to said object directory and appearing in a display of said specific video recording to produce an overlay directory of said specific video recording; and
transmit said overlay directory to said server; and
receiving said overlay directory from said each authoring computer at said communication module; and
appending said overlay directory to said video-content directory.

11. The system of claim 10 further comprising an augmented display module stored in said at least one memory device, wherein said server is configured to send said augmented-display module to said computing device for:
producing a display of a video signal read from said specific video recording;
synchronizing said specific overlay directory with said video signal;
detecting a selection, by a user of said computing device, of an image of a specific object, said specific object belonging said plurality of objects;
identifying a position of a content item, corresponding to said display of said specific object, within said specific video recording; and
extracting, from said specific overlay directory, an identifier of said specific object.

12. The system of claim 10 wherein said server is configured to:
determine, using said object directory, at least one network address of a network site providing information pertinent to said specific object; and
relay said at least one network address to said computing device.

13. The system of claim 10 wherein said server is configured to send to each viewing computer from among a plurality of viewing computers augmented display instructions which cause said each viewing computer to:
send a request to the server to acquire a specific video recording;
receive from the server:
an augmented display tool;
a specific overlay directory, corresponding to said specific video recording;
a network address of a video source providing said specific video recording;
request and receive said specific video recording from said video source;
track images, in a display of said specific video recording, of a specific product listed in an object directory maintained at the server; and
extract, from said object directory, product information relevant to said specific product.

14. The system of claim 10 wherein said each overlay directory further includes data relating content of said respective video recording to display times of at least one object from among said plurality of objects relative to a time reference.

15. The system of claim 10 wherein said each overlay directory further includes data relating content of a respective video recording to spatial boundaries of successive displays of at least one object from among said plurality of objects.

16. The system of claim 10 wherein said plurality of objects comprises commercial products and services.

17. The system of claim 10 wherein said communication module further comprises a module for instructing said computing device to send identifiers of objects, within said specific video recording, selected by a user of said computing device to said server for statistical analysis.

18. A server for providing content directories of video signals and linking content to information sources, the server comprising:

a processor and at least one memory device, coupled to said server and comprising computer-readable instructions for execution by the processor, storing:
  an object directory having a plurality of object records, each object record containing:
    an identifier of a respective object selected from a plurality of objects;
    an image of said respective object;
    a description of said respective object; and
    a set of network addresses of servers providing further description of said respective object;
  a plurality of video recordings; and
  a plurality network addresses of sources of said video recordings;
  a video-content directory having a plurality of overlay directories, each overlay directory corresponding to a respective video recording from among said plurality of video recordings, each said overlay directory containing:
    an identifier of a respective video recording;
    a set of identifiers of selected objects tracked in a display of said respective video recording; and
    coordinates of at least one tracked image of each selected object;
and
a communication module for:
  receiving at said server a request from a computing device to access a specific video recording; and
  sending from said server to said computing device:
    a network address, from among said plurality of network addresses, providing said specific video recording;
    a specific overlay directory, from among said plurality of overlay directories, corresponding to said specific video recording;
  sending, from said communication module to each authoring computer from among a plurality of authoring computers, authoring instructions which cause said each authoring computer to:
    access a video-source directory, stored in said server, containing network addresses of a plurality of video sources, to obtain a network address of a selected video source;
    access said object directory;
    acquire a specific video recording from said selected video source;
    track specific product images belonging to said object directory and appearing in a display of said specific video recording to produce an overlay directory of said specific video recording; and
    transmit said overlay directory to said server;
  receiving said overlay directory from said each authoring computer at said communication module; and
  appending said overlay directory to said video-content directory.

19. The server of claim 18 further comprising an augmented display module stored in said at least one memory device, and processor-readable instructions stored in said at least one memory device which cause said processor to send said augmented-display module to said computing device for:
  producing a display of a video signal read from said specific video recording;
  synchronizing said specific overlay directory with said video signal;
  detecting a selection, by a user of said computing device, of an image of a specific object, said specific object belonging said plurality of objects;
  identifying a position of a content item, corresponding to said display of said specific object, within said specific video recording; and
  extracting, from said specific overlay directory, an identifier of said specific object.

20. The server of claim 18 further comprising processor-readable instructions stored in said at least one memory device which cause said processor to:
  determine, using said object directory, at least one network address of a network site providing information pertinent to said specific object; and
  relay said at least one network address to said computing device.

21. The server of claim 18 further comprising processor-readable instructions stored in said at least one memory device which cause said processor to:
  to send to each viewing computer from among a plurality of viewing computers augmented display instructions which cause said each viewing computer to:
  send a request to the server to acquire a specific video recording;
  receive from the server:
  an augmented display tool;
  a specific overlay directory, corresponding to said specific video recording;
  a network address of a video source providing said specific video recording;
  request and receive said specific video recording from said video source;
  track images, in a display of said specific video recording, of a specific product listed in an object directory maintained at the server; and
  extract, from said object directory, product information relevant to said specific product.

22. The server of claim 18 wherein said each overlay directory further includes data relating content of said respective video recording to display times of at least one object from among said plurality of objects relative to a time reference.

23. The server of claim 18 wherein said each overlay directory further includes data relating content of a respective video recording to spatial boundaries of successive displays of at least one object from among said plurality of objects.

* * * * *

UNITED STATES PATENT AND TRADEMARK OFFICE
CERTIFICATE OF CORRECTION

| | | |
|---|---|---|
| PATENT NO. | : 8,091,103 B2 | Page 1 of 1 |
| APPLICATION NO. | : 12/177149 | |
| DATED | : January 3, 2012 | |
| INVENTOR(S) | : Tyler Andrew Cope | |

It is certified that error appears in the above-identified patent and that said Letters Patent is hereby corrected as shown below:

In the Claims:

col. 29 line 57 claim 1: delete "device;-" and replace with --device;-- col. 34 line 29 claim 21: delete "to send" and replace with --send--

Signed and Sealed this
Twenty-first Day of February, 2012

David J. Kappos
*Director of the United States Patent and Trademark Office*